(12) United States Patent
Huang et al.

(10) Patent No.: US 11,526,536 B2
(45) Date of Patent: Dec. 13, 2022

(54) SYSTEMS AND METHODS FOR IDENTIFYING GRIDS OF GEOGRAPHICAL REGION IN MAP

(71) Applicant: BEIJING DIDI INFINITY TECHNOLOGY AND DEVELOPMENT CO., LTD., Beijing (CN)

(72) Inventors: Zexiang Huang, Beijing (CN); Kehua Sheng, Tianjin (CN); Zhen Zhang, Beijing (CN); Yue Wang, Beijing (CN); Taixu Jiang, Beijing (CN); Quancheng Rao, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 392 days.

(21) Appl. No.: 15/931,520

(22) Filed: May 13, 2020

(65) Prior Publication Data
US 2020/0279170 A1  Sep. 3, 2020

Related U.S. Application Data

(63) Continuation of application No. PCT/CN2018/090095, filed on Jun. 6, 2018.

(51) Int. Cl.
*G06F 16/29* (2019.01)
(52) U.S. Cl.
CPC .................................. *G06F 16/29* (2019.01)
(58) Field of Classification Search
None
See application file for complete search history.

(56) References Cited

U.S. PATENT DOCUMENTS 8,896,601 B1  11/2014 Norman
9,036,000 B1   5/2015 Ogale et al.
(Continued)

FOREIGN PATENT DOCUMENTS

CN  104063509 A   9/2014
CN  105138711 A  12/2015
(Continued)

OTHER PUBLICATIONS

International Search Report in PCT/CN2018/090095 dated Mar. 12, 2019, 5 pages.
(Continued)

*Primary Examiner* — Christopher J Raab
(74) *Attorney, Agent, or Firm* — Metis IP LLC

(57) ABSTRACT

The present disclosure includes artificial intelligence systems and methods for identifying grids for a geofence in an area in a map that includes a plurality of independently indexed regions of grids. The map is gridded into a plurality of grids and divided into a plurality of partitions. The methods include obtaining information of the geofence in the map, and determining a boundary grid series of the geofence from the plurality of grids. The methods include identifying at least one enclosed area in the geographical region, and upon determining that an enclosed area crosses two or more partitions, segmenting the enclosed area into two or more sub-areas. The methods also include determining boundary grids for each sub-area, and identifying internal grids in the sub-area for each sub-area. The methods further include identifying grids in the geographical region by collecting the boundary grids and the internal grids.

20 Claims, 22 Drawing Sheets

(56) References Cited

U.S. PATENT DOCUMENTS

| | | |
|---|---|---|
| 2004/0225665 A1 | 11/2004 | Toyama et al. |
| 2007/0005550 A1 | 1/2007 | Klein |
| 2009/0243925 A1 | 10/2009 | Kellermeier et al. |
| 2012/0089333 A1 | 4/2012 | Yeh et al. |
| 2015/0081212 A1 | 3/2015 | Mitchell et al. |
| 2015/0120751 A1 | 4/2015 | Choi |
| 2016/0073225 A1 | 3/2016 | Ganesalingam et al. |
| 2016/0092456 A1 | 3/2016 | Bonnell et al. |
| 2016/0261983 A1 | 9/2016 | Bonnell et al. |
| 2016/0377438 A1 | 12/2016 | Lee et al. |
| 2017/0139934 A1 | 5/2017 | Laventman et al. |
| 2018/0005523 A1 | 1/2018 | Cahan et al. |
| 2020/0037102 A1 | 1/2020 | Zhang |

FOREIGN PATENT DOCUMENTS

| | | |
|---|---|---|
| CN | 105631038 A | 6/2016 |
| CN | 105760529 A | 7/2016 |
| CN | 106294484 A | 1/2017 |
| CN | 107480175 A | 12/2017 |
| EP | 2078929 A1 | 7/2009 |
| JP | 2012190237 A | 10/2012 |
| JP | 2015212964 A | 11/2015 |

OTHER PUBLICATIONS

Written Opinion in PCT/CN2018/090095 dated Mar. 12, 2019, 4 pages.

First Office Action in Chinese Application No. 201880038351.8 dated Apr. 1, 2020, 9 pages.

Si Lei, Research on Dynamic Update of Grid-Based Distance Map and Path-Planning Based on Distance Map, China Master's Theses Full-text Database, 2014, 85 pages.

Notice of Allowance in Japanese Application No. 2020-536791 dated May 31, 2021, 5 pages.

The First Examination Report in Russian Application No. 2020142635 dated Jul. 5, 2021, 14 pages.

The Extended European Search Report in European Application No. 18921335.8 dated Oct. 14, 2020, 8 pages.

500

```
┌─────────────────────────────────────────────────────┐
│ Obtaining information of a geofence of a geographical region │ ~510
│                     in a map                         │
└─────────────────────────────────────────────────────┘
                          ↓
┌─────────────────────────────────────────────────────┐
│ Determining a boundary grid series of the geofence from a │ ~520
│           plurality of grids of the map              │
└─────────────────────────────────────────────────────┘
                          ↓
┌─────────────────────────────────────────────────────┐
│ Identifying at least one enclosed area in the geographical │ ~530
│         region based on the boundary grid series       │
└─────────────────────────────────────────────────────┘
                          ↓
┌─────────────────────────────────────────────────────┐
│ Segmenting an enclosed area into two or more sub-areas so │ ~540
│ that each sub-area of the two or more sub-areas locates in │
│                only one partition                    │
└─────────────────────────────────────────────────────┘
                          ↓
┌─────────────────────────────────────────────────────┐
│ Determining boundary grids for each of the two or more sub- │ ~550
│                       areas                          │
└─────────────────────────────────────────────────────┘
                          ↓
┌─────────────────────────────────────────────────────┐
│ For each of the two or more sub-areas, identifying internal │ ~560
│ grids in the sub-area from the plurality of grids based on the │
│ boundary grids of the sub-area and an index of the partition │
│          in which the sub-area locates                │
└─────────────────────────────────────────────────────┘
                          ↓
┌─────────────────────────────────────────────────────┐
│ Identifying grids in the geographical region by collecting the │ ~570
│ boundary grids of the two or more sub-areas and the internal │
│        grids in the two or more sub-areas            │
└─────────────────────────────────────────────────────┘
```

FIG. 5

Resolution 1
Refinement level=1
Rhombus: refinement factor=4.5
Hexagon: refinement factor=9/7

Resolution 2
Refinement level=2
Rhombus: refinement factor=4
Hexagon: refinement factor=3.5

Resolution 3
Refinement level=3
Rhombus: refinement factor=4
Hexagon: refinement factor=3.5

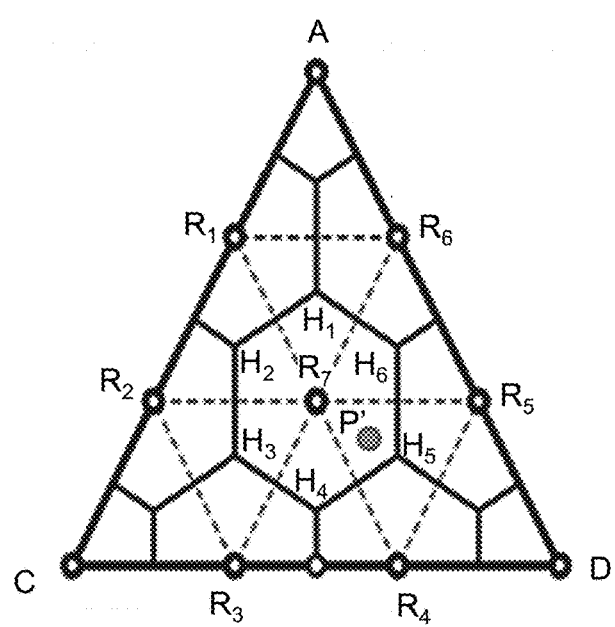
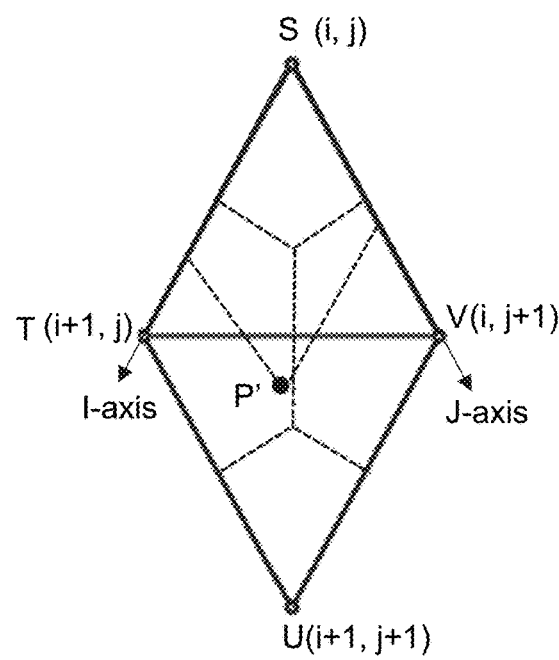
FIG. 7I
FIG. 7J
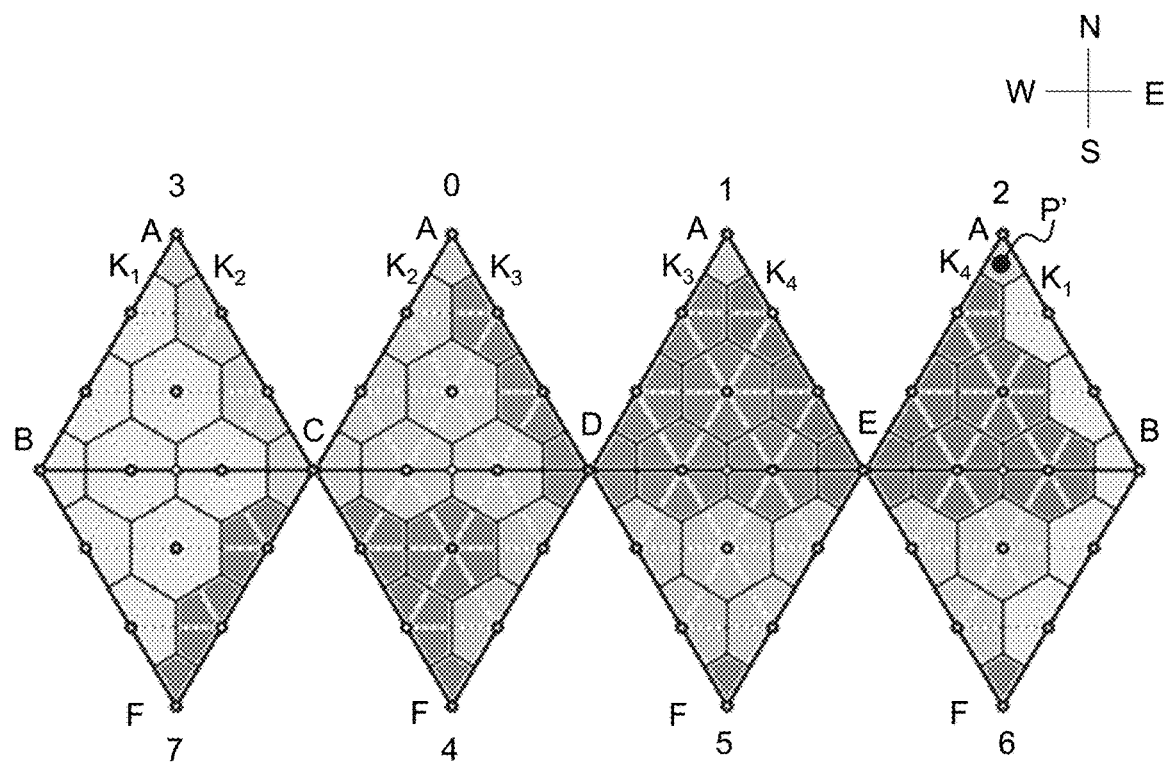
FIG. 7K

1000

Determining overlapped edge grids where a sub-area intersect with one or more edges of a plurality of partitions ~ 1010

Determine boundary grids of the sub-areas based on the overlapped edge grids and boundary grids of an enclosed area relating to two or more sub-areas ~ 1020

FIG. 10

SYSTEMS AND METHODS FOR IDENTIFYING GRIDS OF GEOGRAPHICAL REGION IN MAP

CROSS-REFERENCE TO RELATED APPLICATIONS

This application is a Continuation of International Application No. PCT/CN2018/090095, filed on Jun. 6, 2018, the entire contents of which are hereby incorporated by reference.

TECHNICAL FIELD

The present disclosure generally relates to graphic identification systems, and in particular, to systems and methods that responds to user's request to identify huge geographical regions.

BACKGROUND

Effectively determining grids in a geographical region is crucial for a number of state-of-the-art technologies, such as autonomous driving and Internet online to offline services, such as online taxi hailing services. The technology helps a user to quickly identify his/her grid in a map, thereby access corresponding information related to the grid. For example, with the grid identification technology, an online to offline platform may be able to obtain service demand information for the grids near a taxi driver, and accordingly provide service demand information to the taxi driver. For a tourist, the grid identification technology may help an online to offline service platform to identify the grids where the tourist locates, and thereby pushing point of interest (POI) or services (food or recreation services, or telecommunication base stations for the tourist's smartphone) to the tourist. In autonomous driving, the grid identification technology can help an autonomous vehicle to identify its grid based on its location, and thereby communicate with base stations for information communication. Sometimes the scale of the map to search the grid is too big, i.e., the number of the grids are too huge, quickly finding a grid becomes difficult. For example, when a route or the border of a geofence extends in a map of continental or intercontinental scale, the number of the grid in the map may become astronomical. Therefore, identifying the grids that the route or the geofence passes through may be difficult. This is especially true given that the grids in the world are indexed based on regional partitions, i.e., for different partitions in the world map, the indexes of grids therein are completely different. Therefore, when the route or geofence crosses one or more of the regional partitions, the workload to searching the corresponding grids may become particularly difficult. Thus, it is desirable to provide effective systems and methods for determining grids in the geographical region in the map.

SUMMARY

In one aspect of the present disclosure, an artificial intelligent system configured to identify grids for a geofence in an area in a map that includes a plurality of independently indexed regions of grids is provided. The artificial intelligent system may include at least one storage medium and at least one processor in communication with the at least one storage medium. The at least one storage medium may store the map and a set of instructions for identifying a geographical region. When executing the set of instructions, the at least one processor may be directed to load at least part of the map from the at least one storage medium to at least one cache circuit and generate a presentation of the at least part of the map. The map may be gridded into a plurality of grids and be divided into a plurality of partitions. Each grid of the plurality of grids in the map may be associated with a grid index, and grids in each partition may be independently indexed. The at least one processor may be also directed to obtain information of the geofence of the geographical region in the map and determine a boundary grid series of the geofence from the plurality of grids. The at least one processor may be further directed to identify at least one enclosed area in the geographical region based on the boundary grid series. Upon determining that an enclosed area of the at least one enclosed area crosses two or more partitions, the at least one processor may be directed to segment the enclosed area into two or more sub-areas so that each sub-area of the two or more sub-areas locates in only one partition of the plurality of partitions. The at least one processor may be also directed to determine boundary grids for each of the two or more sub-areas. For each of the two or more sub-areas, the at least one processor may be also directed to identify internal grids in the sub-area from the plurality of grids based on the boundary grids of the sub-area and an index of the partition in which the sub-area locates. The at least one processor may be further directed to identify grids in the geographical region by collecting the boundary grids of the two or more sub-areas and the internal grids in the two or more sub-areas.

In another aspect of the present disclosure, a method for identifying grids for a geofence in an area in a map that includes a plurality of independently indexed regions of grids is provided. The method may be implemented on a computing device having at least one storage medium storing a map and a set of instructions for identifying a geographical region, and at least one processor in communication with the at least one storage medium. The method may include loading at least part of the map from the at least one storage medium to at least one cache circuit and generate a presentation of the at least part of the map. The map may be gridded into a plurality of grids and be divided into a plurality of partitions. Each grid of the plurality of grids in the map may be associated with a grid index, and grids in each partition may be independently indexed. The method may also include obtaining information of the geofence of a geographical region in the map and determining a boundary grid series of the geofence from the plurality of grids. The method may further include identifying at least one enclosed area in the geographical region based on the boundary grid series. Upon determining that an enclosed area of the at least one enclosed area crosses two or more partitions, the method may include segmenting the enclosed area into two or more sub-areas so that each sub-area of the two or more sub-areas locates in only one partition of the plurality of partitions. The method may also include determining boundary grids for each of the two or more sub-areas. For each of the two or more sub-areas, the method may also include identifying internal grids in the sub-area from the plurality of grids based on the boundary grids of the sub-area and an index of the partition in which the sub-area locates. The method may further include identifying grids in the geographical region by collecting the boundary grids of the two or more sub-areas and the internal grids in the two or more sub-areas.

In another aspect of the present disclosure, a non-transitory computer readable medium is provided. The non-transitory computer readable medium may include at least one set of instructions for identifying a geographical region.

When executed by at least one processor, the at least one set of instructions may direct the at least one processor to perform acts of accessing a map from the at least one storage medium and generating a presentation of the map. The map may be gridded into a plurality of grids and be divided into a plurality of partitions. Each grid of the plurality of grids in the map may be associated with a grid index, and grids in each partition may be independently indexed. The at least one set of instructions may also direct the at least one processor to perform acts of obtaining information of a geofence of the geographical region in the map and determining a boundary grid series of the geofence from the plurality of grids. The at least one set of instructions may further direct the at least one processor to perform acts of identifying at least one enclosed area in the geographical region based on the boundary grid series. Upon determining that an enclosed area of the at least one enclosed area crosses two or more partitions, the at least one set of instructions may direct the at least one processor to perform acts of segmenting the enclosed area into two or more sub-areas so that each sub-area of the two or more sub-areas locates in only one partition of the plurality of partitions. The at least one set of instructions may also direct the at least one processor to perform acts of determining boundary grids for each of the two or more sub-areas. For each of the two or more sub-areas, the at least one set of instructions may also direct the at least one processor to perform acts of identifying internal grids in the sub-area from the plurality of grids based on the boundary grids of the sub-area and an index of the partition in which the sub-area locates. The at least one set of instructions may further direct the at least one processor to perform acts of identifying grids in the geographical region by collecting the boundary grids of the two or more sub-areas and the internal grids in the two or more sub-areas.

In another aspect of the present disclosure, an artificial intelligent system configured to identify grids for a geofence in an area in a map is provided. The map may include a plurality of independently indexed regions of grids. The artificial intelligent system may include at least one geofence identification server installed a first application for identifying grids for a geofence, and at least one user terminal remote to the geofence identification server and installed a second application. When the at least one user terminal may operate the second application, the at least one user terminal may be directed to establish a wired or wireless communication with the geofence identification server through the first application. The at least one user terminal may also be directed to receive a shape of a geofence from a user of the at least one user terminal and send the shape of the geofence to the at least one geofence identification server via the wired or wireless communication. The artificial intelligent system may also include at least one storage medium in communication with the at least one geofence identification server, storing a map and a set of instructions for identifying a geographical region. When executing the set of instructions, the at least one geofence identification server may be directed to load at least part of the map from the at least one storage medium to at least one cache circuit and generate a presentation of the at least part of the map. The map may be gridded into a plurality of grids and be divided into a plurality of partitions. Each grid of the plurality of grids in the map may be associated with a grid index, and grids in each partition may be independently indexed. The at least one geofence identification server may be also directed to obtain information of the geofence of the geographical region in the map and determine a boundary grid series of the geofence from the plurality of grids. The at least one geofence identification server may be further directed to identify at least one enclosed area in the geographical region based on the boundary grid series. Upon determining that an enclosed area of the at least one enclosed area crosses two or more partitions, the at least one geofence identification server may be directed to segment the enclosed area into two or more sub-areas so that each sub-area of the two or more sub-areas locates in only one partition of the plurality of partitions. The at least one geofence identification server may be also directed to determine boundary grids for each of the two or more sub-areas. For each of the two or more sub-areas, the at least one geofence identification server may be also directed to identify internal grids in the sub-area from the plurality of grids based on the boundary grids of the sub-area and an index of the partition in which the sub-area locates. The at least one geofence identification server may be further directed to identify grids in the geographical region by collecting the boundary grids of the two or more sub-areas and the internal grids in the two or more sub-areas. The at least one geofence identification server may be further directed to send signal including information of the grids in the geographical region to the at least one user terminal and generate a presentation of the grids in the geographical region on the at least one user terminal.

In some embodiments, the information of the geofence may include a set of coordinate pairs corresponding to a plurality of boundary points. To determine the boundary grid series of the geofence, the at least one processor may be further directed to identify the boundary grid series corresponding to the plurality of boundary points from the plurality of grids. The at least one processor may be further directed to conduct one or more operations including: obtain two adjacent boundary points from the plurality of boundary points; determining whether the two adjacent boundary points correspond to a same grid; in response to a determination that the two adjacent boundary points correspond to a same grid, removing one of the two adjacent points; in response to a determination that the two adjacent boundary points correspond to two different grids, interpolate a boundary point between the two adjacent boundary points; and updating the boundary grid series corresponding to the plurality of boundary points.

In some embodiments, the boundary grid series may include grids from the plurality of grids of the map that the geofence passes through. To identify the at least one enclosed area, the at least one processor may be further directed to determine whether the boundary grid series includes one or more pivot grids, wherein a pivot grid corresponds to at least two same grid indices. In response to a determination that the boundary grid series includes one or more pivot grids, for each of the one or more pivot grids, the at least one processor may be directed to identify an area in the geographical region on one side of the pivot grid as a first enclosed area and an area in the geographical region on the other side of the pivot grid as a second enclosed area different from the first enclosed area.

In some embodiments, to identify the at least one enclosed area, the at least one processor may be further directed to generate an empty stack and an empty auxiliary map. For each grid of the boundary grid series, the at least one processor may be directed to sequentially obtain a grid from the boundary grid series and determine whether a grid index corresponding to the grid is in the auxiliary map. In response to a determination that the grid index is not in the auxiliary map, the at least one processor may be directed to push the grid index in the stack and input the grid index in the auxiliary map. In response to a determination that the grid index is in the auxiliary map, the at least one processor may be directed to designate the grid corresponding to the grid index as a pivot grid of the one or more pivot grids, designate the grid index as a pivot grid index, pop grid indices that are in the stack from the stack until the grid index in the top of the stack is the same as the pivot grid index, and designate girds corresponding to the popped grid indices as boundary grids of the first enclosed area. The at least one processor may be further directed to designate grids corresponding to grid indices remaining in the stack as boundary grids of the second enclosed area.

In some embodiments, the geofence may be determined based on a circle defined by a center and a radius. To identify the at least one enclosed area in the geographical region, the at least one processor may be further directed to sample a plurality of sample points on the circle with a predetermined sample interval and determine boundary grids of the at least one enclosed area in the geographical region based on the plurality of sample points.

In some embodiments, the predetermined sample interval may be associated with the radius of the circle and a resolution relating to a grid of the plurality of grids.

In some embodiments, the at least one processor may be further directed to upon determining that two or more sample points of the plurality of sample points correspond to a same grid, remove one or more sample points from the two or more sample points so that there is only one sample point corresponding to the grid.

In some embodiments, after the segmenting of the at least one enclosed area into two or more sub-areas, the at least one processor may be directed to determine overlapped edge grids where the two or more sub-areas intersect with one or more edges of the plurality of partitions and add the overlapped edge grids to the two or more sub-areas as boundary grids of the two or more sub-areas.

In some embodiments, to identify internal grids in the sub-area from the plurality of grids, the at least one processor may be directed to initialize a scanning matrix. The scanning matrix may include a plurality of cells, and each cell of the scanning matrix may have a first value. The at least one processor may be directed to perform a first updating on the scanning matrix by filling a second value to each of a first plurality of cells of the scanning matrix. The first plurality of cells may correspond to the boundary grids of the sub-area. For each cell of the scanning matrix after the first updating that has the first value, the at least one processor may be directed to determine whether the grid corresponding to the cell is in the geographical region. In response to a determination that the grid corresponding to the cell is in the geographical region, the at least one processor may be further directed to perform a second updating on the scanning matrix by filling a third value to the cell of the scanning matrix. The at least one processor may be further directed to designate grids corresponding to the cells with the third value as the internal grids in the sub-area.

In some embodiments, the second value and the third value may be the same as each other.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 5 is a flowchart illustrating an exemplary process for determining grids in a geographical region according to some embodiments of the present disclosure;

FIG. 7I is a schematic diagram illustrating a target center point in a hexagon-shaped grid according to some embodiments of the present disclosure;

FIG. 7J is a schematic diagram illustrating a target common point in a rhombus-shaped grid according to some embodiments of the present disclosure;

FIG. 7K is a schematic diagram illustrating the ascription of a target center point of a crossover grid according to some embodiments of the present disclosure;

FIG. 10 is a flowchart illustrating an exemplary process for determining boundary grids of sub-areas according to some embodiments of the present disclosure;

DETAILED DESCRIPTION

Figure 1:
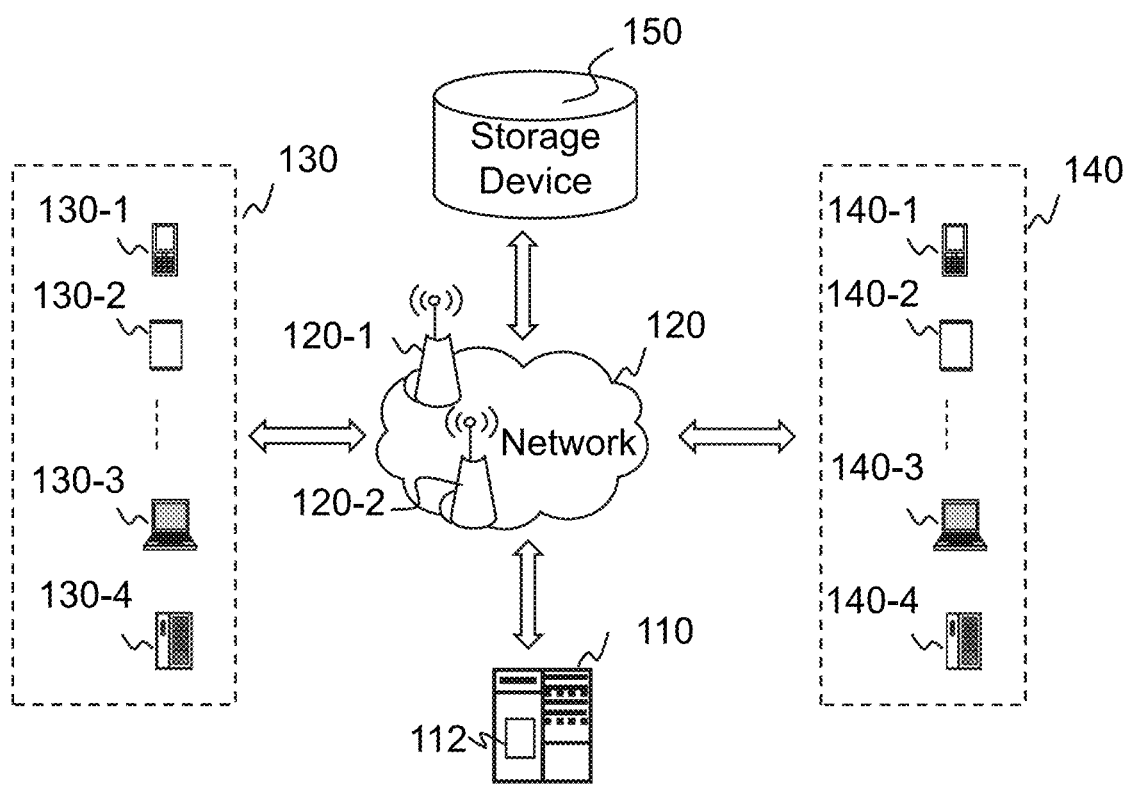
FIG. 1 is a block diagram of an exemplary artificial intelligence system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order or simultaneously. Moreover, one or more other operations may be added to the flowcharts. One or more operations may be removed from the flowcharts.

Moreover, while the systems and methods disclosed in the present disclosure are described primarily regarding identifying grids of an area, it should also be understood that this is only one exemplary embodiment. The system or method of the present disclosure may be applied to user of any other kind of online to offline service platform. For example, the system or method of the present disclosure may be applied to users in different transportation systems including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system that applies management and/or distribution, for example, a system for sending and/or receiving an express. The application scenarios of the system or method of the present disclosure may include a webpage, a plug-in of a browser, a client terminal, a custom system, an internal analysis system, an artificial intelligence robot, or the like, or any combination thereof.

The service starting points in the present disclosure may be acquired by a positioning technology embedded in a wireless device (e.g., the passenger terminal, the driver terminal, etc.). The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (Wi-Fi) positioning technology, or the like, or any combination thereof. One or more of the above positioning technologies may be used interchangeably in the present disclosure. For example, the GPS-based method and the WiFi-based method may be used together as positioning technologies to locate the wireless device.

DGGS is a new global modeling solution that uses a specific method to divide the world into seamless, non-overlapping, multi-resolution hierarchical grid structures and to uniformly encode the grids in regions of the world. One may access the grids externally based on latitude and longitude coordinates ID of these grids and, according to the grid ID, access to the grids' vertex and center coordinates and other interfaces. Identifying a grid is important because it helps aggregating and processing data from the area of the grid, which can better reflect the commercial operation status of the area. For example, with the data of how a taxi order of one day in Haidian District of Beijing aggregates, an online taxi hailing platform can provide more elaborate transportation services to the Haidian District. In addition, when searching within an area (such as an order that meets certain criteria), the area can be converted to a grid, and searching in the grid is more efficient.

An aspect of the present disclosure relates to artificial intelligence systems and/or methods with artificial intelligence for identifying grids in a geofence of a geographical region in a map. To this end, the artificial intelligence system may first receive a request from a user device, including information relating to the geofence of the geographical region. When the geographical region includes two or more enclosed areas, for each enclosed area, the artificial intelligence system may determine whether the enclosed area crosses two or more independent grid indexing partitions. If the enclosed area does cross two or more partitions, the artificial intelligence system may then segment the enclosed area into two or more sub-areas so that each sub-area locates in only one partition and identify girds in each of the sub-areas. At last, the artificial intelligence system may collect all the girds in the sub-areas as the final grids to be determined. Since the girds on a same partition are associated with a same partition index, it will be easy to determine the relative positions of the grids on the same partition. Accordingly, the artificial intelligence system may collect data relating to the girds of all the sub-areas to make a decision.

The artificial intelligence systems and methods in the present disclosure takes responding to a request of an online to offline service to identify grids for a geofence as an example. However, they are also able to be applied in other shape and/or boundary identification scenarios, such as snap the boundary of a shape to grids operation when the grids are not indexed under a single indexing system.

It should be noted that the present solution relies on collecting data (e.g., location information) relating to a user terminal (e.g., a passenger terminal, a driver terminal) registered with an artificial intelligence system, which is a new form of data collecting means rooted only in post-Internet era. It provides detailed information of a user terminal that could raise only in post-Internet era. In pre-Internet era, GPS is not available and it is impossible to obtain millions of thousands of user terminals' locations in real-time and/or substantially real-time. The online to offline service, however, allows the artificial intelligence system to monitor millions of thousands of user terminals' locations in real-time and/or substantially real-time using GPS, and then provide better service scheme based on the locations of the user terminals. Therefore, the present solution is deeply rooted in and aimed to solve a problem only occurred in post-Internet era.

FIG. 1 is a block diagram of an exemplary artificial intelligence system configured to identify grids for a geofence in an area in a map that includes a plurality of independently indexed regions of grids, according to some embodiments of the present disclosure. For example, the artificial intelligence system 100 may be an online transportation service platform for transportation services such as autonomous navigation service, high speed train communication service, taxi hailing service, chauffeur service, express car service, carpool service, vehicle schedule service, bus service, driver hire, and shuttle service. The artificial intelligence system 100 may include a server 110, a network 120, a passenger terminal 130, a driver terminal 140, and a storage device 150. The server 110 may include a processing engine 112.

During operation, one or more components of the artificial intelligence system 100, such as the passenger terminal 130, the driver terminal 140, the storage 150, other component of the server 110, may install an application configured to communicate (e.g., via wired or wireless communication) and operate the methods disclosed in the present disclosure, such as sending requests to identify a geographical region to the server 110. The user may determine a shape of a geofence of the geographical region. For example, through the application, a user may draw a circle or a line across a region on a touch screen of his/her smartphone in communication with the server 110 and wish to identify grids that the line crosses or the circle encloses. As another example, the user may input some points (e.g., input coordinate pairs of some points, or set a circle defined by a center and a radius) through his/her smartphone and wish to identify grids that a region defined by the points or the circle encloses. In responding to the operation of the user, the smartphone may send wireless signal to the server 110 via a network (e.g., the network 120) encoding or including the service request. The server 110 may also install an application (same as or different from the application installed in the one or more components of the artificial intelligence system 100) configured to process information and/or data relating to the service request. For example, the server 110 may identify grids in the geographical region based on the circle or line information obtained from the one or more components of the artificial intelligence system 100 (e.g., the passenger terminal 130, the driver terminal 140, the storage device 150, other component of the server 110). Then the server 110 may send signals encoding or including the grids information back to the smartphone of the user. The signals, after received by the smartphone, may render the smartphone to respond with further operations with respect to the grids. For example, the smartphone may display one or more of the grids on its screen, further request POI information in one or more of the grids, or send communication request to wireless stations in the one or more grids, etc.

In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in the passenger terminal 130, the driver terminal 140, and/or the storage device 150 via the network 120. As another example, the server 110 may be directly connected to the passenger terminal 130, the driver terminal 140, and/or the storage device 150 to access information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device having one or more components illustrated in FIG. 2 in the present disclosure.

In some embodiments, the server 110 may include a processing engine 112. The processing engine 112 may process information and/or data relating to the service request to perform one or more functions of the server 110 described in the present disclosure. For example, the processing engine 112 may access a map from at least one storage medium and obtain information of a geofence of a geographical region in the map. The information of the geofence may include a set of coordinate pairs corresponding to a plurality of boundary points, or a center and a radius of the geographical region. As another example, the processing engine 112 may identify grids in the geographical region based on the information of the geofence. As still another example, the processing engine 112 may extract information relating to the identified grids for further processing, for example, vehicle schedule. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the artificial intelligence system 100 (e.g., the server 110, the passenger terminal 130, the driver terminal 140, and/or the storage device 150) may transmit information and/or data to other component(s) in the artificial intelligence system 100 via the network 120. For example, the server 110 may obtain/acquire service request data from the passenger terminal 130 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra-wide band (UWB) network, an infrared ray, or the like, or any combination thereof. In some embodiments, the server 110 may include one or more network access points. For example, the server 110 may include wired or wireless network access points such as base stations and/or internet exchange points 120-1, 120-2, . . . , through which one or more components of the artificial intelligence system 100 may be connected to the network 120 to exchange data and/or information.

The passenger terminal 130 may be used by a passenger to request an online to offline service. The online to offline service may include an on-demand transportation service. For example, a user of the passenger terminal 130 may use the passenger terminal 130 to transmit a service request for himself/herself or another user, or receive service and/or information or instructions from the server 110. The driver terminal 140 may be used by a driver to reply an online to offline service. For example, a user of the driver terminal 140 may use the driver terminal 140 to receive a service request from the passenger terminal 130, and/or information or instructions from the server 110. In some embodiments, the term "user" and "passenger terminal" may be used interchangeably, and the term "user" and the "driver terminal" may be used interchangeably.

In some embodiments, the passenger terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, built-in device in the motor vehicle 130-4 may include an onboard computer, an onboard television, etc. In some embodiments, the passenger terminal 130 may be a wireless device with positioning technology for locating the position of the user and/or the passenger terminal 130.

In some embodiments, the driver terminal 140 may include a mobile device 140-1, a tablet computer 140-2, a laptop computer 140-3, a built-in device in a motor vehicle 140-4, or the like, or any combination thereof. In some embodiments, the mobile device 140-1 may include a smart home device, a wearable device, a smart mobile device, a virtual reality device, an augmented reality device, or the like, or any combination thereof. In some embodiments, the driver terminal 140 may be similar to, or the same device as the passenger terminal 130. In some embodiments, the driver terminal 140 may be a wireless device with positioning technology for locating the position of the driver and/or the driver terminal 140. In some embodiments, the passenger terminal 130 and/or the driver terminal 140 may communicate with other positioning device to determine the position of the passenger, the passenger terminal 130, the driver, and/or the driver terminal 140. In some embodiments, the passenger terminal 130 and/or the driver terminal 140 may transmit positioning information to the server 110.

The storage device 150 may store data and/or instructions. In some embodiments, the storage device 150 may store data obtained/acquired from the passenger terminal 130 and/or the driver terminal 140. In some embodiments, the storage device 150 may store data and/or instructions that the server 110 may execute or use to perform exemplary methods described in the present disclosure. In some embodiments, the storage device 150 may include a mass storage device, a removable storage device, a volatile read-and-write memory, a read-only memory (ROM), or the like, or any combination thereof. Exemplary mass storage device may include a magnetic disk, an optical disk, a solid-state drive, etc. Exemplary removable storage device may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components in the artificial intelligence system 100 (e.g., the server 110, the passenger terminal 130, the driver terminal 140, etc.). One or more components in the artificial intelligence system 100 may access the data or instructions stored in the storage device 150 via the network 120. In some embodiments, the storage device 150 may be directly connected to or communicate with one or more components in the artificial intelligence system 100 (e.g., the server 110, the passenger terminal 130, the driver terminal 140, etc.). In some embodiments, the storage device 150 may be part of the server 110.

In some embodiments, one or more components in the artificial intelligence system 100 (e.g., the server 110, the passenger terminal 130, the driver terminal 140, etc.) may have a permission to access the storage device 150. In some embodiments, one or more components in the artificial intelligence system 100 may read and/or modify information related to the passenger, driver, and/or the public when one or more conditions are met. For example, the server 110 may read and/or modify one or more users' information after a service. As another example, the driver terminal 140 may access information related to the passenger when receiving a service request from the passenger terminal 130, but the driver terminal 140 may not modify the relevant information of the passenger.

In some embodiments, information exchanging of one or more components in the artificial intelligence system 100 may be achieved by way of requesting a service. The object of the service request may be any product. In some embodiments, the product may be a tangible product, or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

One of ordinary skill in the art would understand that when an element of the artificial intelligence system 100 performs, the element may perform through electrical signals and/or electromagnetic signals. For example, when a passenger terminal 130 processes a task, such as entering information related to a geofence (e.g., a set of coordinate pairs) of a geographical region, the passenger terminal 130 may operate logic circuits in its processor to perform such task. When the passenger terminal 130 transmits out a service request to the server 110, a processor of the server 110 may generate electrical signals encoding the request. The processor of the server 110 may then transmit the electrical signals to an output port. If the passenger terminal 130 communicates with the server 110 via a wired network, the output port may be physically connected to a cable, which further transmit the electrical signal to an input port of the server 110. If the passenger terminal 130 communicates with the server 110 via a wireless network, the output port of the service requester terminal 130 may be one or more antennas, which convert the electrical signal to electromagnetic signal. Similarly, a driver terminal 140 may process a task through operation of logic circuits in its processor, and receive an instruction and/or service request from the server 110 via electrical signal or electromagnet signals. Within an electronic device, such as the passenger terminal 130, the driver terminal 140, and/or the server 110, when a processor thereof processes an instruction, transmits out an instruction, and/or performs an action, the instruction and/or action is conducted via electrical signals. For example, when the processor retrieves or saves data from a storage medium, it may transmit out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
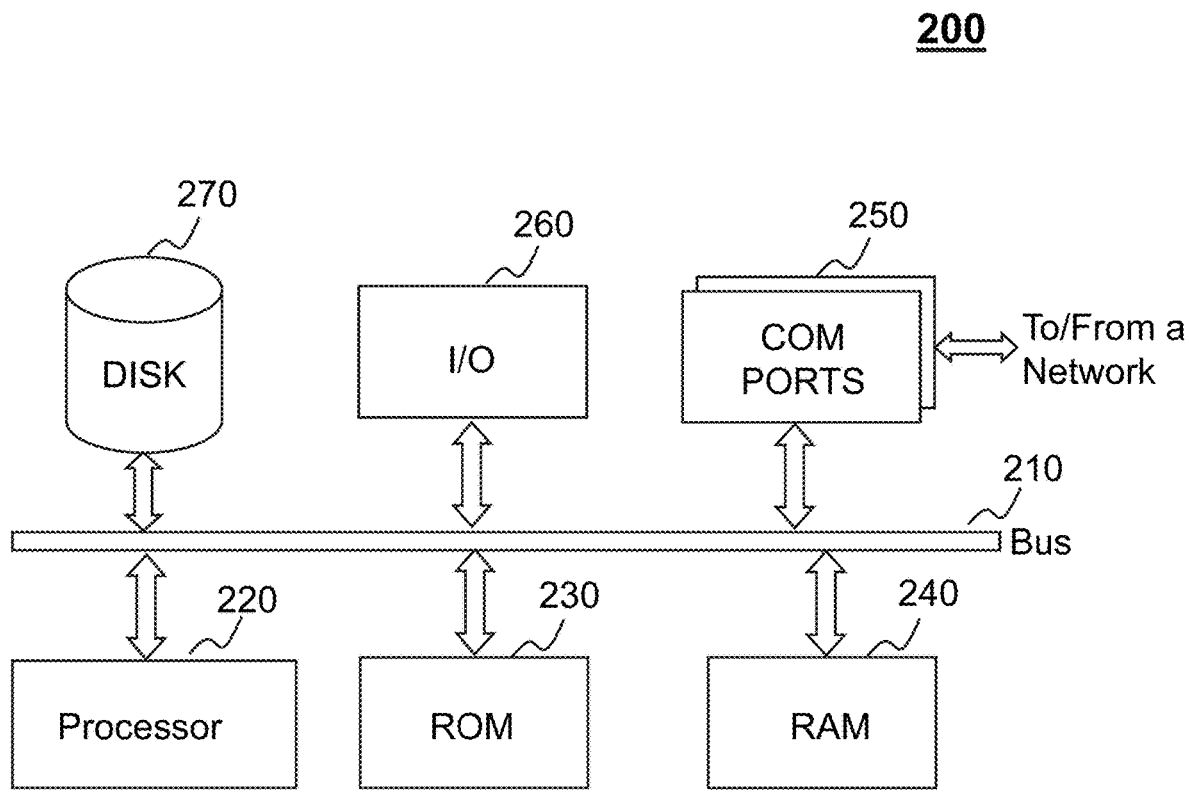
FIG. 2 is a schematic diagram illustrating exemplary hardware and/or software components of an exemplary computing device according to some embodiments of the present disclosure.

FIG. 2 is a schematic diagram illustrating exemplary hardware and software components of a computing device on which the server 110, the passenger terminal 130, and/or the driver terminal 140 may be implemented according to some embodiments of the present disclosure. For example, the processing engine 112 may be implemented on the computing device 200 and configured to perform functions of the processing engine 112 disclosed in the present disclosure.

The computing device 200 may be used to implement an online to offline system for the present disclosure. The computing device 200 may implement any component of the online to offline service as described herein. In FIG. 2, only one such computer device is shown purely for convenience purposes. One of ordinary skill in the art would understood at the time of filing of this application that the computer functions relating to the online to offline service as described herein may be implemented in a distributed fashion on a number of similar platforms, to distribute the processing load.

The computing device 200, for example, may include COM ports 250 connected to and from a network connected thereto to facilitate data communications. The computing device 200 may also include a central processor 220, in the form of one or more processors, for executing program instructions. The exemplary computer platform may include an internal communication bus 210, a program storage device and a data storage device of different forms, for example, a disk 270, and a read only memory (ROM) 230, or a random access memory (RAM) 240, for various data files to be processed and/or transmitted by the computer. The exemplary computer platform may also include program instructions stored in the ROM 230, the RAM 240, and/or other type of non-transitory storage medium to be executed by the processor 220. The methods and/or processes of the present disclosure may be implemented as the program instructions. The computing device 200 may also include an I/O component 260, supporting input/output between the computer and other components therein. The computing device 200 may also receive programming and data via network communications.

Merely for illustration, only one processor 220 is described in the computing device 200. However, it should be noted that the computing device 200 in the present disclosure may also include multiple processors, thus operations and/or method steps that are performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
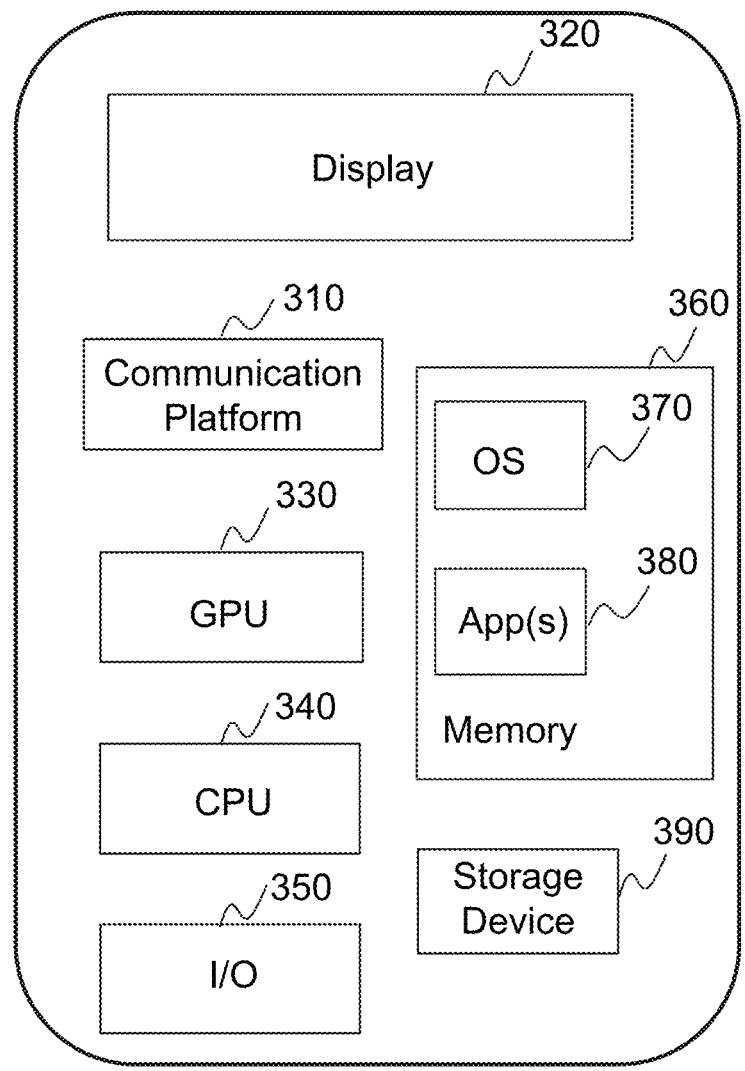
FIG. 3 is a schematic diagram illustrating an exemplary device according to some embodiments of the present disclosure.

FIG. 3 is a schematic diagram illustrating exemplary hardware and/or software components of an exemplary device on which the passenger terminal 130 and/or the driver terminal 140 may be implemented according to some embodiments of the present disclosure. The device may be a mobile device, such as a mobile phone of a passenger or a driver. The device may also be an electronic device mounted on a vehicle driving by the driver. As illustrated in FIG. 3, the device 300 may include a communication platform 310, a display 320, a graphic processing unit (GPU) 330, a central processing unit (CPU) 340, an I/O 350, a memory 360, and a storage device 390. In some embodiments, any other suitable component, including but not limited to a system bus or a controller (not shown), may also be included in the device 300. In some embodiments, a mobile operating system 370 (e.g., iOS™, Android™, Windows Phone™, etc.) and one or more applications 380 may be loaded into the memory 360 from the storage device 390 in order to be executed by the CPU 340. The applications 380 may include a browser or any other suitable mobile apps for receiving and rendering information relating to an online to offline service or other information from the server 110, and transmitting information relating to an online to offline service or other information to the server 110. User interactions with the information stream may be achieved via the I/O 350 and provided to the server 110 and/or other components of the artificial intelligence system 100 via the network 120. In some embodiments, the device 300 may include a device for capturing speech information, such as a microphone 315.

Figure 4A:
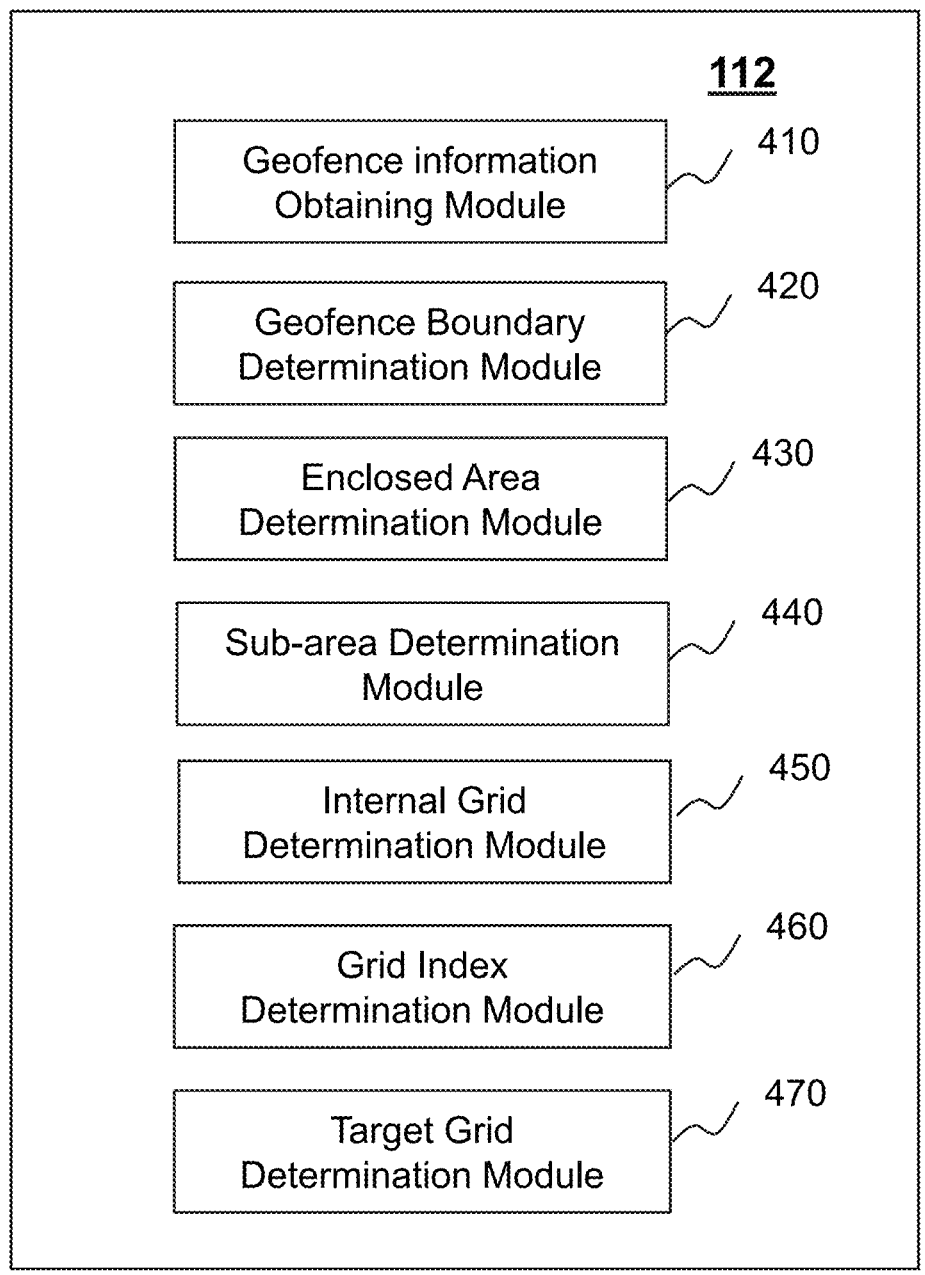
FIG. 4A is a block diagram illustrating an exemplary processing engine according to some embodiments of the present disclosure.

FIG. 4A is a block diagram illustrating an exemplary processing engine for identifying grids in a geographical region according to some embodiments of the present disclosure. The processing engine 112 may be in communication with a storage device (e.g., the storage device 150, the passenger terminal 130, or the driver terminal 140), and may execute instructions stored in the storage device. In some embodiments, the processing engine 112 may include a geofence information obtaining module 410, a geofence boundary determination module 420, an enclosed area determination module 430, a sub-area determination module 440, an internal grid determination module 450, a grid index determination module 460, and a target grid determination module 470.

The geofence information obtaining module 410 may be configured to obtain information of a geofence of a geographical region in a map. In some embodiments, the geofence information obtaining module 410 may obtain information of the geofence from one or more components of the artificial intelligence system 100 (e.g., the passenger terminal 130, the provider terminal 140, the server 110, the storage device 150). In some embodiments, the geofence may be determined based on a set of coordinate pairs in the geographical coordinate system. Each coordinate pair may include a longitude and a latitude. Each coordinate pair may relate to a boundary point of the geofence. The geofence information obtaining module 410 may obtain the set of coordinate pairs relating to the geofence simultaneously or in order. Alternatively or additionally, the geofence may be determined based on a circle defined by a center and a radius. The center may correspond to a coordinate pair that includes a longitude and a latitude. The radius may correspond to a length, for example, several meters, tens of meters, hundreds of meters, etc.

The geofence boundary determination module 420 may be configured to determine a boundary grid series of a geofence from a plurality of grids of the map. In some embodiments, the boundary grid series may be represented as a one-dimensional vector. The boundary grid series of the geofence may include a set of boundary grids which are passed through by the geofence. In some embodiments, there are one or more pivot grids in the boundary grid series of the geofence. A pivot grid may appear two or more times in the boundary grid series. The number of times that one pivot grid appears may be the same as the number of times that the geofence passes through the pivot grid. In some embodiments, there is no pivot grid in the boundary grid series.

The enclosed area determination module 430 may be configured to identify at least one enclosed area in a geographical region. In some embodiments, the geographical region surrounded by the geofence may include one or more enclosed area. Each enclosed area may refer to an area that is included in the geographical region, and surrounded by a series of boundary grids in a boundary grid series (the finial boundary grid series) of the geofence. The enclosed area determination module 430 may identify the at least one enclosed area in the geographical region based on the boundary grid series of the geofence.

The sub-area determination module 440 may be configured to segment an enclosed area into two or more sub-areas. In some embodiments, upon determining that an enclosed area crosses two or more partitions, the sub-area determination module 440 may segment the enclosed area into two or more sub-areas. After the segmentation, each sub-area of the two or more sub-areas may locate in only one partition. The sub-area determination module 440 may also be configured to determine boundary grids for each of the two or more sub-areas. In some embodiments, the sub-area determination module 440 may determine overlapped edge grids where the two or more sub-areas intersect with one or more edges of the plurality of partitions. The sub-area determination module 440 may further add the overlapped edge grids to the two or more sub-areas as boundary grids of the two or more sub-areas.

The internal grid determination module 450 may be configured to identify internal grids in a sub-area from the plurality of grids of the map based on the boundary grids of the sub-area and an index of the partition in which the sub-area locates. The internal grids in the sub-area may refer to grids that are surrounded by the boundary grids of the sub-area. In some embodiments, the internal grid determination module 450 may determine the internal grids in the sub-area using a ray method.

The grid index determination module 460 may be configured to determine an index of a grid corresponding to a geographical location. The grid index determination module 460 may first obtain a coordinate pair in the geographical coordinate system corresponding to a geographical location. The geographical location may relate to a particular grid. Then, the grid index determination module 460 may transform the coordinate pair into a projection coordinate in the projection coordinate system. At last, the grid index determination module 460 may determine a grid index of the particular grid.

The target grid determination module 470 may be configured to identify grids in a geographical region (also referred to herein as target grids of the geographical region). In some embodiments, for each sub-area, the target grid determination module 470 may designate the internal grids in the sub-area and the boundary grids of the sub-area as target grids corresponding to the sub-area. The target grid determination module 470 may determine the target grids of the geographical region by collecting all the target grids corresponding to each of the sub-areas in the geographical region.

It should be noted that the above description of the processing engine 112 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. In some embodiments, two or more of the modules may be combined into a single module. For example, the grid index determination module 460 may be integrated into the geofence boundary determination module 420. As another example, the internal grid determination module 450 may be integrated into the sub-area determination module 440. The sub-area determination module 440 may both determine boundary grids and internal boundary grids of a sub-area. In some embodiments, any one of the modules may be divided into two or more sub-modules. For example, the sub-area determination module 440 may be divided into a first sub-module and a second sub-module. The first sub-module may be configured to segment an enclosed area into two or more sub-areas so that each sub-area of the two or more sub-areas locates in only one partition. The second sub-module may be configured to determine boundary grids of a sub-area.

Figure 4B:
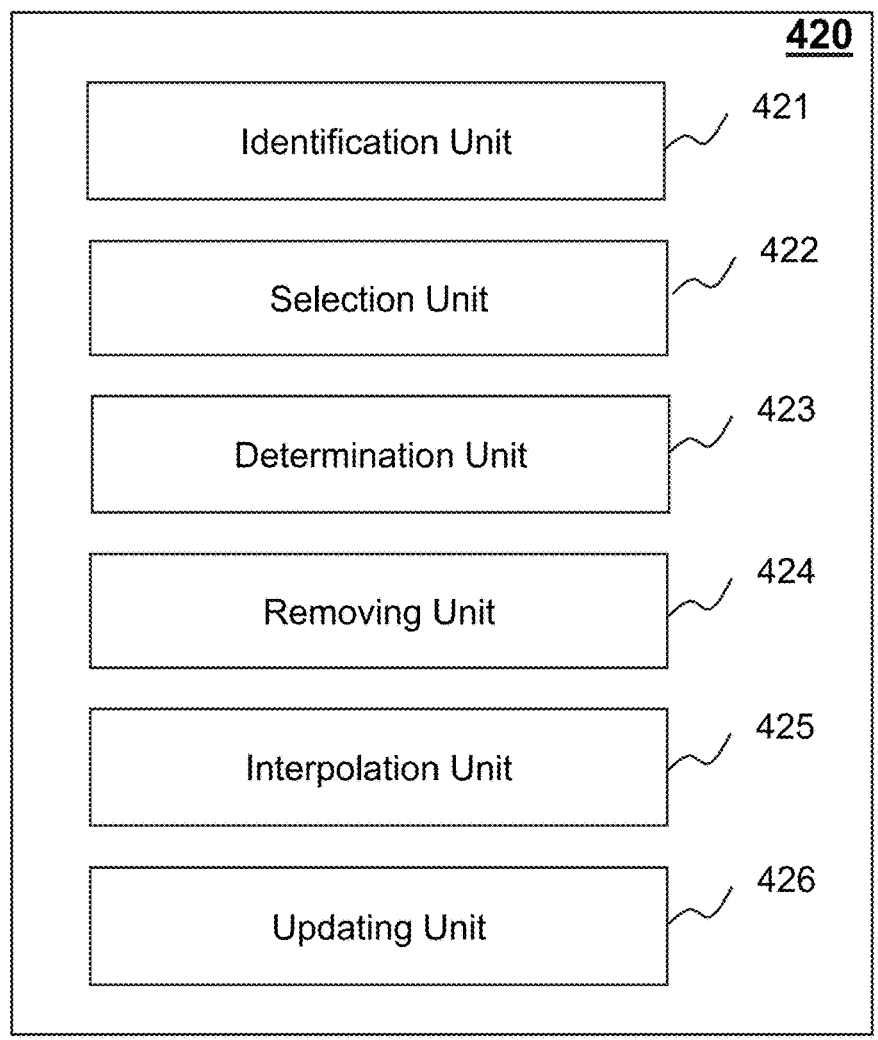
FIG. 4B is a block diagram illustrating an exemplary geofence boundary determination module according to some embodiments of the present disclosure.

FIG. 4B is a block diagram illustrating an exemplary geofence boundary determination module 420 according to some embodiments of the present disclosure. The geofence boundary determination module 420 may include an identification unit 421, a selection unit 422, a determination unit 423, a removing unit 424, an interpolation unit 425, and an updating unit 426.

The identification unit 421 may be configured to identify a boundary grid series (e.g., an initial boundary grid series) corresponding to a plurality of boundary points. In some embodiments, the initial boundary grid series may include a plurality of grids (also referred to herein as boundary grids). Each grid may correspond to a boundary point. The boundary point may be an arbitrary points in a grid, e.g., a center point of grid, a vertex of a grid, etc. In some embodiments, two or more boundary points may correspond to a same grid, so the initial boundary grid may include two or more same grids. In some embodiments, two grids corresponding to two adjacent boundary points may not be adjacent in the map (e.g., when connecting the two boundary points using a line segment, the line segment occupies more than two grids), so it is not complete to only use the boundary points to represent the geofence. Therefore, the initial boundary grid series may be updated to generate a finial boundary grid series so that all grids that are occupied by any two adjacent boundary points are included in the final boundary grid series.

The selection unit 422 may be configured to select two adjacent boundary points from the plurality of boundary points. The plurality of boundary points may be updated by interpolating or removing one or more points. The selected two adjacent boundary points may refer to any two adjacent points in the (updated) plurality of boundary points.

The determination unit 423 may be configured to determine whether two adjacent boundary points correspond to a same grid. For example, if the grid indices corresponding to the two adjacent boundary points are the same as each other, the determination unit 423 may determine that the two adjacent boundary points correspond to a same grid. As another example, if the grid indices corresponding to the two adjacent boundary points are different, the determination unit 423 may determine that the two adjacent boundary points correspond to two different grids.

The removing unit 424 may be configured to remove boundary points from a plurality of boundary points. Specifically, if two adjacent boundary points correspond to a same grid, the removing unit 424 may remove one of the two adjacent boundary points. The removed boundary point may be an arbitrary one of the two adjacent boundary points. In some embodiments, the removing unit 424 may remove one or more boundary points by traversing the plurality of boundary points.

The interpolation unit 425 may be configured to interpolate a point that is between two adjacent boundary points. In some embodiments, the interpolation unit 425 may select a point between the two adjacent boundary points. The selected point may be an arbitrary point between the two adjacent boundary points, e.g., the midpoint of the two adjacent boundary points, a point near one of the two adjacent boundary points, or any other point between the two adjacent boundary points. The interpolation unit 425 may also determine whether an interpolation condition is satisfied. The interpolation condition may be that a grid corresponding to the selected point is different from either of the grids corresponding to the two adjacent boundary points. When the interpolation condition is satisfied, the interpolation unit 425 may interpolate the selected point that is between the two adjacent boundary points and designate the selected point as a boundary point of the geofence. In some embodiments, the interpolation unit 425 may interpolate one or more boundary points by traversing the plurality of boundary points.

The updating unit 426 may be configured to update a boundary grid series. In some embodiments, the updating unit 426 may update the boundary grid series by removing one or more grids corresponding to one or more removed boundary points. In some embodiments, the updating unit 426 may update the boundary grid series by interpolating one or more grids corresponding to one or more interpolated boundary points. After the updating, a final boundary grid series may be determined.

Figure 4C:
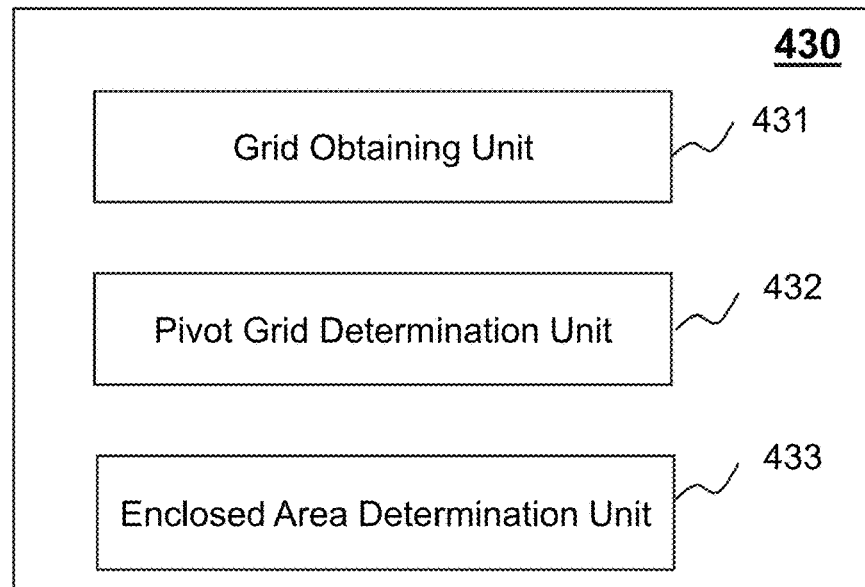
FIG. 4C is a block diagram illustrating an exemplary enclosed area determination module according to some embodiments of the present disclosure.

FIG. 4C is a block diagram illustrating an exemplary enclosed area determination module 430 according to some embodiments of the present disclosure. The enclosed area determination module 430 may include a grid obtaining unit 431, a pivot grid determination unit 432, and an enclosed area determination unit 433.

The grid obtaining unit 431 may be configured to obtain a boundary grid series relating to a geographical region. In some embodiments, the boundary grid series may include all the grids that the geofence passes through. The grids of the boundary grid series may be arranged in an order of being passed through by the geofence, and be sequentially numbered. Each grid may correspond to a unique sequence number. For example, if the number of grids in the boundary grid series is n, the sequence numbers of the grids may be marked as "1", "2", "3", . . . , "n", accordingly. In some embodiments, the grid obtaining unit 431 may sequentially obtain a grid in the boundary grid series, e.g., from the geofence boundary determination module 420 or a storage device (e.g., the storage device 150). Merely by way of example, the grid obtaining unit 431 may obtain a grid corresponding to sequence number 1, then obtain a grid corresponding to sequence number 2, . . . , and finally obtain a grid corresponding to sequence number n.

The pivot grid determination unit 432 may be configured to determine whether a boundary grid series includes one or more pivot grids. The pivot grid may refer to the grid that the geofence passes through two or more times, and a pivot grid may appear two or more times in the boundary grid series. In some embodiments, the pivot grid determination unit 432 may determine whether the boundary grid series includes two or more same grids using a search technique. For example, the pivot grid determination unit 432 may create a link list or a map for the grids of the boundary grid series based on the relative position of the grids, then the pivot grid determination unit 432 may determine whether the boundary grid series includes one or more pivot grids through searching the link list or the map.

The enclosed area determination unit 433 may be configured to determine one or more enclosed areas. In some embodiments, if a boundary grid series relating to a geographical region does not include a pivot grid, the enclosed area determination unit 433 may designate the geographical region as an enclosed area. Alternatively or additionally, if the boundary grid series relating to the geographical region includes one or more pivot grids, the enclosed area determination unit 433 may determine one or more enclosed areas based on the one or more pivot grids. For each pivot grid, the enclosed area determination unit 433 may identify an area in the geographical region on one side of the pivot grid as a first enclosed area and an area in the geographical region on the other side of the pivot grid as a second enclosed area. The number of the enclosed areas associated with a pivot grid may be determined based on the number of times of the pivot grid appearing in the boundary grid series.

Figure 4D:
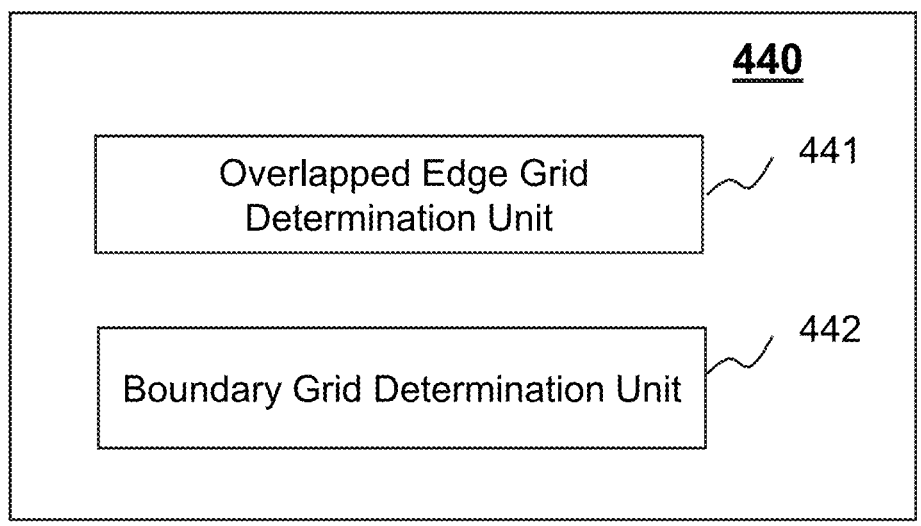
FIG. 4D is a block diagram illustrating an exemplary sub-area determination module according to some embodiments of the present disclosure.

FIG. 4D is a block diagram illustrating an exemplary sub-area determination module 440 according to some embodiments of the present disclosure. The sub-area determination module 440 may include an overlapped edge grid determination unit 441 and a boundary grid determination unit 442.

The overlapped edge grid determination unit 441 may be configured to determine overlapped edge grids where a sub-area intersects with one or more edges of a plurality of partitions. The overlapped edge grid determination unit 441 may determine one or more overlapped edge grids based on the boundary grids of the sub-area on the edge.

The boundary grid determination unit 442 may be configured to determine boundary grids of the sub-area. In some embodiments, for a sub-area, the boundary grid determination unit 442 may determine boundary grids of the sub-area based on the overlapped edge grids and boundary grids of an enclosed area relating to the sub-area (also referred to herein as initial boundary grids of the sub-area). Specifically, the boundary grid determination unit 442 may combine the initial boundary grids of the sub-area and the overlapped edge grids relating to the sub-area to determine the boundary grids (also referred to herein as final boundary grids) of the sub-area.

Figure 4E:
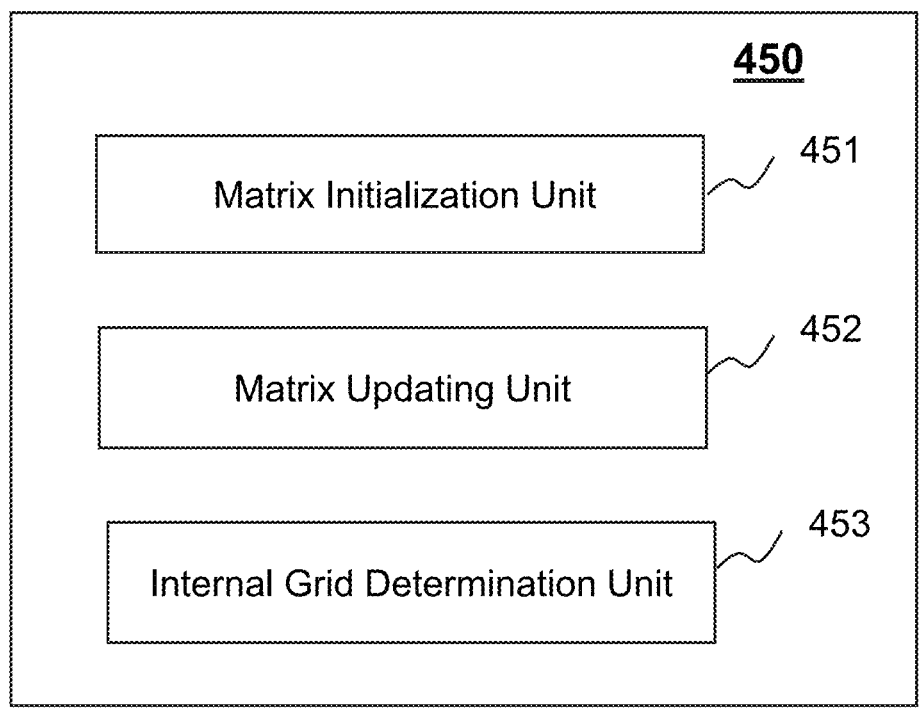
FIG. 4E is a block diagram illustrating an exemplary internal grid determination module according to some embodiments of the present disclosure.

FIG. 4E is a block diagram illustrating an exemplary internal grid determination module 450 according to some embodiments of the present disclosure. The internal grid determination module 450 may include a matrix initialization unit 451, a matrix updating unit 452, and an internal grid determination unit 453.

The matrix initialization unit 451 may be configured to initialize a matrix. The matrix may be a scanning matrix that including a plurality of cells. In some embodiments, the scanning matrix may be determined based on boundary grids of a sub-area. The matrix initialization unit 451 may initialize the scanning matrix by filling a first value to each cell of the scanning matrix. The first value filled in the scanning matrix may be in any format, for example, a number, a letter. In some embodiments, the first value may be zero.

The matrix updating unit 452 may be configured to perform one or more times of updating on a matrix (e.g., the scanning matrix). In some embodiments, the matrix updating unit 452 may perform a first updating on the scanning matrix by filling a second value to each of a first plurality of cells of the scanning matrix. The first plurality of cells may correspond to the boundary grids of the sub-area. The second value may be any value (or number) different from the first value, for example, 1. After the first updating, partial cells (e.g., the first plurality of cells) may have the second value, and partial cells may still have the first value. In some embodiments, if grids corresponding to cells that have the first value are in the geographical region, the corresponding cells may be referred to as a second plurality of cells of the scanning matrix. The matrix updating unit 452 may perform a second updating on the scanning matrix by filling a third value to the second plurality of cells of the scanning matrix. The third value may be any value (or number) other than the first value and the same as or different from the second value. For example, the third value may be 2.

The internal grid determination unit 453 may be configured to determine internal grids in a sub-area. For example, the internal grid determination unit 453 may designate grids corresponding to the cells with the third value as internal grids in the sub-area.

It should be noted that the above description of the internal grid determination module 450 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. In some embodiments, the internal grid determination module 450 may also include a cell determination unit (not shown in FIG. 4E). For a cell that has the first value, the cell determination unit may determine whether the grid corresponding to the cell is in the geographical region, and then determine the second plurality of cells of the scanning matrix.

Figure 4F:
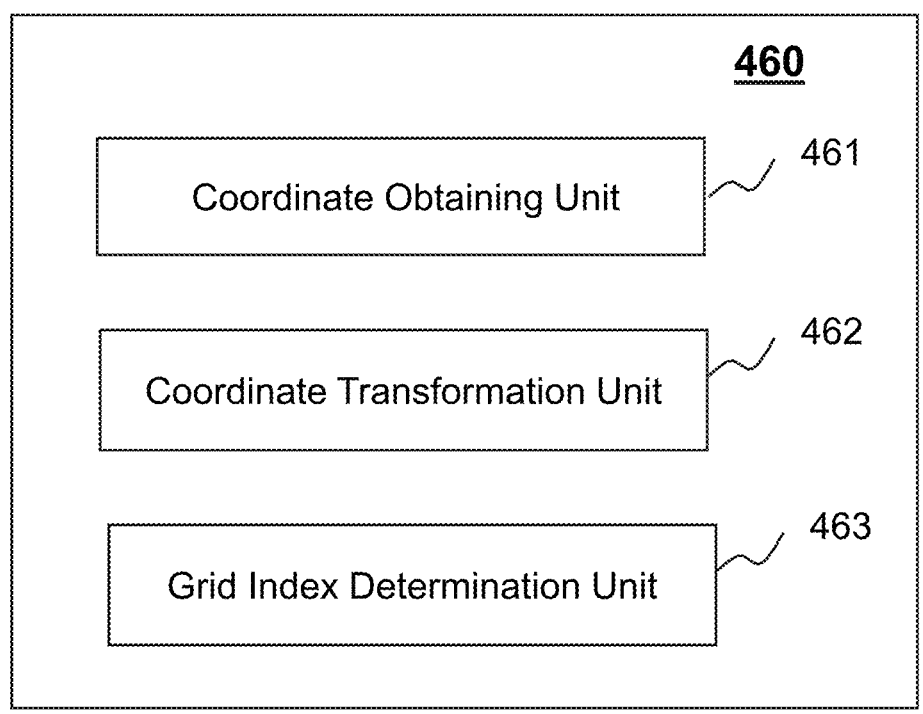
FIG. 4F is a block diagram illustrating an exemplary grid index determination module according to some embodiments of the present disclosure.

FIG. 4F is a block diagram illustrating an exemplary grid index determination module 460 according to some embodiments of the present disclosure. The grid index determination module 460 may include a coordinate obtaining unit 461, a coordinate transformation unit 462, and a grid index determination unit 463.

The coordinate obtaining unit 461 may be configured to obtain a coordinate pair. In some embodiments, the coordinate obtaining unit 461 may obtain the coordinate pair from one or more components of the artificial intelligence system 100 (e.g., the passenger terminal 130, the driver terminal 140, the server 110, the storage device 150, or other component of the server 110). The coordinate pair may be a geographical coordinate in a geographical coordinate system. In some embodiments, the coordinate pair may refer to a coordinate pair on the geofence (e.g., one of the set of coordinate pairs, the coordinate pair corresponding to a sample point). In some embodiments, the coordinate pair may refer to a coordinate pair corresponding to a geographical location of a user (e.g., a passenger, a driver).

The coordinate transformation unit 462 may be configured to transform a coordinate pair in the geographical coordinate system into a projection coordinate in a projection coordinate system. In some embodiments, the coordinate transformation unit 462 may determine the projection coordinate in the projection coordinate system based on one or more coordinate transformation operations. Specifically, the coordinate transformation unit 462 may first transform the coordinate pair to a spherical coordinate of a spherical coordinate system. Then, the coordinate transformation unit 462 may transform the spherical coordinate to a Cartesian coordinate. The coordinate transformation unit 462 may further transform the Cartesian coordinate to the projection coordinate in the projection coordinate system.

The grid index determination unit 463 may be configured to determine a grid index corresponding to the coordinate pair based on the projection coordinate. Specifically, the grid index determination unit 463 may determine the grid index corresponding to the coordinate pair based on a refinement level, the shape of a polyhedron relating to the DGGS, an index of the corresponding partition that the coordinate pair is in, and/or the projection coordinate of the corresponding grid (e.g., the second projection coordinate). In some embodiments, the grid index may be used to uniquely identify a grid on a partition in the map. The grid index may be represented as a combination of one or more numbers, one or more letters, one or more symbols, etc.

FIG. 5 is a flowchart illustrating an exemplary process for identifying grids in a geographical region of a map according to some embodiments of the present disclosure. In some embodiments, the process 500 may be implemented in the artificial intelligence system 100 as illustrated in FIG. 1. For example, the process 500 may be stored in the storage device 150 and/or other storage device (e.g., the ROM 230, the RAM 240) as a form of instructions, and invoked and/or executed by the server 110 (e.g., the processing engine 112 in the server 110, the processor 220 of the processing engine 112 in the server 110, the one or more modules of the processing engine 112 in the server 110). The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

Figure 13A:
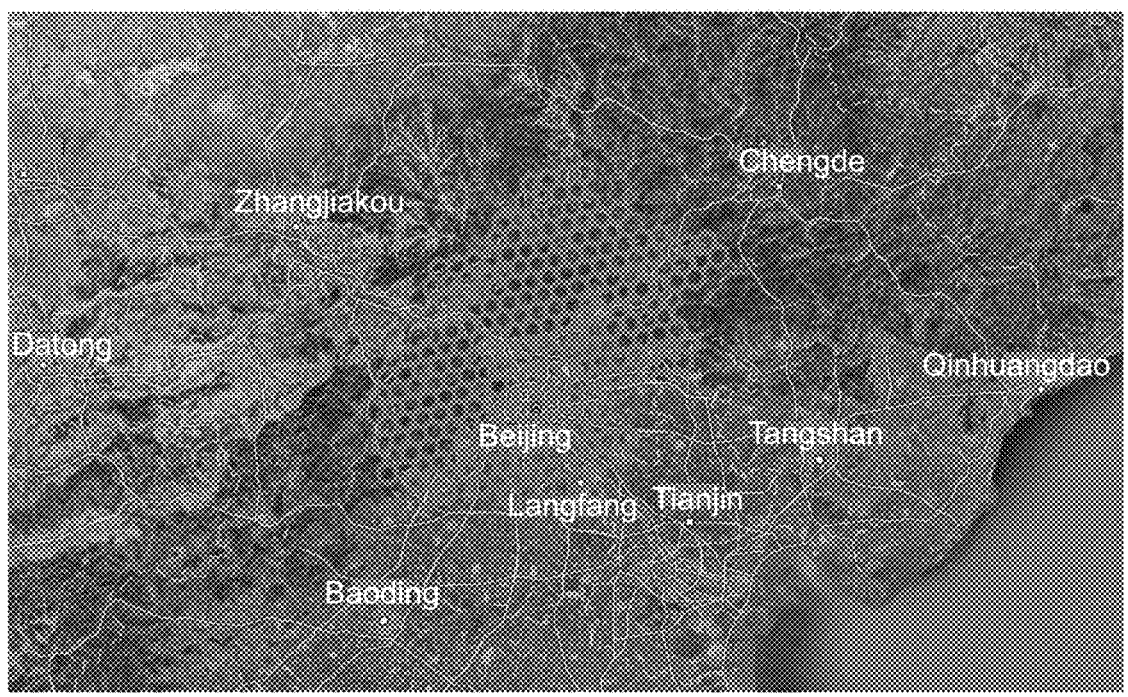
FIG. 13A is a schematic diagram illustrating grids in the geographical region of Beijing.
Figure 13B:
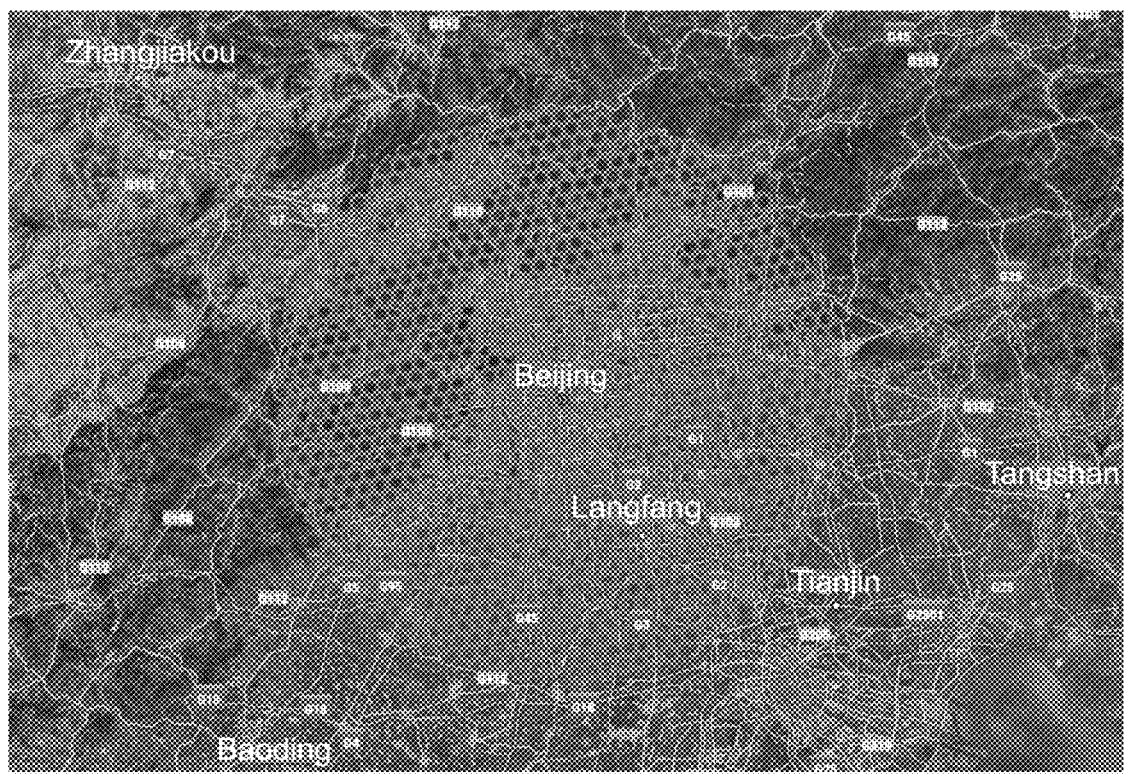
FIG. 13B is a schematic diagram illustrating a circular geographical region according to some embodiments of the present disclosure.

The geographical region may be a country, a province, a state, a city, or a particular region on the earth. To obtain information relating to the geographical region, the processing engine 112 may first determine grids in the geographical region. For example, to obtain information relating to Beijing, the processing engine 112 may first identify all of grids relating to Beijing. FIG. 13A is a schematic diagram illustrating grids in the geographical region of Beijing. As another example, to obtain information relating to a geographical region with a particular range around a particular location, the processing engine 112 may first determine grids in a geographical region around the particular location. FIG. 13B is a schematic diagram illustrating grids in a circular geographical region 1350. The center of the circular geographical region 1350 is represented as a coordinate pair of (116.39712800000001, 39.915663499999994) in the geographical coordinate system. The first term of the coordinate pair is a longitude of the particular location. The second term of the coordinate pair is a latitude of the particular location. The radius of the circular geographical region 1350 is 81640.2155113325 meters. As shown in FIGS. 13A and 13B, the geographical region includes a plurality of grids. In some embodiments, the processing engine 112 may extract data relating to the plurality of grids and make one or more strategies based on the data. For example, the processing engine 112 may extract information relating to service requests in different grids. For a region with a larger number of service requests, the processing engine 112 may determine that more service providers should be dispatched in the region. For a region with a less number of service requests, the processing engine 112 may determine that some service providers in the region should be dispatched out from the region. In 510, the processing engine 112 (e.g., the geofence information obtaining module 410) may obtain information of a geofence of a geographical region in a map.

In some embodiments, the processing engine 112 may assess the map from a storage device (e.g., the storage device 150, the ROM 230, the RAM 240). For example, the processing engine 112 may load at least part of the map from the storage device to at least one cache circuit. The processing engine 112 may further generate a presentation of the map on a component of the artificial intelligence system 100 (e.g., the passenger terminal 130, the driver terminal 140, or the server 110) in advance. In some embodiments, the map may represent the earth in a discrete global grid system (DGGS). The map may be divided into a plurality of partitions, for example, four partitions, six partitions, eight partitions, twelve partitions, twenty partitions. The plurality of partitions may have substantially same size and shape. The partitions may constitute a polyhedron, for example, a tetrahedron, a cube, an octahedron, a dodecahedron, an icosahedron. The polyhedron may approximately represent the earth. In some embodiments, the polyhedron representing the earth may be an octahedron which is shown in FIG. 7B. As illustrated, the octahedron has six vertexes. The coordinates of the six vertexes in a geographical coordinate system may be (0, 90), (0, −90), (0, 0), (90, 0), (−90, 0), and (180, 0). Two of the vertexes (e.g., A and F) may represent the two poles of the earth, respectively. The other four vertexes (e.g., B, C, D, and E) may divide the equator of the earth into four equal portions. Point G may represent the center point of the earth. The octahedron includes eight partitions (e.g., $\triangle ABC$, $\triangle ACD$, $\triangle ADE$, $\triangle AEB$, $\triangle FBC$, ΔFCD, ΔFDE, ΔFEB), which may correspond to eight portions of the surface of the earth. For example, ΔABC, ΔACD, ΔADE, and ΔAEB may correspond to a quarter of the northern hemisphere surface of the earth, respectively. As another example, ΔFBC, ΔFCD, ΔFDE, and ΔFEB may correspond to a quarter of the southern hemisphere surface of the earth, respectively.

In some embodiments, the partitions may be independently indexed. Each partition may be associated with an index (also referred to herein as a partition index).

Merely by way of example, as illustrated in FIG. 7B, the eight partitions of the octahedron may be numbered from 0 to 7. The indices of the partitions of the octahedron may be determined based on the range of the longitudes and latitudes of geographical coordinates in the geographical coordinate system. The indices of the partitions of the octahedron may be determined according to Equation (1):

$$f := \begin{cases} lat \geq 0, \begin{cases} lon \geq 0, \begin{cases} f = 0, lon \leq 90 \\ f = 1, lon > 90 \end{cases} \\ lon < 0, \begin{cases} f = 2, lon \geq -90 \\ f = 3, lon < -90 \end{cases} \end{cases} \\ lat < 0, \begin{cases} lon \geq 0, \begin{cases} f = 4, lon \leq 90 \\ f = 5, lon > 90 \end{cases} \\ lon < 0, \begin{cases} f = 6, lon \geq -90 \\ f = 7, lon < -90 \end{cases} \end{cases} \end{cases} \quad (1)$$

where f may refer to the index of the partition of the octahedron; lat may refer to the latitude of the coordinate pair in the geographical coordinate system; and lon may refer to the longitude of the coordinate pair in the geographical coordinate system.

As shown in FIG. 7K, the eight partitions of the octahedron may be unfolded into a plane. The indices of the eight partitions may be 0, 1, 2, 3, 4, 5, 6, and 7. In some embodiments, the processing engine 112 may determine the corresponding partition of the polyhedron for the geographical location based on the coordinate pair according to Equation (1). For example, as illustrated in FIG. 7B, assuming the geographical coordinate pair of vertex A is (0, 90), the geographical coordinate of vertex C is (0, 0), the geographical coordinate pair of vertex D is (90, 0). The first term of the geographical coordinate pair is a longitude of a point. The second term of the geographical coordinate pair is a latitude of the point. If the longitude of the coordinate pair is between 0 and 90, and the latitude of the coordinate pair is between 0 and 90, the corresponding partition may be ΔACD.

The map (or one or more partitions of the map) may also be gridded into a plurality of grids to generate the DGGS. Each grid may correspond to a geographical area on the earth. In some embodiments, the grids may have a regular shape, e.g., triangle, rectangle, square, rhombus, hexagon. In some embodiments, the grids may have an irregular shape. In some embodiments, all or part of the grids may have the same or different size(s) and shape(s). For example, grids in a same partition may have a same size and a same shape and grids in different partitions may have different sizes and different shapes. As another example, grids in a same partition may have different sizes and different shapes. Each grid in the partitions may be associated with an index (also referred to herein as a grid index). In some embodiments, a grid index may include a plurality of fields. Each field of the grid index may include information related to a refinement level relating to the partition where the grid corresponding to the grid index is, the shape of a polyhedron relating to the DGGS, the shape of the partition where the grid corresponding to the grid index is, the index of the partition where the grid corresponding to the grid index is, a projection coordinate of the grid corresponding to the grid index, or the like, or any combination thereof. The refinement level may refer to the number of times of refinements to a partition where the grid corresponding to the grid index is, which may reflect the resolution of the grids in the partition. The orders of the fields relating to the grid index may be predetermined. When a grid index is determined, at least one of the refinement level, the shape of the polyhedron, the partition in which the grid corresponding to the grid index locates, or the projection coordinate may be determined. Details regarding the determination of the grid index may be found elsewhere in the present disclosure (e.g., FIG. 7A and the relevant descriptions thereof). In some embodiments, in the present disclosure, the terms "grid" and "grid index" may be used interchangeably, unless otherwise stated. For example, when the present disclosure describes that a gird is determined, it also means that the grid index of the gird is determined.

Figure 12A:
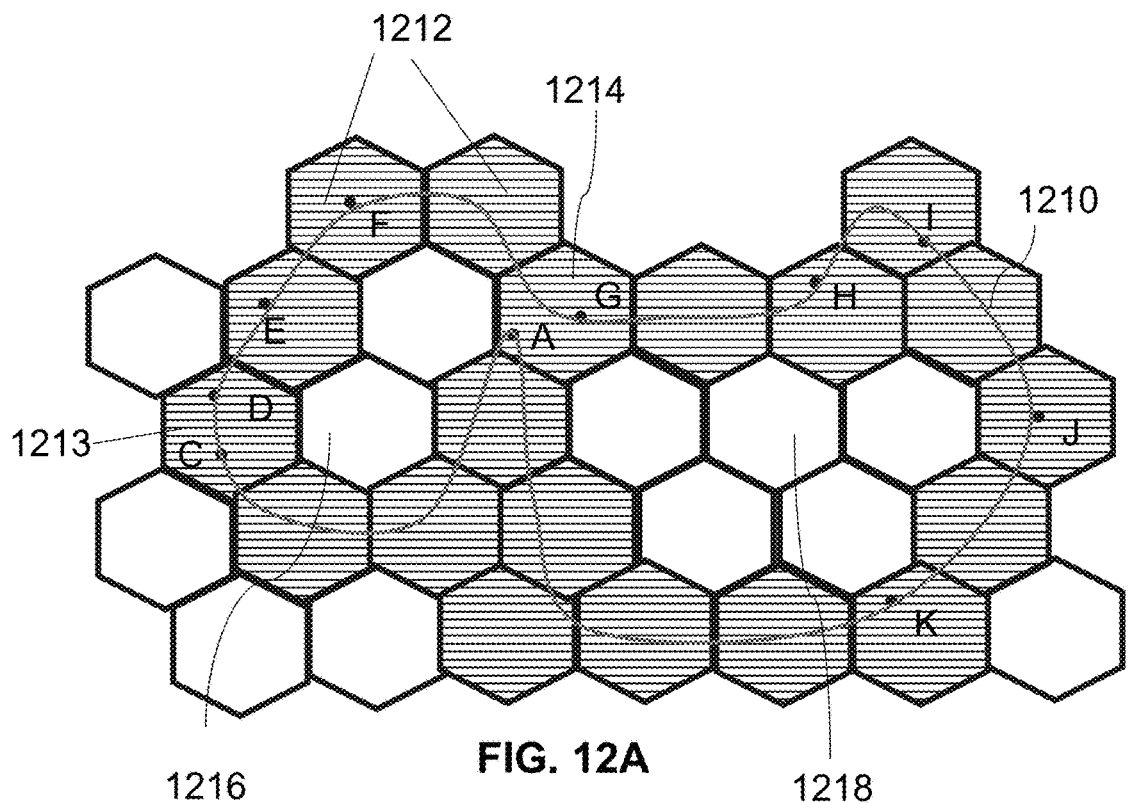
FIGS. 12A and 12B show two exemplary geofences according to some embodiments of the present disclosure.
Figure 12B:
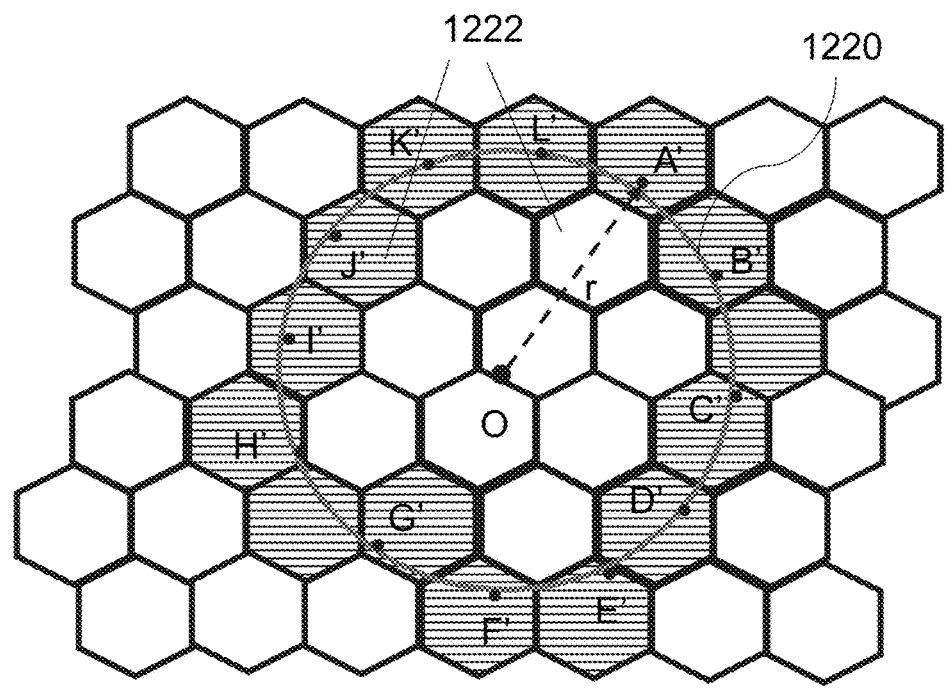

The processing engine 112 (e.g., the geofence information obtaining module 410) may obtain information of a geofence of a geographical region in the map from one or more components of the artificial intelligence system 100 (e.g., the passenger terminal 130, the driver terminal 140, the server 110, the storage device 150). The geofence may represent the boundary of a geographical region. In some embodiments, the geofence may be determined based on a set of coordinate pairs, for example, geofence 1210 in FIG. 12A. FIG. 12A shows an exemplary geofence according to some embodiments of the present disclosure. The geofence (e.g., geofence 1210 in FIG. 12A) may be determined by orderly connecting the points (e.g., point A, point B, point C, . . . , point K). In some embodiments, the points may be referred to as boundary points. The boundary point may be an arbitrary points in a grid, e.g., a center point of grid, a vertex of a grid, etc. Alternatively or additionally, the geofence may be determined based on a circle defined by a center and a radius, for example, geofence 1220 in FIG. 12B. FIG. 12B shows another exemplary geofence according to some embodiments of the present disclosure. The geofence 1220 is a circle. The center of the circle is represented as point O. The radius of the circle is represented as r. The radius may correspond to a length, for example, several meters, tens of meters, hundreds of meters. More details regarding the obtaining of the information of the geofence may be found elsewhere in the present disclosure (e.g., step 611 of the process 610 or step 651 of the process 650, and the relevant descriptions thereof).

In 520, the processing engine 112 (e.g., the geofence boundary determination module 420) may determine a boundary grid series of the geofence from the plurality of grids of the map. In some embodiments, the boundary grid series may be represented as a one-dimensional vector. The boundary grid series of the geofence may include a set of boundary grids through which the geofence passes. In FIGS. 12A and 12B, the grids through which the geofence 1210 or the geofence 1220 are filled with line segments. The processing engine 112 may designate the grids filled with line segments in FIG. 12A as boundary grids of the geofence 1210 and grids filled with line segments in FIG. 12B as boundary grids of the geofence 1220. In some embodiments, there are one or more pivot grids in the boundary grid series of the geofence. The pivot grid may refer to the grid that the geofence pass through two or more times. The number of times that one pivot grid appears in the boundary grid series may be the same as the number of times that the geofence passes through the pivot grid. For the boundary grid series, the pivot grid may refer to a grid that may appear two or more times in the boundary grid series and that corresponds to two non-adjacent boundary points. For example, as shown in FIG. 12A, grid 1214 corresponds to point G and point A, but point G and point A are not adjacent, it may indicate that the geofence 1210 passes through grid 1214 two times, so the processing engine 112 may designate grid 1214 as a pivot grid. However, gird 1213 corresponds to point C and point D, but point C and point D are adjacent, so the processing engine 112 may not designate grid 1214 as a pivot grid. In some embodiments, there is no pivot grid in the boundary grid series. For example, when the geofence is defined by a circle, the boundary grid series of the geofence may not include a pivot grid. As shown in FIG. 12B, the geofence 1220 is a circle, and the geofence 1220 passes through each of the boundary grids only one times. Therefore, the boundary grid series of the geofence 1220 may not include a pivot grid.

In some embodiments, the processing engine 112 may first determine an initial boundary grid series of the geofence based on the information of the geofence. In some embodiments, the initial boundary grid series may include part of the grids that the geofence passes through. In some embodiments, the initial boundary grid series may include the whole of the grids that the geofence passes through but there are duplicate grids (the duplicate grids may be or not be pivot grids) in the initial boundary series. The determination of the initial boundary grid series may be found elsewhere in the present disclosure (e.g., FIGS. 6A and 6B and the relevant descriptions thereof). Then the processing engine 112 (e.g., the geofence boundary determination module 420) may determine the boundary grid series of the geofence by iteratively updating the initial boundary grid series to ensure each two adjacent boundary points corresponds to two adjacent grids. The determination of the final boundary grid series of the geofence based on the initial boundary grid series may be found elsewhere in the present disclosure (e.g., FIG. 8 and the relevant descriptions thereof).

In some embodiments, the geographical region surrounded by the geofence may include one or more enclosed area.

In 530, the processing engine 112 (e.g., the enclosed area determination module 430) may identify at least one enclosed area in the geographical region based on the boundary grid series to determine boundary grids for each of the at least one enclosed area. Each enclosed area may refer to an area that is included in the geographical region, and at the same time, the enclosed area is surrounded by a series of boundary grids in the boundary grid series of the geofence. For example, as shown in FIG. 12A, the geofence region are divided by the pivot grid 1214 to enclosed area 1216 and enclosed area 1218. Enclosed area 1216 is on one side of the pivot grid 1214 and enclosed area 1218 is on the other side of the pivot grid 1214. The identification of the at least one enclosed area may be obtained by performing one or more operations described in FIGS. 9A and 9B. In some embodiments, after the at least one enclosed area is identified, the form of the boundary grids series may be represented as a matrix. Each row of the matrix may include the boundary grids corresponding to only one enclosed area.

In some embodiments, an enclosed area may locate in one partition. In some embodiments, an enclosed area may cross two or more partitions. Because each of the partitions is independently indexed, when an area locates in only one partition, it will be easy to determine grids in the area. Therefore, to determine grids included in an area that crosses two or more partitions, it will be better to segment the area into two or more sub-areas so that each sub-area locates in only one partition.

In some embodiments, for an enclosed area of the at least one enclosed area, the processing engine 112 may determine whether the enclosed area crosses two or more partitions according to grid indices of the boundary grids of the enclosed area. As described in 510, a grid index of a grid may include a field indicating an index of the corresponding partition (also referred to herein as a corresponding partition index) that the grid is in, so the processing engine 112 may determine whether two grids are in a same partition based on the corresponding partition indices relating to the two grids. To determine whether an enclosed area crosses two or more partitions, the processing engine 112 may determine whether the partition indices of the boundary grids of the enclosed area are the same. In response to the determination that the partition indices relating to the boundary grids of the enclosed area are the same, the processing engine 112 may determine that the enclosed area locates in one partition. The processing engine 112 may not segment the enclosed area.

In response to the determination that the partition indices relating to the boundary grids of the enclosed area are different, the processing engine 112 may determine that the enclosed area crosses two or more partitions. Upon determining that the enclosed area crosses two or more partitions, the processing engine 112 (e.g., the sub-area determination module 440) may segment the enclosed area into two or more sub-areas so that each sub-area of the two or more sub-areas locates in only one partition in 540. After the segmentation, each sub-area of the two or more sub-areas may locate in only one partition.

In some embodiments, after one enclosed area is segmented to two or more sub-areas, the processing engine 112 may store the boundary grids of each of the two or more sub-areas into a matrix, of which grids in a row relate to only one sub-area.

In 550, the processing engine 112 (e.g., the sub-area determination module 440) may determine boundary grids for each of the two or more sub-areas. In some embodiments, the processing engine 112 may determine overlapped edge grids where the two or more sub-areas intersect with one or more edges of the plurality of partitions. The processing engine 112 may add the overlapped edge grids to the two or more sub-areas as boundary grids of the two or more sub-areas. More details regarding the determination of the boundary grids may be found elsewhere in the present disclosure (e.g., FIG. 10 and the relevant descriptions thereof).

In 560, for each sub-area, the processing engine 112 (e.g., the internal grid determination module 450) may identify internal grids in the sub-area from the plurality of grids based on the boundary grids of the sub-area and an index of the partition in which the sub-area locates.

The internal grids in the sub-area may refer to grids that are surrounded by the boundary grids of the sub-area. In some embodiments, when the processing engines 112 obtains the boundary grids of the sub-area that locates in only one partition, the processing engines 112 (e.g., the internal grid determination module 450) may determine the internal grids in the sub-area using a ray method. In some embodiments, the identification of the internal grids may be obtained by performed by one or more operations described in FIG. 11A.

In 570, the processing engine 112 (e.g., the target grid determination module 470) may identify grids in the geographical region (also referred to herein as target grids) by collecting the boundary grids of the two or more sub-areas and the internal grids in the two or more sub-areas. In some embodiments, the artificial intelligence system 100 may relate some information to each of the plurality of grids in the map. The information relating to the grids may include information relating to service providers, information relating to service requesters, or the like. The information relating to the service providers may include the number of service providers in each of the grids, the distribution of the drivers, the number of available service providers, the distribution of the available service providers, or the like, or any combination thereof. The information relating to the service requesters may include the number of service requesters relating to the girds in a particular time period, the distribution of the service requesters in a particular time period, a starting time relating to a service requester, a starting locating relating to a service requester, a destination locating relating to a service requester, or the like, or any combination thereof. In some embodiments, after determining the target grids in the geographical region, the processing engine 112 may extract information relating to the target grids for further processing, e.g., vehicle schedule.

It should be noted that the above description of the process 500 is provided for the purposes of illustration, and is not intended to limit the scope of the present disclosure. For persons having ordinary skills in the art, multiple variations and modifications may be made under the teachings of the present disclosure. For example, if the geofence is determined by the circle, the geofence may only include one enclosed area, then step 530 may be omitted. As another example, if each enclosed area locates in only one partition, the enclosed area may not need to be segmented, then step 540 may be omitted. However, those variations and modifications do not depart from the scope of the present disclosure.

Figure 6A:
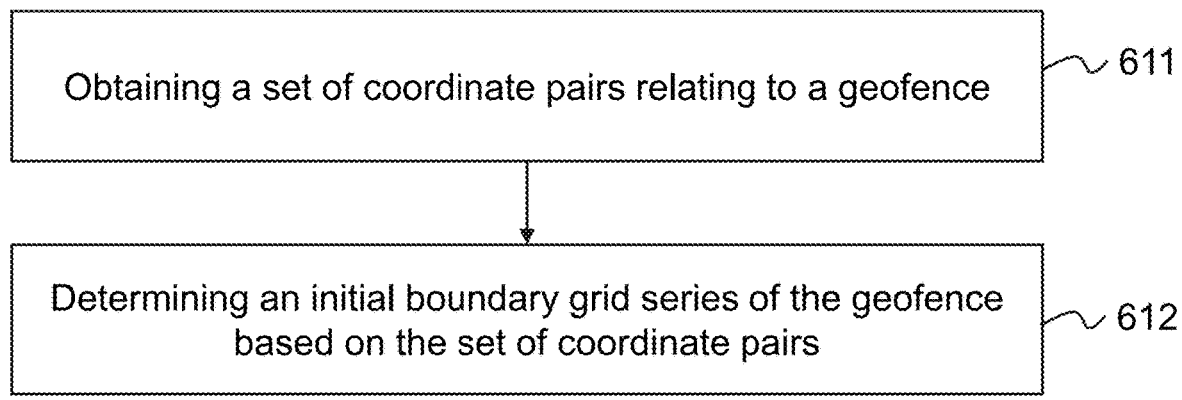
FIGS. 6A and 6B are flowcharts illustrating exemplary processes for determining an initial boundary grid series of a geofence according to some embodiments of the present disclosure.

FIG. 6A is a flowchart illustrating an exemplary process for determining an initial boundary grid series of a geofence according to some embodiments of the present disclosure. In some embodiments, the process 610 may be implemented in the artificial intelligence system 100 as illustrated in FIG. 1. For example, the process 610 may be stored in the storage device 150 and/or other storage device (e.g., the ROM 230, the RAM 240) as a form of instructions, and invoked and/or executed by the server 110 (e.g., the processing engine 112 in the server 110, the processor 220 of the processing engine 112 in the server 110, the one or more modules of the processing engine 112 in the server 110). The operations of the illustrated process presented below are intended to be illustrative. In some embodiments, the process 610 may be accomplished with one or more additional operations not described, and/or without one or more of the operations discussed. Additionally, the order in which the operations of the process 610 as illustrated in FIG. 6A and described below is not intended to be limiting.

In 611, the processing engine 112 (e.g., the geofence information obtaining module 410) may obtain a set of coordinate pairs relating to a geofence. Each of the set of coordinate pairs may relate to a boundary point of the geofence. Each coordinate pair may include a longitude and a latitude. As shown in FIG. 12A, there are points on the geofence 1210, e.g., point A, point B, point C, . . . , point K, and the points are boundary points of the geofence. In some embodiments, the processing engine 112 may obtain the set of coordinate pairs (e.g., point A, point B, . . . , point K), simultaneously. For example, the processing engine 112 may obtain a vector consisting of the set of coordinate pairs, and the relative positions of the set of coordinate pairs may indicate the relative relationships of the corresponding points on the geofence. In some embodiments, the processing engine 112 may obtain the set of coordinate pairs in order and the order of obtaining the coordinate pairs may indicate the relative relationships of the corresponding points on the geofence. For example, the processing engine 112 may first obtain point A, then point B, then point C, . . . , point K at last.

In some embodiments, the processing engine 112 may obtain the set of coordinate pairs from one or more components of the artificial intelligence system 100 (e.g., the passenger terminal 130, the driver terminal 140, the server 110, the storage device 150, or other component of the server 110). For example, if a user (e.g., a passenger) wants to know the distribution of service providers in a particular geographical region, he/she may drag a point-selection icon shown on a map displayed on a user interface to several points to define the geographical region, then the server 110 or the passenger terminal 130 may analyze the points to generate a set of coordinate pairs. As another example, if an operator of the artificial intelligence system 100 wants to know the distribution of service providers (e.g., drivers) in a geographical region, the operator of the artificial intelligence system 100 may enter a set of coordinate pairs in a particular order through a controller or a console relating to the server 110 to define the geofence of the geographical region. As still another example, the set of coordinate pairs may be stored in a storage device (e.g., the storage device 150), and the processing engine 112 may access the storage device and retrieve the set of coordinate pairs.

In 612, the processing engine 112 (e.g., the geofence boundary determination module 420) may determine an initial boundary grid series of the geofence based on the set of coordinate pairs. The initial boundary grid series may include a plurality of grids (also referred to herein as boundary grids). Each grid in the initial boundary gird series may correspond to a coordinate pair of the set of coordinate pairs. Details regarding the determination of a grid index (or a grid) relating to a coordinate pair may be found elsewhere in the present disclosure (e.g., FIGS. 7A to 7K, and the relevant descriptions thereof). In some embodiments, two or more boundary points may correspond to a same grid, so the initial boundary grid series may include two or more same grids. In some embodiments, two grids corresponding to two adjacent boundary points may not be adjacent in the map (e.g., when connecting the two boundary points using a line segment, the line segment occupies more than two grids), so it is not complete to only use the boundary points to represent the geofence. Therefore, the processing engines 112 may update the initial boundary grid series to generate a final boundary grid series so that all grids between two grids that are occupied by any two adjacent boundary points are included in the final boundary grid series. In some embodiments, the final boundary grid series may be determined by performing one or more operations described in connection with FIG. 8.

Figure 6B:
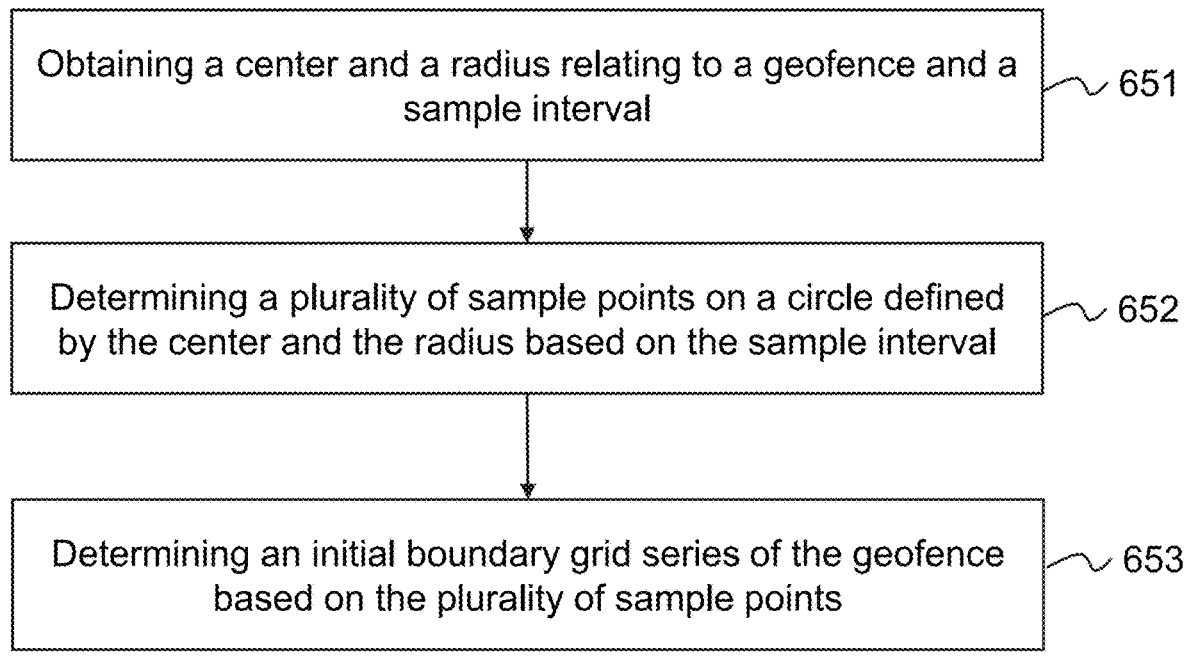

FIG. 6B is a flowchart illustrating another exemplary process for determining an initial boundary grid series of a geofence according to some embodiments of the present disclosure. In some embodiments, the process 650 may be implemented in the artificial intelligence system 100 as illustrated in FIG. 1. For example, the process 650 may be stored in the storage device 150 and/or other storage device (e.g., the ROM 230, the RAM 240) as a form of instructions, and invoked and/or executed by the server 110 (e.g., the processing engine 112 in the server 110, the processor 220 of the processing engine 112 in the server 110, the one or more modules of the processing engine 112 in the server 110). The operations of the illustrated process presented below are intended to be illustrative. In some embodiments, the process 650 may be accomplished with one or more additional operations not described, and/or without one or more of the operations discussed. Additionally, the order in which the operations of the process 650 as illustrated in FIG. 6B and described below is not intended to be limiting.

In 651, the processing engine 112 (e.g., the geofence information obtaining module 410) may obtain a center and a radius relating to a geofence and a sample interval. In some embodiments, the center may correspond to a coordinate pair. The radius may correspond to a length, for example, several meters, tens of meters, hundreds of meters, etc. A circle may be defined based on the center and the radius. Then the processing engine 112 (e.g., the geofence information obtaining module 410) may determine a geofence represented by the circle. In some embodiments, the sample interval may be a predetermined value by the server 110. In some embodiments, the processing engine 112 may first obtain the center and the radius in a step and then obtain the sample interval in another step. In some embodiments, after obtaining the center and the radius, the processing engine 112 may calculate a sample interval based on the radius of the circle and a resolution relating to grids of the DGGS (e.g., a refinement level relating to the DGGS). In some embodiments, the sample interval may correspond to a sample angle. Merely by way of example, the sample angle may be determined according to Equation (2) as follows:

$$\alpha = \frac{\sqrt{2}\,R}{3 * 2^{n-1} r}, \quad (2)$$

wherein α may refer to the sample angle corresponding to the sample interval; R may refer to the radius of the earth; r may refer to the radius of the circle; and n may refer to the refinement level relating to the DGGS.

In some embodiments, the processing engine 112 may obtain information relating to the geofence (e.g., the center and the radius, and the sample interval) from one or more components of the artificial intelligence system 100 (e.g., the passenger terminal 130, the driver terminal 140, the storage device 150, the server 110, or other component of the server 110). For example, a user of the passenger terminal 130/the driver terminal 140 may enter a center and a radius to determine a geographical region via the passenger terminal 130/the driver terminal 140. As another example, if an operator of the artificial intelligence system 100 wants to know the distribution of service providers (e.g., drivers) in a geographical region, the operator of the artificial intelligence system 100 may enter a center and a radius through a controller or a console relating to the server 110 to define the geofence of the geographical region. As still another example, the center and the radius may be stored in a storage device (e.g., the storage device 150) and the processing engine 112 may access the storage device and retrieve the center and the radius relating to the geofence.

In 652, the processing engine 112 (e.g., the geofence information obtaining module 410) may determine a plurality of sample points on the circle defined by the center and the radius based on the sample interval. As shown in FIG. 12B, there are sample points on the geofence 1220, e.g., point A', point B', point C', . . . , point L', and the sample points are boundary points of the geofence 1220. In some embodiments, the processing engine 112 may first determine a first sample point on the circle, for example, point A' shown in FIG. 12B. The processing engine 112 may sample the second sample point (e.g., point B' shown in FIG. 12B) on the circle based on the predetermined sample interval (e.g., the sample angle) and the first sample point. Accordingly, the processing engine 112 may sample the third, the forth, . . . , and the Nth sample points on the circle based on the sample interval. In some embodiments, when the first sample point and the sample interval are determined, the processing engine 112 (e.g., the geofence information obtaining module 410) may simultaneously obtain other sample points based on the first sample point and the sample interval. The processing engine 112 may sample the plurality of sample points clockwise or counterclockwise.

In 653, the processing engine 112 (e.g., the geofence boundary determination module 420) may determine an initial boundary grid series of the geofence based on the plurality of sample points. Details regarding the determination of a grid (or a grid index) based on the sample point may be found elsewhere in the present disclosure (e.g., FIGS. 7A to 7K, and the relevant descriptions thereof). In some embodiments, the initial boundary grid series may include a plurality of grids. When the sample interval is smaller than a certain sample value, the initial boundary grid series may include duplicate grids. When the sample interval is larger than the certain sample value, it is not complete to only use the grids in the initial boundary grid series to represent the geofence. Therefore, the processing engines 112 may update the initial boundary grid series to generate a final boundary grid series so that all grids that are occupied by the circle are included in the final boundary grid series. In some embodiments, the final boundary grid series may be determined by performing one or more operations described in connection with FIG. 8.

Figure 7A:
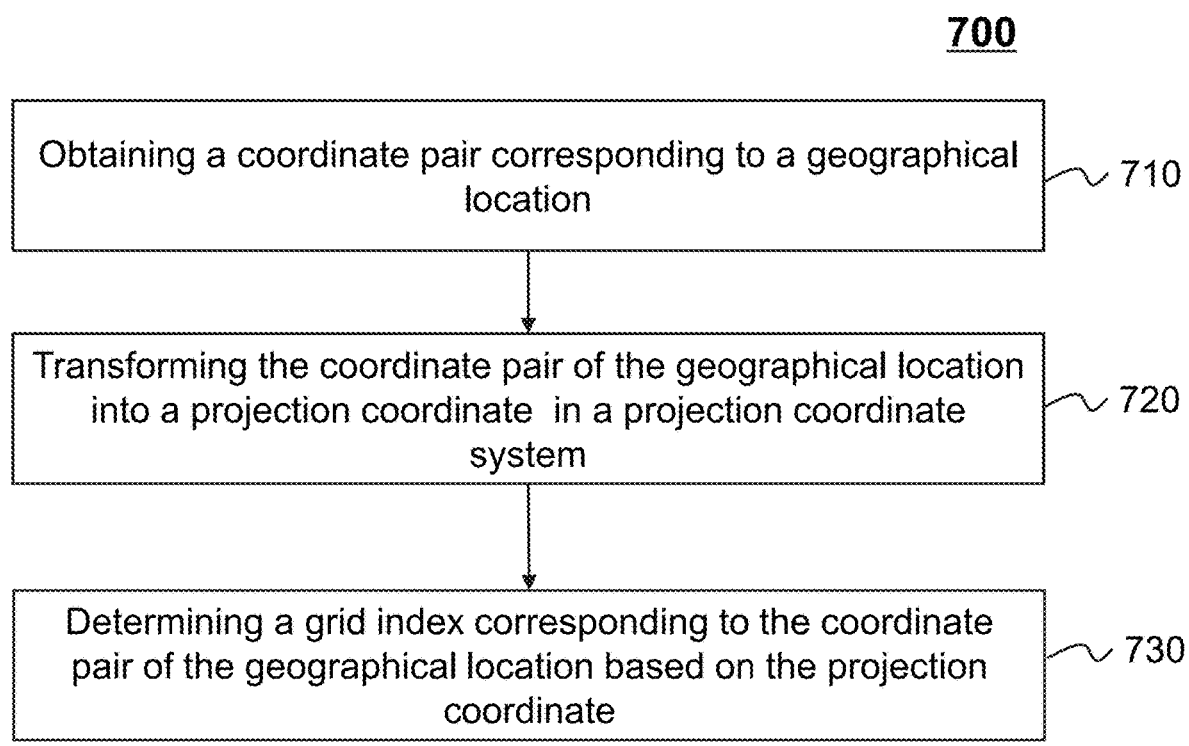
FIG. 7A is a flowchart illustrating an exemplary process for determining a grid index corresponding to a coordinate pair according to some embodiments of the present disclosure.
Figure 7B:
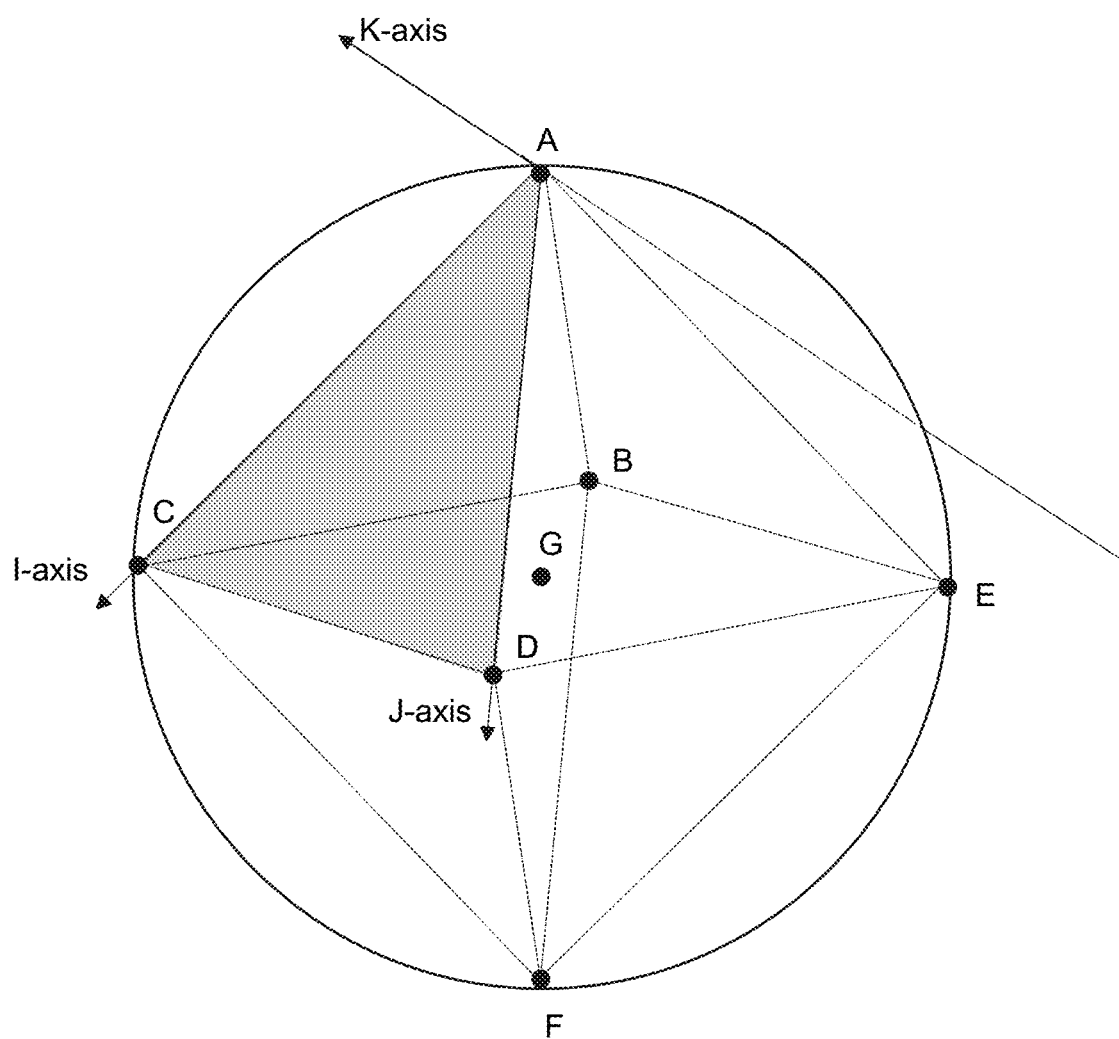
FIG. 7B is a schematic diagram illustrating an octahedron representing the earth according to some embodiments of the present disclosure.

FIG. 7A is a flowchart illustrating an exemplary process for determining a grid index corresponding to a coordinate pair according to some embodiments of the present disclosure. In some embodiments, the process 700 may be implemented in the artificial intelligence system 100 as illustrated in FIG. 1. For example, the process 700 may be stored in the storage device 150 and/or other storage device (e.g., the ROM 230, the RAM 240) as a form of instructions, and invoked and/or executed by the server 110 (e.g., the processing engine 112 in the server 110, the processor 220 of the processing engine 112 in the server 110, the one or more modules of the processing engine 112 in the server 110). The operations of the illustrated process presented below are intended to be illustrative. In some embodiments, the process 700 may be accomplished with one or more additional operations not described, and/or without one or more of the operations discussed. Additionally, the order in which the operations of the process 700 as illustrated in FIG. 7A and described below is not intended to be limiting. In some embodiments, step 612 of the process 610 and step 653 of the process 650 may be performed according to the process 700.

In 710, the processing engine 112 (e.g., the coordinate obtaining unit 461 of the grid index determination module 460) may obtain a coordinate pair corresponding to a geographical location. The coordinate pair may include a longitude and a latitude in the geographical coordinate system. In some embodiments, the coordinate pair may refer to one of the set of coordinate pairs described in FIG. 6A, the coordinate pair corresponding to a sample point described in FIG. 6B, a coordinate pair corresponding to a geographical location of a user (e.g., a passenger, a driver).

In some embodiments, the processing engine 112 may obtain the coordinate pair corresponding to the geographical location of the user from one or more components of the artificial intelligence system 100 (e.g., the passenger terminal 130, the driver terminal 140, the server 110, the storage device 150, or other component of the server 110). For example, the processing engine 112 may obtain the coordinate pair that entered by a user (e.g., a passenger, a driver) from the passenger terminal 130/the driver terminal 140. As another example, a geographical location of a user (e.g., a passenger, a driver) may be determined by a GPS receiver mounted on a terminal (e.g., the passenger terminal 130, the driver terminal 140). The processing engine 112 may obtain the coordinate pair corresponding to the geographical location of the user via the GPS receiver. As a further example, the coordinate pair may be transmitted to a storage device (e.g., the storage device 150). The processing engine 112 may access the storage device and retrieve the coordinate pair.

Figure 7C:
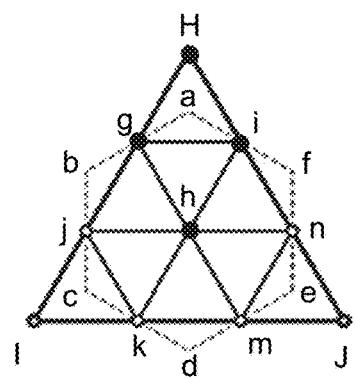
FIGS. 7C-7E are schematic diagrams illustrating exemplary refinement operations for refining a partition of an octahedron according to some embodiments of the present disclosure.
Figure 7D:
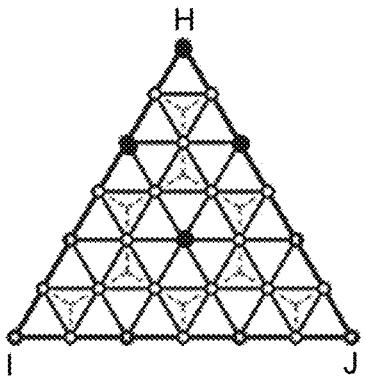
Figure 7E:
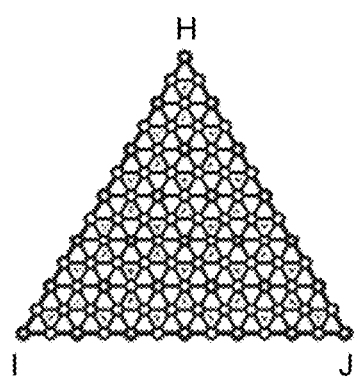
Figure 7F:
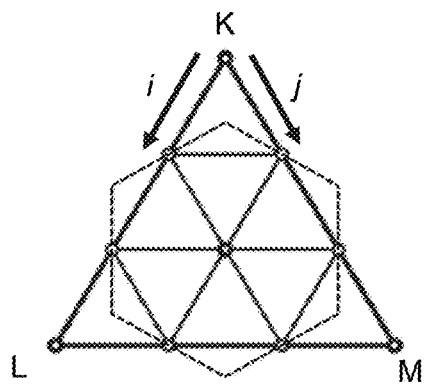
FIGS. 7F and 7G are schematic diagrams illustrating an exemplary projection coordinate system on a partition of an octahedron according to some embodiments of the present disclosure.
Figure 7G:
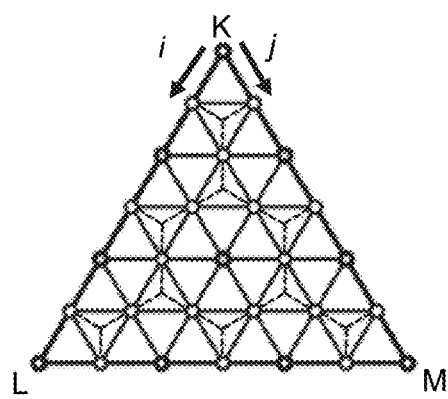
Figure 7H:
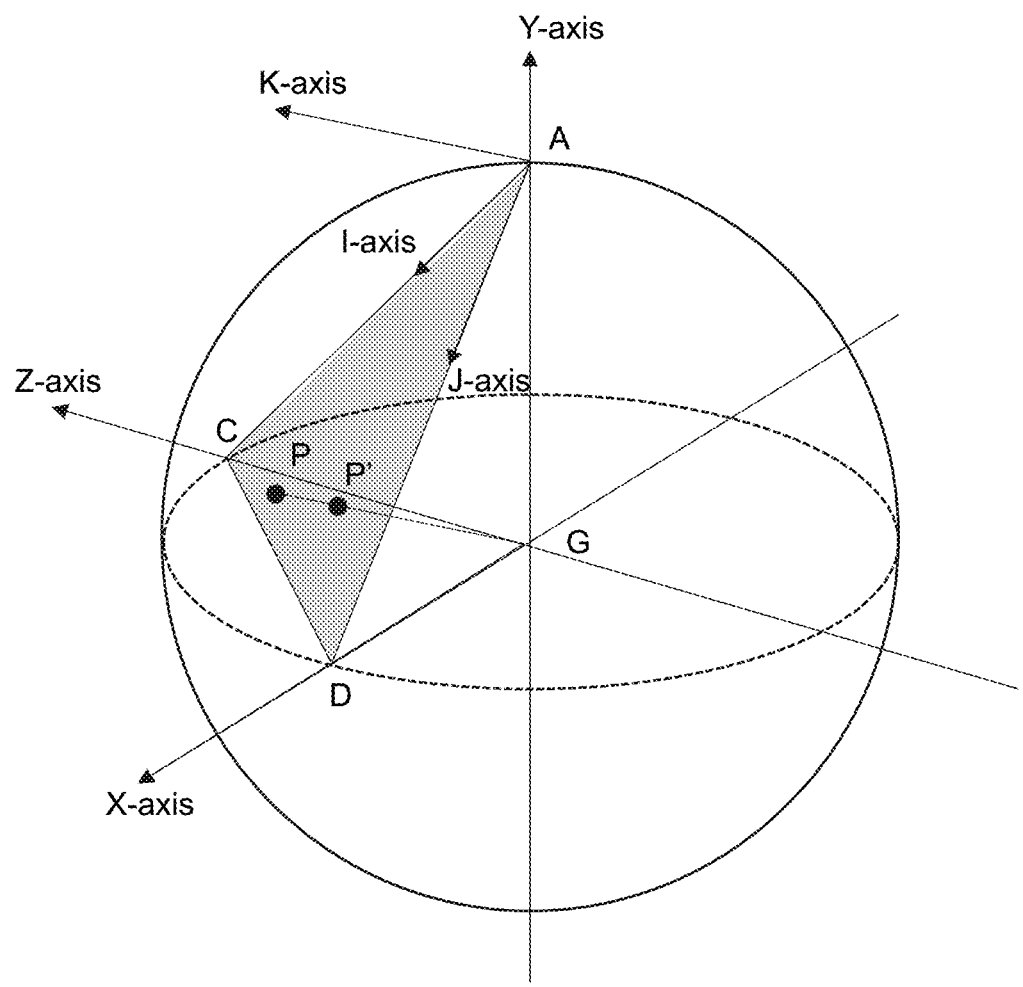
FIG. 7H is a schematic diagram illustrating the transformation of a Cartesian coordinate to a projection coordinate according to some embodiments of the present disclosure.

In 720, the processing engine 112 (e.g., the coordinate transformation unit 462 of the grid index determination module 460) may transform the coordinate pair corresponding to the geographical location into a projection coordinate in a projection coordinate system. In some embodiments, for each partition in the map, a projection coordinate system may be constructed. As illustrated in FIG. 7H, taking the partition ΔACD as an example, AC and AD may be designated as an I-axis and a J-axis. An axis passing through the vertex A and perpendicular to the partition ΔACD may be designated as a K-axis. In some embodiments, the processing engine 112 may determine the projection coordinate in the projection coordinate system based on one or more coordinate transformation operations.

In some embodiments, the processing engine 112 may transform the coordinate pair to a spherical coordinate of a spherical coordinate system. In the spherical coordinate system, the spherical coordinate corresponding to the geographical location may be represented as $P(r,\varphi,\theta)$. The coordinate pair in the geographical coordinate system and the spherical coordinate in the spherical coordinate system may be interconvertible. In some embodiments, the processing engine 112 may transform the coordinate pair (e.g., P(lon, lat)) to the spherical coordinate (e.g., $P(1, \varphi, \theta)$) according to Equation (3). Alternatively or additionally, the processing engine 112 may transform the spherical coordinate to the coordinate pair according to Equation (4).

$$\begin{cases} \varphi = deg2\text{rad}(90 - lat) \\ \theta = deg2\text{rad}(lon) \end{cases} \quad (3)$$

$$\begin{cases} lat = rad2deg(\frac{\pi}{2} - \varphi) \\ lon = rad2deg(\theta) \end{cases} \quad (4)$$

where lat may refer to the latitude of the coordinate pair in the geographical coordinate system; lon may refer to longitude of the coordinate pair in the geographical coordinate system; $\varphi$ may refer to the polar angle in the spherical coordinate; $\theta$ may refer to azimuth angle in the spherical coordinate; "rad2deg" may refer to a function that convert a radian to an angle; and "deg2rad" may refer to a function that convert an angle to a radian.

In some embodiments, the processing engine 112 may also transform the spherical coordinate to a Cartesian coordinate. Cartesian coordinate (also referred to as a rectangular coordinate) may indicate the position of a point on a two-dimensional (2D) surface or in a three-dimensional (3D) space. The spherical coordinate and the Cartesian coordinate may be interconvertible. In some embodiments, the processing engine 112 may transform the spherical coordinate (e.g., $P(r,\varphi,\theta)$) in the sphere coordinate system to a Cartesian coordinate (e.g., (x,y,z)) according to Equation (5). Alternatively or additionally, the processing engine 112 may transform the Cartesian coordinate to the spherical coordinate according to Equation (6).

$$\begin{cases} x = r \cdot \sin\varphi \cdot \cos\theta \\ y = r \cdot \sin\varphi \cdot \sin\theta \\ z = r \cdot \cos\varphi \end{cases} \quad (5)$$

$$\begin{cases} r = \sqrt{x^2 + y^2 + z^2} \\ \varphi = \arccos\frac{z}{r} \\ \theta^* = \arctan\frac{y}{x} \end{cases} \quad (6)$$

where x may refer to the position of the perpendicular projection of the geographical location onto the X-axis; y may refer to the position of the perpendicular projection of the geographical location onto the Y-axis; and z may refer to the position of the perpendicular projection of the geographical location onto the Z-axis.

It should be noted that the azimuth angle $\theta$ is in a range of $[-\pi,\pi]$, while the value of the arctan function is in a range of $$\left(\frac{-\pi}{2}, \frac{+\pi}{2}\right),$$

which is different from the range of the azimuth angle $\theta$. To compensate for this difference, the azimuth angle $\theta$ may be determined based on the quadrant of the coordinate (x,y). Specifically, if x=0, then the azimuth angle $\theta$ may be determined based on Equation (7):

$$\theta = \begin{cases} \frac{+\pi}{2}, & y \geq 0 \\ \frac{-\pi}{2}, & y < 0 \end{cases} \quad (7)$$

If x<0, then the azimuth angle $\theta$ may be determined based on Equation (8):

$$\theta = \begin{cases} \theta^* + \pi, & y \geq 0 \\ \theta^* - \pi,, & y < 0 \end{cases} \quad (8)$$

where $$\theta^* = \arctan\frac{y}{x}.$$

If x>0, then the azimuth angle θ may be determined as $$\theta = \arctan\frac{y}{x}.$$

The value of the arccos function is in a range of [0,π], which is consistent with the range of the polar angle φ.

The processing engine 112 may further transform the Cartesian coordinate to the projection coordinate in the projection coordinate system. The Cartesian coordinate and the projection coordinate may be interconvertible. As shown in FIG. 7H, GD, GA, and GC may correspond to X-axis, Y-axis, and Z-axis in the Cartesian coordinate system, respectively. Point G may be the origin of the Cartesian coordinate system. Assuming that the radius of the earth has 1-unit length, then the Cartesian coordinates of points A, C, D, and P (the geographical location described above) may be (0, 1, 0), (0, 0, 1), (1, 0, 0), and P(x,y,z), respectively. In the projection coordinate system, AC and AD may correspond to the I-axis and the J-axis. An axis passing through point A and perpendicular to the partition ΔACD may correspond to the K-axis. Point P' may be the projection point of the geographical location P on the partition ΔACD. As used herein, the projection point P' may refer to an intersection point of a line and the partition ΔACD, in which the line connects the geographical location on the earth and the center point of the earth. The projection point P' may have a projection coordinate P'(i,j,k).

Vector AP' may be determined based on Equation (9):

$$\vec{AP'} = i\vec{AC} + j\vec{AD}, \qquad (9)$$

where $\vec{AP'}$ may refer to vector AP'; $\vec{AC}$ may refer to vector AC; and $\vec{AD}$ may refer to vector AD.

Vector AP may be determined based on Equation (10):

$$\vec{AP} = i\vec{AC} + j\vec{AD} + k\vec{GP}, \qquad (10)$$

where $\vec{AP}$ may refer to vector AP, and $\vec{GP}$ may refer to vector GP.

The Cartesian coordinate P(x,y,z) and the projection coordinate P'(i,j,k) may have a relationship illustrated in Equation (11):

$$\begin{pmatrix} x \\ y-1 \\ z \end{pmatrix} = i\begin{pmatrix} 0 \\ -1 \\ 1 \end{pmatrix} + j\begin{pmatrix} 1 \\ -1 \\ 0 \end{pmatrix} + k\begin{pmatrix} x \\ y \\ z \end{pmatrix}. \qquad (11)$$

Equation (11) may be expressed as Equation (12):

$$\begin{cases} x = 0 + j + kx \\ y - 1 = -i - j + ky \\ z = i + 0 + kz \end{cases} \qquad (12)$$

Assuming that s=x+y+z, the projection coordinate P'(i,j,k) may be determined based on Equation (13):

$$\begin{cases} k = (s-1)/s \\ i = z(1-k) \\ j = x(1-k) \end{cases} \qquad (13)$$

The projection coordinate P(i,j,k) of the projection point P' in the projection coordinate system may be determined.

In 730, the processing engine 112 (e.g., the grid index determination unit 463 of the grid index determination module 460) may determine a grid index corresponding to the coordinate pair of the geographical location based on the projection coordinate.

In some embodiments, each partition in the map may be divided into a plurality of grids. Each grid may have a shape such as triangle, rectangle, square, rhombus, hexagon, etc. The grids formed with a division may have the same or different size(s) and shape(s). In some embodiments, each partition may be divided into more grids with smaller areas to realize a relatively fine resolution relating to the grids. A refinement operation may be applied to subdividing the partitions to generate finer grids, which may refer to the conversion of a set of relatively coarse grids to relatively finer grids.

In some embodiments, the refinement operation may be performed based on a refinement factor m. The refinement factor m may refer to how fine a grid may be divided in a single refinement operation. In some embodiments, the plurality of grids in the map may be generated based on a 1-to-m refinement. Specifically, according to the 1-to-m refinement, a grid (or a partition of the polyhedron) with an area of A may be divided into m grids with an area of A/m. For example, in a 1-to-4 refinement, each grid with an area of A may be divided into four grids with an area of A/4. Thus, the number of grids may grow exponentially by a factor of four from one resolution to a next. In some embodiments, the refinement operation may be performed for one or more times. The number of times of the refinement operation may be referred to as a refinement level. In some embodiments, the refinement level may be a default value determined by the processing engine 112, or set or adjusted by a user via a terminal (e.g., the passenger terminal 130, a driver terminal 140). In some embodiments, two or more refinement operations in different number of times may be performed based on a same refinement factor. In some embodiments, two or more refinement operations in different number of times may be performed based on different refinement factors. For example, a 1-to-4 refinement may be performed in a first refinement operation, and subsequently a 1-to-2 refinement may be performed in a second refinement operation.

In some embodiments, the plurality of grids of the partitions may be generated by performing one or more iterations of refinement operations according to one or more refinement factors and the refinement level. FIGS. 7C-7E are schematic diagrams illustrating exemplary refinement operations for refining a partition of an octahedron according to some embodiments of the present disclosure. ΔHIJ may represent an exemplary partition of an octahedron. As shown in FIG. 7C, in a first refinement operation, a 1-to-4.5 refinement may be performed, and 4.5 first grids having a shape of rhombus may be generated. Specifically, the processing engine 112 may determine two points of trisection along each side of the partition ΔHIJ to obtain a plurality of first points at resolution 1. At resolution 1, the three vertexes H, I, and J may be regarded as first points. Merely by way of example, the first points may include the points g, j, k, m, n, and i. In the present disclosure, the terms "first point" and "first level equal diversion point" are used interchangeably. A plurality of first grids may be formed based on the first points. The first grids may include three complete rhombuses (e.g., the rhombus "Hghi," "gjkh," "ihmn") and three incomplete rhombuses (e.g., the semi-rhombus "jlk,"

"hkm," "nmJ"). The first grids may be regarded as resolution 1 grids. The refinement level of the resolution 1 grids may be 1.

To obtain finer resolution grids, the processing engine 112 may perform one or more iterations of the refinement operation to generate grids at different resolutions. As shown in FIG. 7D, in a second refinement operation, a 1-to-4 refinement may be performed, and 4 grids having a shape of rhombus may be generated for each first grid. Specifically, the processing engine 112 may determine a point of bisection between each two of the plurality of first points along each side of the partition ΔHIJ to obtain a plurality of second points at resolution 2. At resolution 2, the three vertexes H, I, and J may be regarded as second points. In the present disclosure, the terms "second point" and "second level equal diversion point" are used interchangeably. A plurality of second grids may be formed based on the second points. The second grids may be regarded as resolution 2 grids. The refinement level of the resolution 2 grids may be 2. As shown in FIG. 7E, in a third refinement operation, a 1-to-4 refinement may be performed, and 4 grids having a shape of rhombus may be generated for each second grid. Specifically, the processing engine 112 may determine a point of bisection between each two of the plurality of second points along each side of the partition ΔHIJ to obtain a plurality of third points at resolution 3. At resolution 3, the three vertexes H, I, and J may be regarded as third points. In the present disclosure, the terms "third point" and "third level equal diversion point" are used interchangeably. A plurality of third grids may be formed based on the third points. The third grids may be regarded as resolution 3 grids. The refinement level of the resolution 3 grids may be 3. Similarly, further refinement operations (e.g., 1-to-4 refinements) may be performed to further refine the plurality of grids. Each grid at lower resolution(s) may be represented at a relatively high resolution. For example, as shown in FIG. 7E, the resolution 1 grids and the resolution 2 grids may be represented by resolution 3 grids.

It should be noted that the shape of the plurality of grids may be determined based on the shape of the partitions of the polyhedron, one or more refinement factors, and/or the refinement level. Take octahedron as an example, the shape of the grids may be triangle or hexagon in addition to rhombus. A same refinement operation may generate different shapes of grids with different refinement factors. For example, as shown in FIG. 7C, the refinement factor is 4.5 for rhombus but 9/7 for hexagon, and no hexagon is formed. A semi-hexagon indicated by the dashed lines is defined by the vertexes points a, b, c, d, e, and f, and have a center point h. As another example, as shown in FIG. 7D, the refinement factor is 4 for rhombus but 3.5 for hexagon. As a further example, as shown in FIG. 7E, the refinement factor is 4 for rhombus but 3.5 for hexagon. The hexagons are indicated by dashed lines in FIGS. 7D and 7E. In some embodiments, the shape of the plurality of grids may be set manually or be determined by one or more components of the artificial intelligence system 100 according to different situations.

In some embodiments, regardless of the shape of the grids, the number of points (e.g., the first points, the second points, the third points) on a partition of the polyhedron generated by the refinement operations as shown in FIGS. 7C-7E may be determined as follows:

$$V_e(T_n)=3*2^{n-1}+1, \tag{14}$$

$$M_e(T_n)=V_e(T_n)-1=3*2^{n-1}, \tag{15}$$

$$V(T_n)=9*2^{n-2}(2^{n-1}+1)+1, \tag{16}$$

$$E(T_n)=9*2^{n-2}(3*2^{n-1}+1), \tag{17}$$

$$F(T_n)=9*4^{n-1}, \tag{18}$$

where $V_e(T_n)$ may refer to the number of points on one side of a partition of the octahedron; n may refer to the refinement level; $M_e(T_n)$ may refer to the number of equal segments on one side of a partition of the octahedron; $V(T_n)$ may refer to the number of all the points on one partition of the octahedron; $E(T_n)$ may refer to the number of segments between two adjacent points on a partition of the octahedron; and $F(T_n)$ may refer to the number of finest triangles on a partition of the octahedron. As shown in FIG. 7C, four points H, g, j, and I may be on one side (e.g., side "HI") of the octahedron. Ten points H, g, j, I, k, m, J, n, i, and h may be on one partition (e.g., partition "HIJ") of the octahedron.

A partition in the map may have a plurality of points including the vertexes of the grids and the points inside the grids. Each of the plurality of points may have a corresponding projection coordinate on the partition in the map. The projection coordinate of a point on a partition may be determined based on an origin of the projection coordinate system on the partition and one or more basis vectors, as shown in FIGS. 7F and 7G. FIGS. 7F and 7G are schematic diagrams illustrating an exemplary projection coordinate system on a partition of an octahedron according to some embodiments of the present disclosure. In some embodiments, the projection coordinates of the points on the partition of the octahedron may be determined based on the projection coordinates of vertexes of the partition, and the refinement level. Merely by way of example, as shown in FIG. 7F, partition "KLM" may be one of the partitions of the octahedron. The number of points on one side of partition "KLM" may be determined according to Equation (14).

In some embodiments, a vertex (e.g., vertex K) may be regarded as an origin of the projection coordinate system. Then two basis vectors (e.g., a first basis vector $\vec{e}_{KL}$ and a second basis vector $\vec{e}_{KM}$) may be determined based on the vector $\vec{KL}$, the vector $\vec{KM}$, and/or the number of points on one side of partition "KLM" $V_e$. The first basis vector may refer to a vector formed by the origin K and an adjacent nth level equal diversion point along the $\vec{KL}$ direction. The second basis vector may refer to a vector formed by the origin K and an adjacent nth level equal diversion point along the $\vec{KL}$ direction. The basis vectors may be determined based on Equation (19):

$$\begin{cases} \vec{e_{KL}} = \vec{KL}/(V_e - 1) \\ \vec{e_{KM}} = \vec{KM}/(V_e - 1) \end{cases}. \tag{19}$$

The projection coordinate of a point on partition "KLM" may be determined based on the two basis vectors. For example, any point (e.g., a point X) on partition "KLM" may be represented by a vector $\vec{KX}$, and the vector $\vec{KX}$ may be represented as $j\vec{e}_{KL}+j\vec{e}_{KM}$, and thus, the projection coordinate of the point X on partition "KLM" may be represented as (i,j), in which i may be an integer equal to 0, 1, . . . , or $V_e$-1, j may be an integer equal to 0, 1, . . . , or $V_e$-1, and i+j may be equal to or less than $V_e$-1.

It should be noted that the projection coordinates of points in rhombus-shaped grids at different refinement levels may be interconvertible. For example, the projection coordinate of a first rhombus-shaped grid at refinement level n may be determined based on the projection coordinate of a second rhombus-shape grid at refinement level q (q>n), as illustrated in Equation (20):

$$(ii, jj) = \left(\left[\frac{i}{2^{q-n}}\right], \left[\frac{j}{2^{q-n}}\right]\right), \quad (20)$$

where (ii,jj) may refer to the projection coordinate of the first rhombus-shaped grid at refinement level n in the projection coordinate system; and (i,j) may refer to the projection coordinate of the second rhombus-shaped grid at refinement level q in the projection coordinate system.

In some embodiments, the projection point P' may not belong to the points generated by the refinement operations, and thus, a target point (generated by the refinement operations) corresponding to the projection point P' may be determined. In some embodiments, the projection coordinate of projection point P' on the partition ΔACD may be referred to as a first projection coordinate.

Merely by way of example, FIG. 7I is a schematic diagram illustrating a target center point in a hexagon-shaped grid according to some embodiments of the present disclosure. As illustrated in FIG. 7I, there are a plurality of level 2 hexagon-shaped cells on the partition ΔACD. Points R1, R2, R3, R4, R5, R6, and R7 are center points of the hexagon-shaped grids. The processing engine 112 may determine a center point nearest to the projection point P' as the target center point. In some embodiments, the processing engine 112 may determine the distances between projection point P' and the center points (e.g., points R1, R2, R3, R4, R5, R6, and R7) of the hexagon-shaped grids based on the projection coordinates of projection point P' and the center points on the partition ΔACD. The processing engine 112 may determine the center point nearest to the projection point P' based on the distances between point P' and a number of surrounding center points. As shown in FIG. 7I, point R7 may be the target center point. The processing engine 112 may designate the projection coordinate of the target center point on the partition ΔACD as a second projection coordinate.

In some embodiments, a hexagon-shaped grid may cross over two or more partitions of the octahedron. The hexagon-shaped grid that crosses over two or more partitions of the octahedron may be referred to as a crossover grid. For example, as shown in FIG. 7K, four ⅙ hexagon-shaped grids AK₁K₂, AK₂K₃, AK₃K₄, and AK₄K₁ may belong to a same hexagon-shaped grid. Accordingly, the target center point may be located at a vertex of the corresponding partition. As another example, as shown in FIG. 7K, a border of two adjacent faces may divide a hexagon-shaped grid into two halves, that is, two ½ hexagon-shaped grids on two different partitions may belong to a same hexagon-shaped grid. Accordingly, the target center point may be located on a side of the corresponding partition. Therefore, it may be desirable to determine which partition the target center point of a crossover grid belongs to.

FIG. 7K is a schematic diagram illustrating the ascription of the target center point of a crossover grid according to some embodiments of the present disclosure. For illustration purposes, the eight partitions of the octahedron may be unfolded into a plane. The indices of the eight partitions may be 0, 1, 2, 3, 4, 5, 6, and 7. The six vertexes of the octahedron may be points A, B, C, D, E, and F. In some embodiments, the processing engine 112 may determine the ascription of the target center point of a crossover grid based on one or more rules. The one or more rules may be default values determined by the processing engine 112, or set or adjusted by a user via a terminal (e.g., the passenger terminal 130, the driver terminal 140, etc.)

In some embodiments, the projection coordinate of the target center point of a crossover grid on the corresponding partition may be (0, 0). Accordingly, the processing engine 112 may determine the ascription of the target center point based on Equation (21):

$$f' = \begin{cases} 0, & f < 4 \\ 4, & f > 3 \end{cases}, \quad (21)$$

where f may refer to an initial index of the corresponding partition of the target center point; and f' may refer to a ruled index of the corresponding partition of the target center point.

For example, assuming that a projection point P' is located on face "2", then the target center point may be point A, and the initial index of the corresponding partition of the target center point may be "2". As the initial index is less than 4, the ruled index of the corresponding partition may be determined as 0.

In some embodiments, the projection coordinate of the target center point of a crossover grid is on a border of two adjacent partitions, and the two adjacent partitions are located on the north side and the south side of the border, respectively. That is, the projection coordinate of the target center point (i,j) has a relationship i+j=N, in which N may refer to the number of equal segments on the border, and thus in certain embodiments, the processing engine 112 may determine the ascription of the target center point based on Equation (22):

$$f' = \begin{cases} f, & f < 4 \\ f - 4, & f > 3 \end{cases}. \quad (22)$$

That is, the processing engine 112 may determine that the target center point belongs to the partition located on the north side of the border. For example, the target center point may be located on the side BC, CD, DE, or EB, and the processing engine 112 may designate the target center point as belonging to partition "3", "0", "1", or "2", respectively.

In some embodiments, the projection coordinate of the target center point of a crossover grid is on a border of two adjacent partitions, and the two adjacent partitions are located on the east side and the west side of the border, respectively. That is, the I-coordinate or the J-coordinate of the target center point may be 0, and thus in certain embodiments, the processing engine 112 may determine that the target center point belongs to the partition located on the east side of the border. For example, the target center point may be located on the side AB, AC, AD, or AE, and the processing engine 112 may designate the target center point as belonging to partition "3", "0", "1", or "2", respectively.

As another example, FIG. 7J is a schematic diagram illustrating a target common point in a rhombus-shaped grid according to some embodiments of the present disclosure. The partition may have a plurality of rhombus-shaped grids, and three or more adjacent grids may have a common point. As each vertex of a rhombus-shaped grid may also be a vertex of two or more other rhombus-shaped grids, therefore, each vertex of a rhombus-shaped grid may be a common point.

As shown in FIG. 7J, take grid "STUV" as an example, the grid "STUV" may have four common points S, T, U, and V. Each side of a rhombus-shaped grid may have 1-unit length. Assuming that the projection coordinate of point S is (i,j), the projection coordinates of the points T, V, and U may be (i+1,j), (i,j+1), and (i+1,j+1), respectively. Each point inside the grid "STUV" may have an I-coordinate within the range of (i,i+1). Each point inside the grid "STUV" may have a J-coordinate within the range of (j,j+1). In some embodiments, the processing engine 112 may determine a common point having the integer coordinate of the first projection coordinate as the target common point. For example, the first projection coordinate of the point P' may be (i+x,j+y), in which x and/or y may be less than 1 and larger than 0. Correspondingly, the integer coordinate of the first projection coordinate may be (i,j), that is, point S may be determined as the target common point. The processing engine 112 may designate the projection coordinate of the target common point on the partition as a second projection coordinate.

In some embodiments, the processing engine 112 may determine the grid index corresponding to the coordinate pair based on the refinement level, the shape of the polyhedron relating to the DGGS, the index of the corresponding partition that the coordinate pair is in, and the second projection coordinate.

In some embodiments, the grid index may uniquely identify a grid on a partition in the map. A region including one or more coordinate pairs may be indexed to at least one grid on a partition of a polyhedron. For example, one or more coordinate pairs may be located in the same grid and indexed by the same grid index. As another example, one or more coordinate pairs may be located in different grids and indexed by different grid indices. In some embodiments, the grid index may include information related to the refinement level described above, the shape of the polyhedron, the index of the corresponding partition, and/or the second projection coordinate.

The grid index may be represented as a combination of one or more numbers, one or more letters, one or more symbols, etc. Merely by way of example, the processing engine 112 may determine the grid index in the form of a string "OL[ ]F[ ]i[ ]j[ ]", in which "O" may refer to that the polyhedron is an octahedron, "L" may refer to the refinement level, "F" may refer to the index of the corresponding partition of the octahedron that the coordinate pair is in, "i" and "j" may refer to the second projection coordinate, and "[ ]" may refer to that one or more numbers can be filled in a current position of the string. For example, if the refinement level is 13, the index of the corresponding partition is 1, and the second projection coordinate is (12.34, 56.78), then the grid index may be "OL13F1i1234j5678".

It should be noted that the above description of the process 700 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. In some embodiments, to facilitate the transformation operation, the coordinate pair may be converted to a corresponding coordinate pair that corresponds to a reference partition. Any partition may be designated as the reference partition. For example, a partition indexed with "0" may be designated as the reference partition. If the coordinate pair is not on the reference partition, the processing engine 112 may convert the coordinate pair to the reference partition "0". As illustrated in FIG. 7K, a partition indexed with "4" may be represented as an inverted triangle, after conversion, the partition indexed with "4" may be mapped to the reference partition "0". Accordingly, point F may be regarded as the origin (with a projection coordinate (0, 0)) of the projection coordinate system, vector FD may correspond to the I-axis of the projection coordinate system, and vector FC may correspond to the J-axis of the projection coordinate system.

Figure 8:
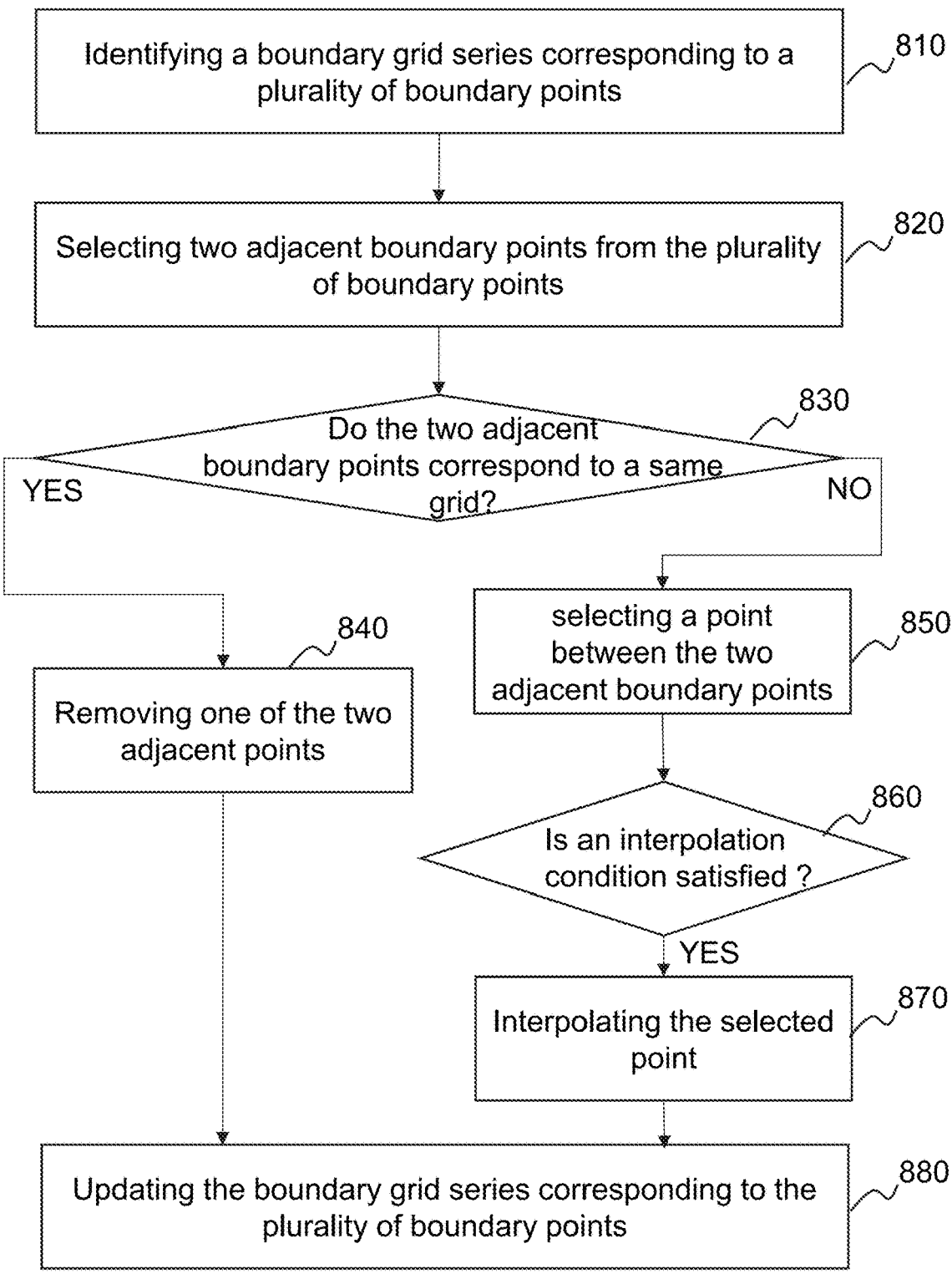
FIG. 8 is a flowchart illustrating an exemplary process for determining a final boundary grid series of a geofence based on an initial boundary grid series according to some embodiments of the present disclosure.

FIG. 8 is a flowchart illustrating an exemplary process for determining a (final) boundary grid series of a geofence based on the initial boundary grid series according to some embodiments of the present disclosure. In some embodiments, the process 800 may be implemented in the artificial intelligence system 100 as illustrated in FIG. 1. For example, the process 800 may be stored in the storage device 150 and/or other storage device (e.g., the ROM 230, the RAM 240) as a form of instructions, and invoked and/or executed by the server 110 (e.g., the processing engine 112 in the server 110, the processor 220 of the processing engine 112 in the server 110, the one or more modules of the processing engine 112 in the server 110). The operations of the illustrated process presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting. In some embodiments, step 520 of the process 500 may be performed according to the process 800.

In 810, the processing engine 112 (e.g., the identification unit 421 of the geofence boundary determination module 420) may identify a boundary grid series (e.g., the initial boundary grid series determined in 612, the initial boundary grid series determined in 653) corresponding to a plurality of boundary points.

In 820, the processing engine 112 (e.g., the selection unit 422 of the geofence boundary determination module 420) may select two adjacent boundary points from the plurality of boundary points. For illustration purposes, two adjacent boundary points may be referred to herein as a point pair. For a boundary grid series corresponding to N boundary points, each two adjacent boundary points of the N boundary points may be referred to as a point pair. The processing engine 112 may determine N point pairs for the N boundary points. It should be noted that the boundary point corresponding to the first grid of the boundary grid series and the boundary point corresponding to the last grid of the boundary grid series may also be considered to be adjacent and be referred to as two adjacent boundary points or a point pair. In some embodiments, the plurality of boundary points may be updated by interpolating or removing one or more points.

In 830, the processing engine 112 (e.g., the determination unit 423 of the geofence boundary determination module 420) may determine whether the two adjacent boundary points correspond to a same grid. For example, the processing engine 112 may determine whether grid indices corresponding to the two adjacent boundary points are the same as each other. If the grid indices corresponding to the two adjacent boundary points are the same as each other, the processing engine 112 (e.g., the determination unit 423 of the geofence boundary determination module 420) may determine that the two adjacent boundary points correspond to a same grid, for example, points C and D in FIG. 12A. If the grid indices corresponding to the two adjacent boundary points are different, the processing engine 112 (e.g., the determination unit 423 of the geofence boundary determination module 420) may determine that the two adjacent boundary points correspond to two different grids.

In response to a determination that the two adjacent boundary points correspond to a same grid, it may indicate that the boundary grid series include duplicate grids and the duplicate grids are adjacent in the boundary grid series, then process 800 may proceed to 840. In 840, the processing engine 112 (e.g., the removing unit 424 of the geofence boundary determination module 420) may remove one of the two adjacent boundary points. The removed boundary point may be an arbitrary one of the two adjacent boundary points. Then in 880, the processing engine 112 (e.g., the updating unit 426 of the geofence boundary determination module 420) may update the boundary grid series by removing a grid corresponding to the removed boundary point.

In response to a determination that the two adjacent boundary points correspond to two different grids, process 800 may proceed to 850. In 850, the processing engine 112 (e.g., the interpolation unit 425 of the geofence boundary determination module 420) may select a point between the two adjacent boundary points. The selected point may be an arbitrary point between the two adjacent boundary points, e.g., the midpoint of the two adjacent boundary points, a point near one of the two adjacent boundary points, or any other point between the two adjacent boundary points. The present disclosure will take that the selected point is the midpoint of the two adjacent boundary points as an example, which is not to be limiting. In some embodiments, the processing engine 112 (e.g., the interpolation unit 425) may directly interpolate a grid corresponding to the selected point in the boundary grid series to update the boundary grid series. In some embodiments, the processing engine 112 (e.g., the interpolation unit 425 of the geofence boundary determination module 420) may further determine whether an interpolation condition is satisfied. The interpolation condition may be that the grid corresponding to the selected point is different from either of the grids corresponding to the two adjacent boundary grids.

When the interpolation condition is satisfied, the processing engine 112 (e.g., the interpolation unit 425 of the geofence boundary determination module 420) may interpolate the selected point that is between the two adjacent boundary points in 870. The interpolated point may be designated as a boundary point of the geofence. Then in 880, the processing engine 112 (e.g., the updating unit 426 of the geofence boundary determination module 420) may update the boundary grid series by interpolating a grid corresponding to the interpolated boundary point between the two grids corresponding to the two adjacent boundary points.

When the interpolation condition is not satisfied, the processing engine 112 may not interpolate the selected point. In some embodiments, for all of the point pairs relating to the boundary grid series, the processing engine 112 may interpolate one or more points between two adjacent boundary points or remove a point of two adjacent boundary point in parallel. In some embodiments, for all of the point pairs relating to the boundary grid series, the processing engine 112 may interpolate one or more points between two adjacent boundary points or remove a point of two adjacent boundary point in sequence. For example, the processing engine 112 may sequentially obtain two adjacent boundary points from the plurality of boundary points in 820 and perform step 320 to 870, then the process 800 may return back to step 820 obtain another two adjacent boundary points. Therefore, to obtain all the grids that are occupied by the geofence, the processing engine 112 may repeat performing the above operations (e.g., operations described from step 820 to step 880). For each point pair, when determining that the interpolation condition is satisfied, the processing engine 112 may recursively interpolate a point until an interpolation between the two adjacent boundary grids points (including the boundary points corresponding to the initial boundary grids series and the interpolated boundary grids) generates a point corresponding to a same grid as one of the two adjacent boundary points. Then the processing engine 112 may determine the final boundary grid series of the geofence based on the removed boundary points and/or the interpolated boundary points.

Figure 9A:
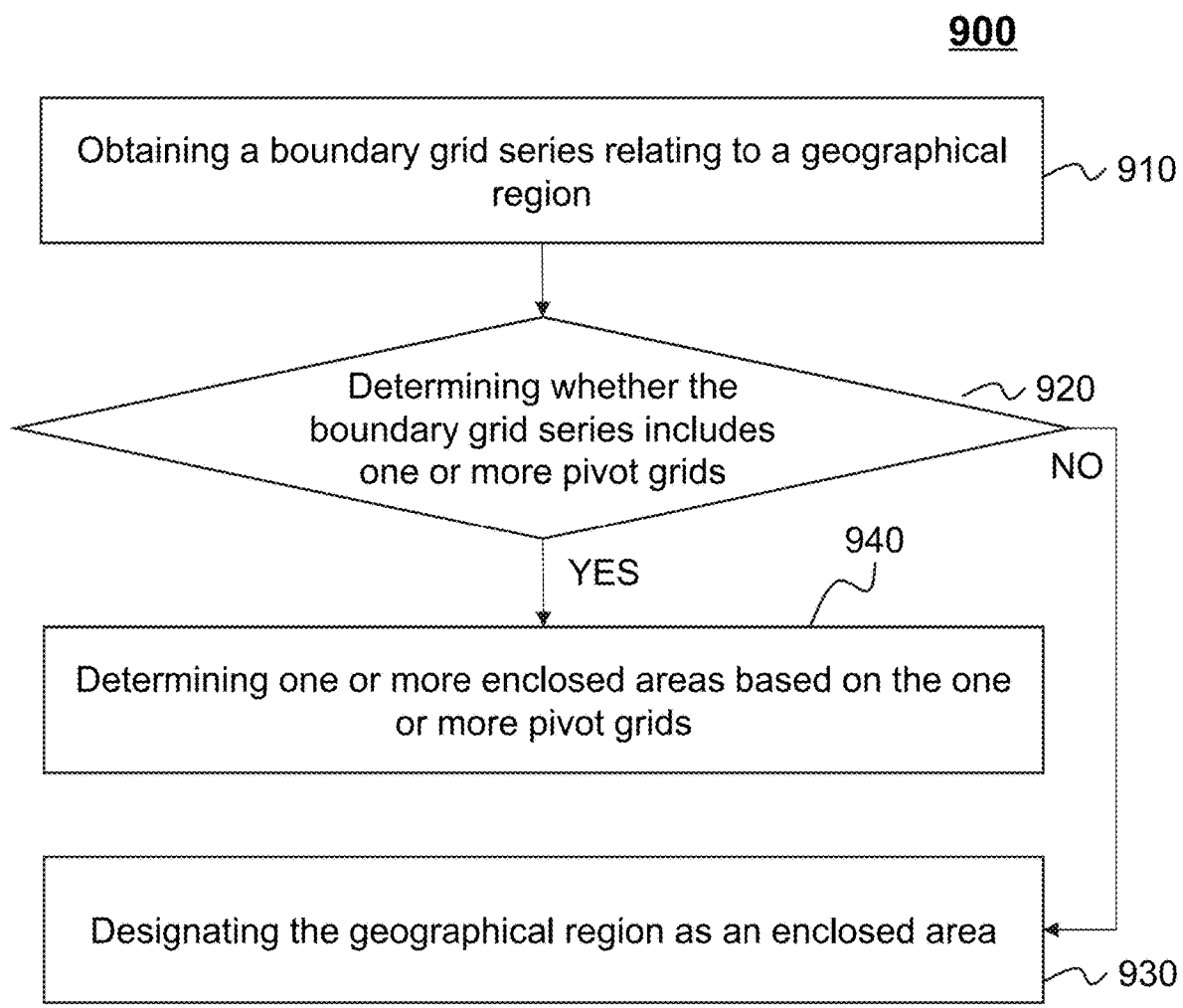
FIGS. 9A and 9B are flowcharts illustrating exemplary processes for determining one or more enclosed areas associated with a geographical region according to some embodiments of the present disclosure.

FIG. 9A is a flowchart illustrating an exemplary process for determining one or more enclosed areas associated with the geographical region according to some embodiments of the present disclosure. In some embodiments, the process 900 may be implemented in the artificial intelligence system 100 as illustrated in FIG. 1. For example, the process 900 may be stored in the storage device 150 and/or other storage device (e.g., the ROM 230, the RAM 240) as a form of instructions, and invoked and/or executed by the server 110 (e.g., the processing engine 112 in the server 110, the processor 220 of the processing engine 112 in the server 110, the one or more modules of the processing engine 112 in the server 110). The operations of the illustrated process presented below are intended to be illustrative. In some embodiments, the process 900 may be accomplished with one or more additional operations not described, and/or without one or more of the operations discussed. Additionally, the order in which the operations of the process 900 as illustrated in FIG. 9A and described below is not intended to be limiting. In some embodiments, step 530 of the process 500 may be performed according to the process 900.

In 910, the processing engine 112 (e.g., the grid obtaining unit 431 of the enclosed area determination module 430) may obtain a boundary grid series relating to a geographical region. In some embodiments, the boundary grid series may be the boundary grid series that determined in step 520 of FIG. 5. The boundary grid series may include all the grids that the geofence passes through. The grids of the boundary grid series may be arranged in an order of being passed through by the geofence.

In 920, the processing engine 112 (e.g., the pivot grid determination unit 432 of the enclosed area determination module 430) may determine whether the boundary grid series includes one or more pivot grids. As described above, the pivot grid may refer to the grid that the geofence passes through two or more times, and a pivot grid may appear two or more times in the boundary grid series. Therefore, the processing engine 112 may determine whether the boundary grid series includes two or more same grids using a search technique. For example, the processing engine 112 may create a link list or an auxiliary map for the grids of the boundary grid series based on the relative positions of the grids, then the processing engine 112 may determine whether the boundary grid series includes one or more pivot grids through searching the link list or the auxiliary map. In some embodiment, the determination of the pivot grid may be obtained by performing one or more operations described in FIG. 9.

In response to a determination that the boundary grid series does not include a pivot grid, process 900 may proceed to 930. In 930, the processing engine 112 (e.g., the enclosed area determination unit 433 of the enclosed area determination module 430) may designate the geographical region as an enclosed area.

In response to a determination that the boundary grid series includes one or more pivot grids, process 900 may proceed to 940. In 940, the processing engine 112 (e.g., the enclosed area determination unit 433 of the enclosed area determination module 430) may determine one or more enclosed areas based on the one or more pivot grids. For example, for each of the one or more pivot girds, the processing engine 112 may identify an area in the geographical region on one side of the pivot grid as a first enclosed area and an area in the geographical region on the other side of the pivot grid as a second enclosed area. In some embodiments, the number, N, of the enclosed areas associated with a pivot grid may be determined based on the number, M, of times of the pivot grid appearing in the boundary grid series. In one embodiment, if a specific pivot grid appears M times (e.g., 2, 3, 4 . . . ) in the boundary grid series, there may be N=M enclosed areas associated with the specific pivot grid. In another embodiment, if a specific pivot grid appears M times (e.g., 3, 4 . . . ) in the boundary grid series, there may be N (N is smaller than M, e.g., N=M−1) enclosed areas associated with the specific pivot grid.

Figure 9B:
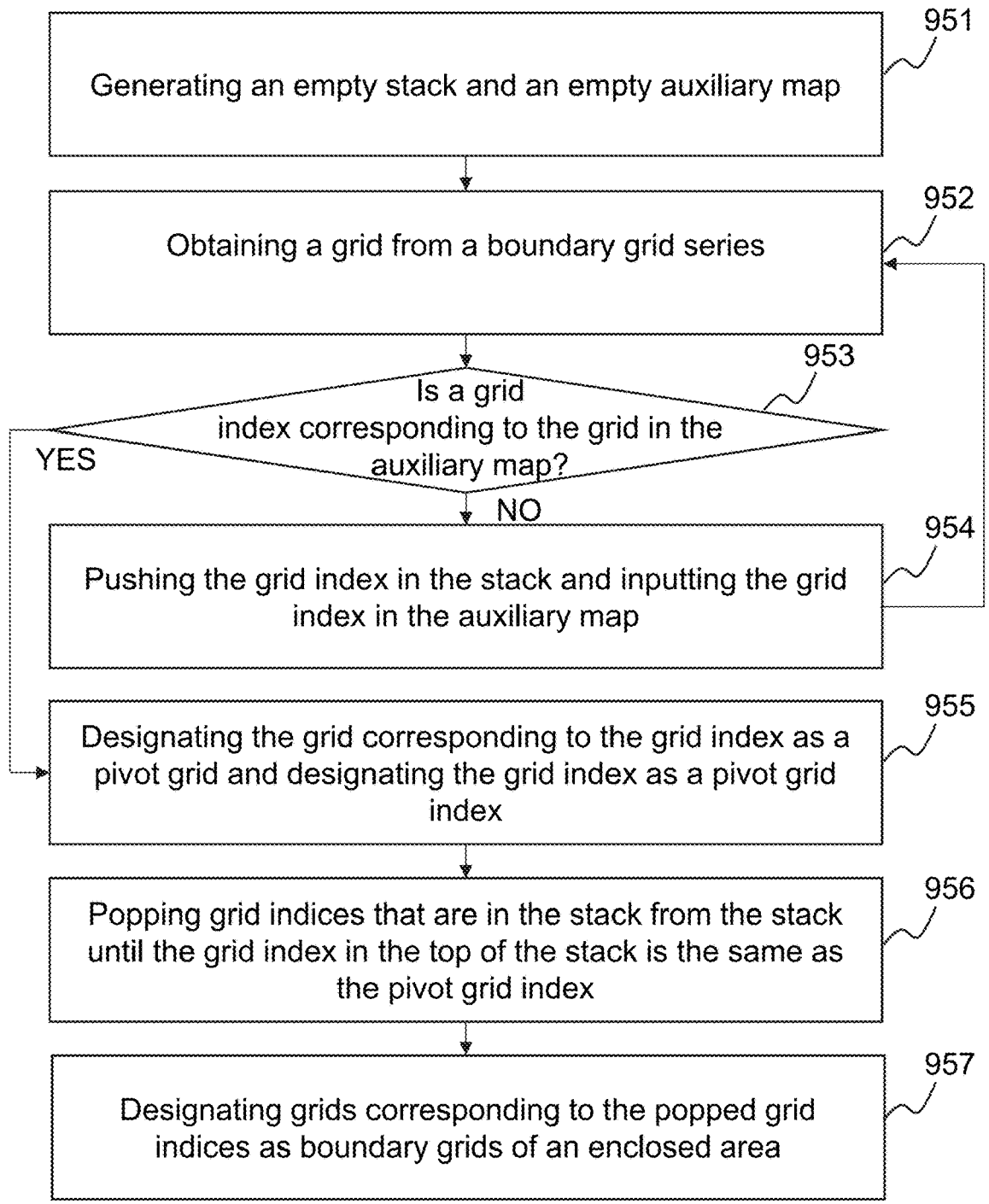

FIG. 9B is a flowchart illustrating an exemplary process for determining one or more enclosed areas associated with the geographical region using a stack operation according to some embodiments of the present disclosure. In some embodiments, the process 950 may be implemented in the artificial intelligence system 100 as illustrated in FIG. 1. For example, the process 950 may be stored in the storage device 150 and/or other storage device (e.g., the ROM 230, the RAM 240) as a form of instructions, and invoked and/or executed by the server 110 (e.g., the processing engine 112 in the server 110, the processor 220 of the processing engine 112 in the server 110, the one or more modules of the processing engine 112 in the server 110). The operations of the illustrated process presented below are intended to be illustrative. In some embodiments, the process 950 may be accomplished with one or more additional operations not described, and/or without one or more of the operations discussed. Additionally, the order in which the operations of the process 950 as illustrated in FIG. 9B and described below is not intended to be limiting. In some embodiments, step 530 of the process 500 and the process 900 may be performed according to the process 950.

In 951, the processing engine 112 (e.g., the enclosed area determination module 430) may generate an empty stack and an empty auxiliary map. In some embodiments, the processing engine 112 may generate the empty stack and the empty auxiliary map to store or process information (e.g., the boundary points, the grids, the grid indices described in the present disclosure) related to the geofence of a geographical region. The auxiliary map may include two parts including a key part and a value part. A key and a corresponding value may be referred to as a key-value pair represented as <key, value>. A key in the auxiliary map may be unique and each key may only be associated with one value. In some embodiments, the grid in the boundary grid series may be sequentially numbered. Each grid may correspond to a unique sequence number. For example, if the total number of grids (or the corresponding grid indices) in the boundary grid series is n, the sequence numbers of the grids may be marked as "1", "2", "3", . . . , "n", accordingly. A sequence number may be entered into one part of the auxiliary map, and the corresponding grid index of the grid may be entered into the other part of the auxiliary map. In some embodiments, the key-value pair of the auxiliary map may be represented as <sequence number, grid index>, i.e., the sequence number is a key and the grid index is a value relating to the key. Alternatively, the key-value pair of the auxiliary map may be represented as <grid index, sequence number>, i.e., the grid index is a key and the sequence number is a value relating to the key. In 952, the processing engine 112 (e.g., the grid obtaining unit 431 of the enclosed area determination module 430) may obtain a grid from a boundary grid series (e.g., the final boundary grid series relating to the geofence of the geographical region). In some embodiments, the processing engine 112 may sequentially obtain a grid in the boundary grid series, e.g., from the geofence boundary determination module 420 or a storage device (e.g., the storage device 150). The processing engine 112 may first obtain a grid corresponding to sequence number 1 then obtain a grid corresponding to sequence number 2, then obtain a grid corresponding to sequence number 3, . . . , and finally obtain a grid corresponding to sequence number n.

In 953, the processing engine 112 (e.g., the pivot grid determination unit 432 of the enclosed area determination module 430) may determine whether the grid index corresponding to the grid is in the auxiliary map through searching the auxiliary map.

In response to a determination that the grid index corresponding to the grid is not in the auxiliary map, process 950 may proceed to 954. In 954, the processing engine 112 (e.g., the enclosed area determination module 430) may push the grid index in the stack. In some embodiments, the processing engine 112 may simultaneously push the gird index in the stack and the corresponding sequence number in the stack or another stack. The processing engine 112 may also input the grid index in the auxiliary map in 954. Specifically, the processing engine 112 may input the grid index into one part of the auxiliary map (e.g., value part), and input the corresponding sequence number into the other part of the auxiliary map (e.g., the key part). It should be noted that the pushing of the grid in the stack and the inputting of the grid into the map may be performed in a same step or in different steps. After step 954, process 950 may proceed to 952 to obtain a grid corresponding to a next sequence number.

In response to the determination that the grid index corresponding to the grid is in the auxiliary map, process 950 may proceed to 955. In 955, the processing engine 112 (e.g., the pivot grid determination unit 432 of the enclosed area determination module 430) may designate the grid as a pivot grid. The processing engine 112 may also designate the grid index corresponding to the pivot grid as a pivot grid index.

In 956, the processing engine 112 (e.g., the enclosed area determination unit 433 of the enclosed area determination module 430) may pop grid indices that are in the stack from the stack until the grid index in the top of the stack is same as the pivot grid index. In some embodiments, the processing engine 112 may also pop the grid index being same as the pivot grid index from the top of the stack. Then in 957, the processing engine 112 (e.g., the enclosed area determination unit 433 of the enclosed area determination module 430) may designate grids corresponding to the popped grid indices as boundary grids of an enclosed area relating to the pivot grid (or the pivot grid index). In some embodiments, when a grid and the corresponding sequence number are pushed in the stack in 954, the processing engine 112 may pop the grid index and the corresponding sequence number from the top of the stack, simultaneously, in 956.

It should be noted that the above description of the process 950 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. In some embodiments, the grid indices and the corresponding sequence numbers may be pushed in two stacks. For example, in 951, the processing engine 112 may generate two empty stacks. In 954, the grid index and the corresponding sequence number may be pushed in the two stacks, respectively. In 956, the processing engine 112 may pop the grid indices and the corresponding sequence numbers from the two stacks, respectively. In some embodiments, in 956, the processing engine 112 may not pop the grid index being same as the pivot grid index from the stack.

In some embodiments, after the first enclosed area is determined, process 950 may proceed to 952. In 952, the processing engine 112 may continue to obtain a grid from the boundary grid series. By performing step 953 to step 957, the processing engine 112 may determine a next enclosed area. In some embodiments, step 952 to step 957 may be repeated to determine one or more enclosed areas. By repeating performing step 952 to step 957, the grid indices of all grids in the boundary grid series may be processed (e.g., pushed in or popped from the stack). In some embodiments, when the first grid pushing to the stack is not a pivot grid, after the processing engine 112 determines all the pivot grids, there may still be several grids (or grid indices) remaining in the stack, then the processing engine 112 may designate grids corresponding to grid indices remaining in the stack as boundary grids of another enclosed area. When all of the operations of process 950 are performed, the processing engine 112 may identify all of the enclosed areas of the geographical region (e.g., identify the boundary grids for each of the enclosed areas).

FIG. 10 is a flowchart illustrating an exemplary process for determining boundary grids of the two or more sub-areas according to some embodiments of the present disclosure. In some embodiments, the process 1000 may be implemented in the artificial intelligence system 100 as illustrated in FIG. 1. For example, the process 1000 may be stored in the storage device 150 and/or other storage device (e.g., the ROM 230, the RAM 240) as a form of instructions, and invoked and/or executed by the server 110 (e.g., the processing engine 112 in the server 110, the processor 220 of the processing engine 112 in the server 110, the one or more modules of the processing engine 112 in the server 110). The operations of the illustrated process presented below are intended to be illustrative. In some embodiments, the process 1000 may be accomplished with one or more additional operations not described, and/or without one or more of the operations discussed. Additionally, the order in which the operations of the process 1000 as illustrated in FIG. 10 and described below is not intended to be limiting. In some embodiments, step 550 of the process 500 may be performed according to the process 1000.

In 1010, the processing engine 112 (e.g., the overlapped edge grid determination unit 441 of the sub-area determination module 440) may determine overlapped edge grids where the sub-area intersect with one or more edges of a plurality of partitions. In some embodiments, the term "the edge," "the border," and "the side" of a partition may be used interchangeably. In some embodiments, if an enclosed area crosses two or more partitions, the processing engine 112 (e.g., the sub-area determination module 440) may segment the enclosed area into two or more sub-areas (with reference to the operation described in 540 of the process 500). In some embodiments, for a sub-area, the sub-area may intersect with one or more edges of the partitions of the map. The processing engine 112 may determine one or more overlapped edge grids based on the boundary grids of the sub-area on the one or more edges. For example, as shown in FIG. 11B, there is an exemplary rectangular partition 1166 including a plurality of exemplary rectangular grids 1167. It should be noted that the partition and/or the grids may have other shapes and numbers. The processing engine 112 (e.g., the sub-area determination module 440) may determine a sub-area 1162 (an area with slanted dotted lines) as one of sub-areas relating to the enclosed area 1161. In some embodiments, to determine one or more overlapped edge grids of the sub-area 1162 on the partition 1166, the processing engine 112 (e.g., the overlapped grid determination unit 441) may first determine the points (e.g., point A and point B) that the boundary of enclosed area 1161 intersects with the partition 1166. Then the processing engine 112 (e.g., the overlapped grid determination unit 441) may determine grids between point A and point C on edge EC as first overlapped edge grids based on a grid index of a grid where point A is and the index of the partition 1166. The processing engine 112 (e.g., the overlapped grid determination unit 441) may determine grids between point B and point C on edge FC as second overlapped edge grids based on a grid index of a grid where point B is and the index of the partition 1166. It should be noted that point A and point B are on the boundary of the enclosed area 1162, therefore, the grid where point A is and the grid where point B is may belong to the boundary grids (also referred to herein as initial boundary grids) of the sub-area 1162 instead of the overlapped grids of the sub-area 1162.

In 1020, the processing engine 112 (e.g., the boundary grid determination unit 442 of the sub-area determination module 440) may determine boundary grids of the sub-area based on the overlapped edge grids and boundary grids of an enclosed area relating to the two or more sub-areas. In some embodiments, for the sub-area, the processing engine 112 may combine the initial boundary grids of the sub-area and the overlapped edge grids relating to the sub-area to determine the boundary grids (also referred to herein as final boundary grids) of the sub-area. It should be noted that for each sub-area determined in 540, the processing engine 112 may perform the operations described in FIG. 10 to determine the boundary grids of the sub-area.

Figure 11A:
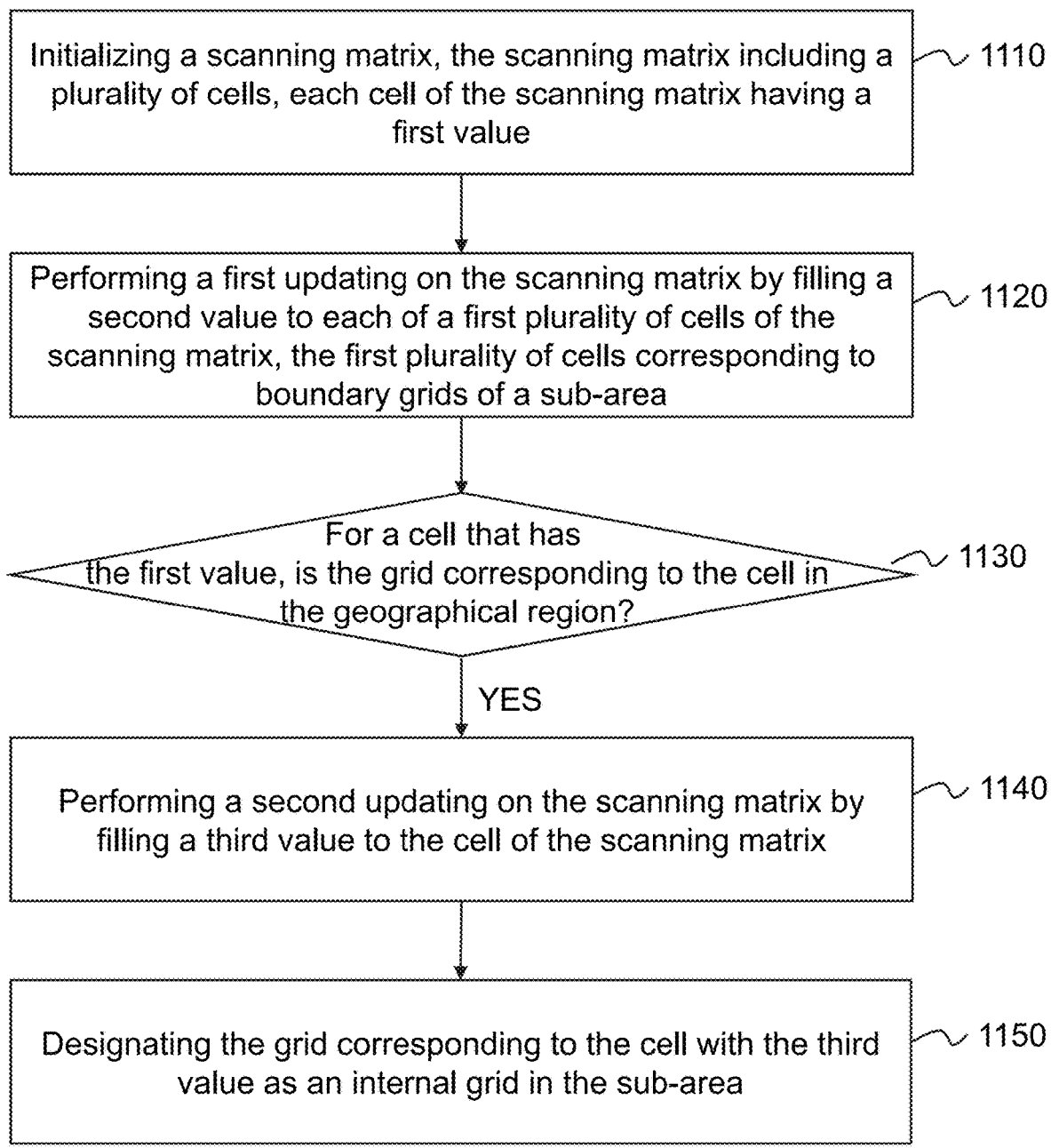
FIG. 11A is a flowchart illustrating an exemplary process for determining internal grids in a sub-area according to some embodiments of the present disclosure.
Figure 11B:
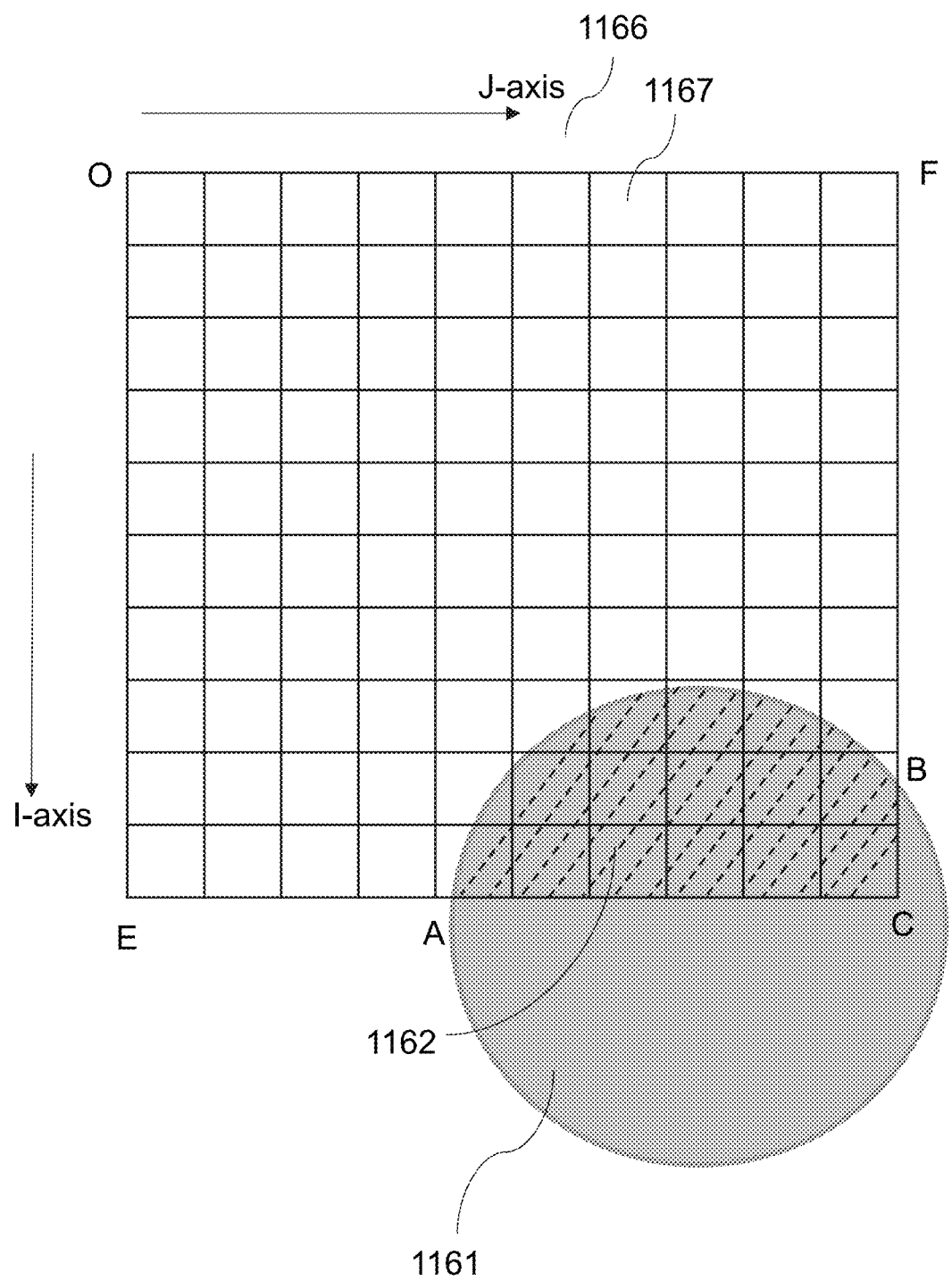
FIG. 11B shows an exemplary sub-area on a partition according to some embodiments of the present disclosure.

FIG. 11A is a flowchart illustrating an exemplary process for determining internal grids in a sub-area according to some embodiments of the present disclosure. In some embodiments, the process 1100 may be implemented in the artificial intelligence system 100 as illustrated in FIG. 1. For example, the process 1100 may be stored in the storage device 150 and/or other storage device (e.g., the ROM 230, the RAM 240) as a form of instructions, and invoked and/or executed by the server 110 (e.g., the processing engine 112 in the server 110, the processor 220 of the processing engine 112 in the server 110, the one or more modules of the processing engine 112 in the server 110). The operations of the illustrated process presented below are intended to be illustrative. In some embodiments, the process 1100 may be accomplished with one or more additional operations not described, and/or without one or more of the operations discussed. Additionally, the order in which the operations of the process 1100 as illustrated in FIG. 11A and described below is not intended to be limiting. In some embodiments, step 560 of the process 500 may be performed according to the process 1100.

In 1110, the processing engine 112 (e.g., the matrix initialization unit 451 of the internal grid determination module 450) may initialize a scanning matrix. The scanning matrix may include a plurality of cells. Each cell of the scanning matrix may have a first value. The value filled in the scanning matrix may be in any format, e.g., a number, a letter. For the purpose of illustration, the value filled in the scanning matrix described elsewhere in the present disclosure may be in numerical format, e.g., 0, 1, 2, 3 . . . . In some embodiments, the first value may be zero. In some embodiments, the processing engine 112 (e.g., the internal grid determination module 450) may determine the size of the scanning matrix based on the span of boundary grids of the sub-area.

Merely by way of example, as shown in FIG. 11B, OE and OF may be designated as an I-axis and a J-axis of a rectangular partition OECF. The enclosed area 1161 (e.g., with a circle shape) crosses more than one partition. The sub-area 1162 crosses three grids in the I-axis direction of the rectangular partition OECF, and crosses six grids in the J-axis direction of the rectangular partition OECF. The processing engine 112 may determine that the span of the sub-area 1162 is 3 in the I-axis direction and 6 in the J-axis direction. Then the processing engine 112 (e.g., the internal grid determination module 450) may determine the scanning matrix having the size of 3*6. The processing engine 112 (e.g., the matrix initialization unit 451 of the internal grid determination module 450) may initialize the scanning matrix by filling the first value (e.g., zero) to each cell of the scanning matrix. Merely by way of example, the initialized scanning matrix Z may be expressed as Equation (23):

$$Z = \begin{bmatrix} 0 & 0 & 0 & 0 & 0 & 0 \\ 0 & 0 & 0 & 0 & 0 & 0 \\ 0 & 0 & 0 & 0 & 0 & 0 \end{bmatrix}. \quad (23)$$

In 1120, the processing engine 112 (e.g., the matrix updating unit 452 of the internal grid determination module 450) may perform a first updating on the scanning matrix by filling a second value to each of a first plurality of cells of the scanning matrix. The first plurality of cells may correspond to the boundary grids of the sub-area. The second value may be any value (or number) different from the first value. For example, the second value may be 1.

For the purpose of illustration, the scanning matrix after the first updating may be referred to herein as a first updated scanning matrix. Merely by way of example, when the first value is 0 and the second value is 1, the first updated scanning matrix Z' may be expressed as Equation (24):

$$Z' = \begin{bmatrix} 0 & 1 & 1 & 1 & 1 & 1 \\ 1 & 1 & 0 & 0 & 0 & 1 \\ 1 & 1 & 1 & 1 & 1 & 1 \end{bmatrix}. \quad (24)$$

After step 1120, partial cells may have the first value, and partial cells (e.g., the first plurality of cells) may have the second value. Then in 1130, the processing engine 112 (e.g., the internal grid determination module 450) may, for a cell that has the first value, determine whether the grid corresponding to the cell is in the geographical region using a ray method. In some embodiments, for each of all the cells in the scanning matrix, the processing engine 112 may determine whether the grid corresponding to the cell is in the geographical region using a ray method in 1130.

In response to a determination that the grid corresponding the cell is in the geographical region, process 1100 may proceed to 1140. In 1140, the processing engine 112 (e.g., the matrix updating unit 452 of the internal grid determination module 450) may perform a second updating on the scanning matrix by filling a third value to the cell of the scanning matrix. The third value may be any value (or number) other than the first value and the same as or different from the second value. For example, the third value may be 2. In some embodiments, if one or more grids corresponding to cells that have the first value are in the geographical region, the processing engine 112 may perform the second updating on the scanning matrix by filling the third value to the one or more corresponding cells.

For the purpose of illustration, the scanning matrix after the second updating may be referred to herein as a second updated scanning matrix. Merely by way of example, when the third value is 2, the second updated scanning matrix Z" may be expressed as Equation (25):

$$Z'' = \begin{bmatrix} 0 & 1 & 1 & 1 & 1 & 1 \\ 1 & 1 & 2 & 2 & 2 & 1 \\ 1 & 1 & 1 & 1 & 1 & 1 \end{bmatrix}. \quad (25)$$

In 1150, the processing engine 112 (e.g., the internal grid determination unit 453 of the internal grid determination module 450) may designate grids corresponding to the cells with the third value (e.g., 2) as internal grids in sub-area 1162.

In some embodiments, the processing engine 120 may identify one or more cells that are encircled by the first plurality of cells and determine that the grids corresponding to the cells encircled by the first plurality of cells as the internal grids of the sub-area.

The processing engine 112 may traverse the scanning matrix to select the cells with the second (or third) value. The processing engine 112 may designate grids corresponding to the cells with the second (or third) value as target grids corresponding to the sub-area. When the processing engine 112 performs operations in process 1100 for each of the sub-areas in the geographical region, the processing engine 112 may determine target grids (including boundary grids and internal grids) of the geographical region by collecting all the target grids (including boundary grids and internal grids) relating to each of the sub-areas in the geographical region.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A non-transitory computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. An artificial intelligent system configured to identify grids for a geofence in an area in a map that includes a plurality of independently indexed regions of grids, comprising:

at least one storage medium storing the map and a set of instructions for identifying a geographical region;

at least one processor in communication with the at least one storage medium, wherein when executing the set of instructions, the at least one processor is directed to:

load at least part of a map from the at least one storage medium to at least one cache circuit;

generate a presentation of the at least part of the map, wherein the map is gridded into a plurality of grids and is divided into a plurality of partitions, each grid of the plurality of grids in the map is associated with a grid index, and grids in each partition are independently indexed;

obtain information of a geofence of a geographical region in the map;

determine a boundary grid series of the geofence from the plurality of grids;

identify at least one enclosed area in the geographical region based on the boundary grid series;

upon determining that an enclosed area of the at least one enclosed area crosses two or more partitions of the plurality of partitions, segment the enclosed area into two or more sub-areas so that each sub-area of the two or more sub-areas locates in only one partition of the plurality of partitions;

determine boundary grids for each of the two or more sub-areas;

for each of the two or more sub-areas, identify, from the plurality of grids, internal grids in the sub-area based on the boundary grids of the sub-area and an index of the partition in which the sub-area locates; and identify grids in the geographical region by collecting the boundary grids of the two or more sub-areas and the internal grids in the two or more sub-areas.

2. The artificial intelligent system of claim 1, wherein the information of the geofence includes a set of coordinate pairs corresponding to a plurality of boundary points; and to determine the boundary grid series of the geofence, the at least one processor is further directed to:

identify, from the plurality of grids, the boundary grid series corresponding to the plurality of boundary points; and conduct one or more operations including following steps:

obtaining two adjacent boundary points from the plurality of boundary points, determining whether the two adjacent boundary points correspond to a same grid;

in response to a determination that the two adjacent boundary points correspond to the same grid, removing one of the two adjacent boundary points;

in response to a determination that the two adjacent boundary points correspond to two different grids, interpolating a boundary point between the two adjacent boundary points; and updating the boundary grid series corresponding to the plurality of boundary points.

3. The artificial intelligent system of claim 1, wherein the boundary grid series includes grids from the plurality of grids of the map that the geofence passes through; and to identify the at least one enclosed area, the at least one processor is further directed to:

determine whether the boundary grid series includes one or more pivot grids, wherein a pivot grid corresponds to at least two same grid indices; and in response to a determination that the boundary grid series includes the one or more pivot grids, for each of the one or more pivot grids, identify an area in the geographical region on one side of the pivot grid as a first enclosed area and an area in the geographical region on the other side of the pivot grid as a second enclosed area different from the first enclosed area.

4. The artificial intelligent system of claim 3, wherein to identify the at least one enclosed area, the at least one processor is further directed to:

generate an empty stack and an empty auxiliary map;

for each grid of the boundary grid series;

sequentially obtain the grid from the boundary grid series;

determine whether a grid index corresponding to the grid is in the auxiliary map;

in response to a determination that the grid index is not in the auxiliary map, push the grid index in the stack and input the grid index in the auxiliary map;

in response to a determination that the grid index is in the auxiliary map, designate the grid corresponding to the grid index as a pivot grid of the one or more pivot grids, designate the grid index as a pivot grid index, pop grid indices that are in the stack from the stack until the grid index in the top of the stack is the same as the pivot grid index, and designate girds corresponding to the popped grid indices as boundary grids of the first enclosed area; and designate grids corresponding to grid indices remaining in the stack as boundary grids of the second enclosed area.

5. The artificial intelligent system of claim 1, wherein the geofence is determined based on a circle defined by a center and a radius and to identify the at least one enclosed area in the geographical region, the at least one processor is further directed to:

sample a plurality of sample points on the circle with a predetermined sample interval; and determine boundary grids of the at least one enclosed area in the geographical region based on the plurality of sample points.

6. The artificial intelligent system of claim 5, wherein the predetermined sample interval is associated with the radius of the circle and a resolution relating to a grid of the plurality of grids.

7. The artificial intelligent system of claim 5, wherein the at least one processor is further directed to:

upon determining that two or more sample points of the plurality of sample points correspond to a same grid, remove one or more sample points from the two or more sample points so that there is only one sample point corresponding to the grid.

8. The artificial intelligent system of claim 1, wherein after the segmenting of the at least one enclosed area into two or more sub-areas, the at least one processor is directed to:

determine overlapped edge grids where the two or more sub-areas intersect with one or more edges of the plurality of partitions; and add the overlapped edge grids to the two or more sub-areas as the boundary grids of the two or more sub-areas.

9. The artificial intelligent system of claim 1, wherein to identify, from the plurality of grids, internal grids in the sub-area, the at least one processor is directed to:
initialize a scanning matrix, wherein the scanning matrix includes a plurality of cells and each cell of the scanning matrix has a first value;
perform a first updating on the scanning matrix by filling a second value to each of a first plurality of cells of the scanning matrix, the first plurality of cells corresponding to the boundary grids of the sub-area;
for each cell of the scanning matrix after the first updating that has the first value, determine whether a grid corresponding to the cell is in the geographical region;
in response to a determination that the grid corresponding to the cell is in the geographical region,
perform a second updating on the scanning matrix by filling a third value to the cell of the scanning matrix; and
designate grids corresponding to the cells with the third value as the internal grids in the sub-area.

10. The artificial intelligent system of claim 9, wherein the second value and third value are the same as each other.

11. A method for identifying grids for a geofence in an area in a map that includes a plurality of independently indexed regions of grids, implemented on a computing device having at least one storage medium storing the map and a set of instructions for identifying a geographical region, and at least one processor in communication with the at least one storage medium, the method comprising:
loading at least part of a map from the at least one storage medium to at least one cache circuit;
generating a presentation of the at least part of the map, wherein the map is gridded into a plurality of grids and is divided into a plurality of partitions, each grid of the plurality of grids in the map is associated with a grid index, and grids in each partition are independently indexed;
obtaining information of a geofence of a geographical region in the map;
determining a boundary grid series of the geofence from the plurality of grids;
identifying at least one enclosed area in the geographical region based on the boundary grid series;
upon determining that an enclosed area of the at least one enclosed area crosses two or more partitions of the plurality of partitions, segmenting the enclosed area into two or more sub-areas so that each sub-area of the two or more sub-areas locates in only one partition of the plurality of partitions;
determining boundary grids for each of the two or more sub-areas;
for each of the two or more sub-areas, identifying, from the plurality of grids, internal grids in the sub-area based on the boundary grids of the sub-area and an index of the partition in which the sub-area locates; and
identifying grids in the geographical region by collecting the boundary grids of the two or more sub-areas and the internal grids in the two or more sub-areas.

12. The method of claim 11, wherein the information of the geofence includes a set of coordinate pairs corresponding to a plurality of boundary points; and
the determining of the boundary grid series of the geofence further includes:
identifying, from the plurality of grids, the boundary grid series corresponding to the plurality of boundary points; and
conducting one or more operations including following steps:
obtaining two adjacent boundary points from the plurality of boundary points,
determining whether the two adjacent boundary points correspond to a same grid;
in response to a determination that the two adjacent boundary points correspond to the same grid, removing one of the two adjacent boundary points;
in response to a determination that the two adjacent boundary points correspond to two different grids, interpolating a boundary point between the two adjacent boundary points; and
updating the boundary grid series corresponding to the plurality of boundary points.

13. The method of claim 11, wherein
the boundary grid series includes grids from the plurality of grids of the map that the geofence passes through; and
the identifying of the at least one enclosed area further includes:
determining whether the boundary grid series includes one or more pivot grids, wherein a pivot grid corresponds to at least two same grid indices; and
in response to a determination that the boundary grid series includes the one or more pivot grids, for each of the one or more pivot grids, identifying an area in the geographical region on one side of the pivot grid as a first enclosed area and an area in the geographical region on the other side of the pivot grid as a second enclosed area different from the first enclosed area.

14. The method of claim 13, wherein the identifying of the at least one enclosed area further comprises:
generating an empty stack and an empty auxiliary map;
for each grid of the boundary grid series;
sequentially obtaining the grid from the boundary grid series;
determining whether a grid index corresponding to the grid is in the auxiliary map;
in response to a determination that the grid index is not in the auxiliary map, pushing the grid index in the stack and inputting the grid index in the auxiliary map;
in response to a determination that the grid index is in the auxiliary map, designating the grid corresponding to the grid index as a pivot grid of the one or more pivot grids, designating the grid index as a pivot grid index, popping grid indices that are in the stack from the stack until the grid index in the top of the stack is the same as the pivot grid index, and designating girds corresponding to the popped grid indices as boundary grids of the first enclosed area; and
designating grids corresponding to grid indices remaining in the stack as boundary grids of the second enclosed area.

15. The method of claim 11, wherein the geofence is determined based on a circle defined by a center and a radius and
the identifying of the at least one enclosed area in the geographical region further includes:
sampling a plurality of sample points on the circle with a predetermined sample interval; and
determining boundary grids of the at least one enclosed area in the geographical region based on the plurality of sample points.

16. The method of claim 15, wherein the predetermined sample interval is associated with the radius of the circle and a resolution relating to a grid of the plurality of grids.

17. The method of claim 15, further comprising:
upon determining that two or more sample points of the plurality of sample points correspond to a same grid, removing one or more sample points from the two or more sample points so that there is only one sample point corresponding to the grid.

18. The method of claim 11, wherein after the segmenting of the at least one enclosed area into two or more sub-areas, the method further comprises:
determining overlapped edge grids where the two or more sub-areas intersect with one or more edges of the plurality of partitions; and
adding the overlapped edge grids to the two or more sub-areas as the boundary grids of the two or more sub-areas.

19. The method of claim 11, wherein the identifying of the internal grids in the sub-area from the plurality of grids further comprises:
initializing a scanning matrix, wherein the scanning matrix includes a plurality of cells and each cell of the scanning matrix has a first value;
performing a first updating on the scanning matrix by filling a second value to each of a first plurality of cells of the scanning matrix, the first plurality of cells corresponding to the boundary grids of the sub-area;
for each cell of the scanning matrix after the first updating that has the first value, determining whether a grid corresponding to the cell is in the geographical region;
in response to a determination that the grid corresponding to the cell is in the geographical region,
performing a second updating on the scanning matrix by filling a third value to the cell of the scanning matrix; and
designating grids corresponding to the cells with the third value as the internal grids in the sub-area.

20. A non-transitory computer readable medium, comprising at least one set of instructions for identifying a geographical region, wherein when executed by at least one processor, the at least one set of instructions directs the at least one processor to perform acts of:
accessing a map from at least one storage medium;
generating a presentation of the map, wherein the map is gridded into a plurality of grids and is divided into a plurality of partitions, each grid of the plurality of grids in the map is associated with a grid index, and grids in each partition are independently indexed;
obtaining information of a geofence of a geographical region in the map;
determining a boundary grid series of the geofence from the plurality of grids;
identifying at least one enclosed area in the geographical region based on the boundary grid series;
upon determining that an enclosed area of the at least one enclosed area crosses two or more partitions of the plurality of partitions, segmenting the enclosed area into two or more sub-areas so that each sub-area of the two or more sub-areas locates in only one partition of the plurality of partitions;
determining boundary grids for each of the two or more sub-areas;
for each of the two or more sub-areas, identifying, from the plurality of grids, internal grids in the sub-area based on the boundary grids of the sub-area and an index of the partition in which the sub-area locates; and
identifying grids in the geographical region by collecting the boundary grids of the two or more sub-areas and the internal grids in the two or more sub-areas.

\* \* \* \* \*